US006292284B1

(12) United States Patent
Takauji et al.

(10) Patent No.: US 6,292,284 B1
(45) Date of Patent: Sep. 18, 2001

(54) LIGHT EMITTING ELEMENT DRIVING APPARATUS

(75) Inventors: Toshiyuki Takauji; Toru Matsuyama, both of Sapporo; Tadao Inoue, Kawasaki; Tadashi Ikeuchi, Kawasaki; Satoshi Ide, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/174,309

(22) Filed: Oct. 19, 1998

(30) Foreign Application Priority Data

Mar. 17, 1998 (JP) .................................................. 10-067240

(51) Int. Cl.[7] ..................................................... H04B 10/04
(52) U.S. Cl. .......................... 359/187; 359/158; 359/180; 359/161
(58) Field of Search .................................. 359/158, 180, 359/187, 161

(56) References Cited

U.S. PATENT DOCUMENTS

| 4,856,011 | * | 8/1989 | Shimada et al. ........................ 372/38 |
| 5,274,653 | * | 12/1993 | Ohashi .................................... 372/31 |
| 5,416,504 | * | 5/1995 | Ohashi .................................. 347/247 |
| 5,677,779 | * | 10/1997 | Oda et al. ............................. 359/152 |
| 5,724,170 | * | 3/1998 | Aizawa ................................. 359/187 |
| 5,802,089 | * | 9/1998 | Link ....................................... 372/38 |
| 5,914,484 | * | 6/1999 | Tawarayama et al. .............. 250/205 |
| 5,978,124 | * | 11/1999 | Maekawa et al. ................... 359/187 |
| 5,978,393 | * | 11/1999 | Feldman et al. ...................... 372/31 |
| 6,044,095 | * | 3/2000 | Asano et al. ........................... 372/31 |
| 6,108,114 | * | 8/2000 | Gilliland et al. ..................... 359/187 |
| 6,169,618 | * | 1/2001 | Higashino ............................. 359/187 |

FOREIGN PATENT DOCUMENTS

| 5-63652 | 3/1993 | (JP) . |
| 7-288504 | 10/1995 | (JP) . |
| 8-279788 | 10/1996 | (JP) . |

* cited by examiner

Primary Examiner—Leslie Pascal
Assistant Examiner—Hanh Phan
(74) Attorney, Agent, or Firm—Staas & Halsey LLP

(57) ABSTRACT

The present invention provides a light emitting element driving apparatus having a driving unit for driving a light emitting element by means of a driving signal while performing automatic light power control, which enables a light output to rise at a high speed in the head portion of a burst signal to be first inputted and light outputs of a second burst signal after the first burst signal and signals thereafter to be stably supplied irrespective of holding time. To this end, the light emitting element driving apparatus comprises a reference voltage generation unit for generating a reference voltage from an input electric signal containing data information, the reference voltage being used for obtaining a light output having specified power from the light emitting element in a normal condition, a monitoring voltage generation unit for generating a monitoring voltage signal corresponding to power of an optical signal outputted from the light emitting element, a light power control unit for controlling, based on a result of comparison from the reference voltage and the monitoring voltage signal, the driving unit by a discrete control amount such that a light output from the light emitting element can have the specified power and an initial value setting unit for setting a raising component as an initial value in a control signal having the discrete control amount.

19 Claims, 28 Drawing Sheets

PRESET INPUT IS CONNECTED TO GND
OR POWER SOURCE, AND $V_{pcnt}$ IS SET
TO VOLTAGE EQUIVALENT TO $V_{th}$

LIGHT EMITTING ELEMENT DRIVING APPARATUS

BACKGROUND OF THE INVENTION (1) Field of the Invention

The present invention relates to a light emitting element driving apparatus, and more particularly one for performing automatic light power control (APC control; Automatic Power Constant control) for a light output from a light emitting element.

(2) Description of the Related Art

In recent years, we have seen active efforts made to develop subscriber exclusive optical communication devices in the field of optical communications. In an optical communication device used in an optical subscriber system, a semiconductor circuit based on a CMOS type field effect transistor has been put to frequent use in order to satisfy requests for reductions in costs, power consumption, and so on.

Not only in the foregoing optical communication device of the optical subscriber system but also in the optical transmission device of a trunk system, a function unit for transmitting light signals via optical fibers transmits signals containing data information, for instance burst signals, by driving a light emitting element such as a laser diode (LD).

In such a situation, a light emitting element driving apparatus for driving the light emitting element such as an LD must have a function for dealing with burst signals and, more importantly, a function for accurately maintaining light power constant even if there is a long time interval between burst signals. These functions must be provided also for securing reliability of the light emitting element itself.

In a driving apparatus for driving a magneto-optic disk (MO) or a laser printer, an LD or the like is used as a light emitting element for emitting laser lights. For the magneto-optic disk driving apparatus or the laser printer, functional improvements can be expected by providing a function for accurately maintaining light power constant even if a long time interval occurs between burst signals.

FIG. 22 is a block diagram showing a light emitting element driving apparatus where a conventional automatic light power control circuit is applied. A light emitting element 100 and a light emitting element driving apparatus 110 shown in FIG. 22 can be applied to an optical communication device for transmitting/receiving light signals via not-shown optical fibers.

The light emitting element 100 converts electric signals into light signals, supplies output signals to a not-shown optical transmission line and outputs monitoring lights. The light emitting element driving apparatus 110 performs control so as to maintain constant light power of a light signal outputted from the light emitting element 100. The light emitting element driving apparatus 110 includes a data receiving unit 101, an LD driving unit 102, a reference voltage generation unit 103, a light receiving element 104, a monitoring voltage conversion unit 105, a difference voltage generation unit 106 and a control signal generation unit 107.

The data receiving unit 101 receives data and a clock to produce a signal for driving the light emitting element 100. The LD driving unit 102 receives an output from the data receiving unit 101. The LD driving unit 102 is controlled by a control signal produced by the control signal generation unit 106 for automatic light power control so as to drive the light emitting element (LD) 100. The data receiving unit 101 and the LD driving unit 102 constitute a main signal unit 108 together.

The reference voltage generation unit 103 generates a reference voltage for automatic light power control from a reference signal as an output signal from the data receiving unit 101. The light receiving element (PD; Photo Diode) 104 converts a monitoring light outputted from the light emitting element 100 into an electric signal again. The monitoring voltage conversion unit 105 voltage-converts a monitoring signal as an output current from the light receiving element 104 so as to produce a monitoring voltage for automatic light power control.

The difference voltage generation unit 106 produces a difference in output voltages between the reference voltage generation unit 103 and the monitoring voltage conversion unit 105. The control signal generation unit 107 produces an LD driving control signal for automatic light power control according to the output of the difference voltage generation unit 106. The reference voltage generation unit 103, the monitoring voltage conversion unit 105, the difference voltage generation unit 106 and the control signal generation unit 107 constitute an automatic light power control unit (APC unit) 109 together.

Detailed configuration of each of the LD driving unit 102, the difference voltage generation unit 106 and the control signal generation unit 107 is shown in FIG. 23.

Specifically, the difference voltage generation unit 106 includes a differential amplifier. The control signal generation unit 107 includes a field effect transistor (T1) 107a, a capacitor (C1) 107b, a field effect transistor (T2) 107c and a resistor (R2) 107d.

The field effect transistor 107a supplies a current according to the output of the difference voltage generation unit 106. The capacitor 107b is connected to the field effect transistor 107a via a connector 107e. The capacitor 107b charges a current supplied from the field effect transistor 107a. A terminal voltage of the capacitor 107b is outputted as a control signal for the LD driving unit 102.

The field effect transistor 107c is placed in a conductive condition when a transmitting signal is ON. The resistor 107d causes the capacitor 107b to discharge excessive electric charges when a transmitting signal is ON.

In other words, the field effect transistor 107a and the capacitor 107b produce a control signal for the LD driving unit 102 according to an output from the difference voltage generation unit 106.

The LD driving unit 102 includes three field effect transistors (T11 to T13) 102a to 102c and a resistor (RL) 102d. An APC control signal from the control signal generation unit 107 is received by the transistor 102c. Data transmitted from the data receiving unit 101 is received by the transistors 102a and 102b. Then, a driving current signal having been subjected to automatic light power control is supplied to the light emitting element 100.

With the foregoing configuration, the light emitting element driving apparatus 110 shown in FIG. 22 controls a driving current of the light emitting element 100 based on a difference voltage between a reference voltage produced from a signal outputted from the data receiving unit 101 and a monitoring voltage produced from a monitoring signal outputted from the light receiving element 104, controls an output light of the light emitting element 100 to a constant level and outputs the output light to the optical transmission line.

In the control signal generation unit 107, if a transmitting signal (burst signal) is in an ON condition (transmission condition) [e.g., see points of time (t2) to (t4) of FIGS. 24(b) and 24(c)] after power input [see a point of time (t1) of FIG.

24(a)], the transistor 107c is switched ON. Accordingly, a control signal $V_{PCNT}$ for the LD driving unit 102 is controlled according to the light output control of a loop gain including the resistor 107d [see points of time (t2) to (t3) of FIG. 24(d)].

On the other hand, if the transmitting signal is in an OFF condition (non-transmission condition) [e.g., see points of time (t4) to (t5) of FIG. 24(b)], the transistor 107c is switched OFF. Accordingly, a control signal $V_{PCNT}$ produced during transmission [see points of time (t2) to (t4) of FIG. 24(b)] is held until a next burst transmission section [see a point of time (t5) and after of FIG. 24(b)] is reached.

FIG. 25 is a block diagram showing a light emitting element driving apparatus 110A where an APC loop is composed of a digital circuit. In the light emitting element driving apparatus 110A shown in FIG. 25, a light emitted from the light emitting element 111 in a rear direction is made incident on the light receiving element 112. The light receiving element 112 outputs a current proportional to its light intensity. This current is converted into a voltage by the amplifier 113 and then compared with a reference voltage Vref from a not-shown voltage source by a comparator 114.

An output voltage of the comparator 114 is set to a high level or a low level depending on a size relationship between both input voltages of the comparator 114. For example, if a voltage signal from the amplifier 113 is larger than the reference voltage Vref, the level of an output signal of the comparator 114 can be set low. If a voltage signal from the amplifier 113 is smaller than the reference voltage Vref, the level of an output signal of the comparator 114 can be set to an optical level.

An edge detector 115 detects an edge of a transmission switching signal as a transmission or non-transmission timing for a transmitting data (burst signal). In the case of a non-transmission timing for transmitting data, the edge detector 115 outputs a signal for placing a rear-stage up-and-down counter 116 in an enable condition. In the case of a transmission timing for transmitting data, the edge detector 115 outputs a signal for releasing the enable condition of the up-and-down counter 116.

During data transmission, the up-and-down counter 116 counts a comparing result from the comparator 114 in synchronization with a clock signal from an oscillator 117. For example, if a voltage signal from the amplifier 113 is larger than the reference voltage Vref, the up-and-down counter 116 counts down a count value. On the other hand, if a voltage signal from the amplifier 113 is smaller than the reference voltage Vref, the up-and-down counter 116 counts up a count value.

For example, if light intensity from the light emitting element 111 is weaker than a reference value, an output of the comparator 114 becomes low in level and the up-and-down counter 116 operates as an up-counter. When the edge detector 115 releases an enable signal supplied to the up-and-down counter 116 based on a timing signal T1 such as a transmission switching signal, the up-and-down counter 116 gradually increases its measuring values by means of a clock signal from the oscillator 117.

A counted output from the up-and-down counter 116 is converted into an analog amount by a D/A converter 118 and then outputted to a semiconductor laser driving unit 119. The semiconductor laser driving unit 119 changes a driving current level for converting transmitting data of an electric signal into an optical signal according to an output of the D/A converter 118.

Therefore, during transmission of transmitting data, the up-and-down counter 116 functions as an up-counter until a voltage signal from the amplifier 113 exceeds the reference voltage Vref in size. As count values of the up-and-down counter 116 are gradually increased, light intensity from the light emitting element 111 is gradually increased and an output from the amplifier 113 is also increased.

When an output of the amplifier 113 exceeds the reference value Vref and a comparing result signal from the comparator 114 is reversed from a low level to a high level, the edge detector 115 detects a rising edge of an output from the comparator 114 and then outputs an enable signal to the up-and-down counter 116. Accordingly, the up-and-down counter 116 is placed in an enable condition to hold its count value and a driving current to be supplied to the light emitting element 111 is also held therein.

However, in the foregoing configuration for holding light power by the analog circuit which uses a MOS element or the like shown in FIG. 22, it is difficult to prevent a reduction in performance caused by a drain leak current or the like of the MOS element.

In other words, in the light emitting element driving apparatus 110 shown in FIG. 22, during non-transmission of transmitting data, regardless of the necessity of holding a voltage, the capacitor 107c is further charged because of the occurrence of a leaked current [see points of time (t4) to (t5) of FIG. 24(d)] from the transistor 107a.

In such a case, a current more than necessary is discharged at the head of a next burst transmitting signal. Consequently, the light emitting element 100 may be driven by an excessive current to cause an output optical level to exceed a reference level [see a point of time (t5) of FIG. 24(f)].

Charging of the capacitor 107c by such a leaked current is more conspicuous as an interval with the next burst transmitting signal is longer (longer holding time). Consequently, fluctuation may occur in power at the head of the next burst transmitting signal to make it impossible to meet pulse mask standard.

If a capacitance of the capacitor 107c is increased in order to reduce the influence of power fluctuation caused by the leaked current, a charging time for the capacitor 107b may be slowed down. Thus, an initial rising time of a control signal $V_{PCNT}$ by the control signal generation unit 107 at the head of a first burst may also be slowed down.

A current of the transistor 107a may be increased to make faster an initial rising time. In this case, however, the transistor size itself of the field effect transistor 107a must be increased. Consequently, a leaked current of the transistor 107a is increased more, which makes it impossible to prevent power fluctuation at the head of the next burst transmitting signal.

As apparent from the foregoing, in the light emitting driving apparatus 110 shown in FIG. 22, the APC loop is composed of the analog circuit and thus if an error occurs in a control signal outputted from the control signal generation unit 107, light power fluctuation may directly occur.

On the other hand, by composing an APC loop of a digital circuit as in the case of the light emitting element driving apparatus 110A shown in 25, it is possible to prevent light output power fluctuation caused by the foregoing configuration where the APC loop is composed of the analog circuit.

In other words, the light emitting driving apparatus 110A shown in FIG. 25 prevents, by performing control to hold a driving current between burst signals based on a digital signal, power fluctuation like that which occurs at the head of a burst transmitting signal after long-time holding by a leaked current in the light emitting driving apparatus 110 shown in FIG. 22.

However, there is a problem inherent in the light emitting element driving apparatus 110A shown in FIG. 25. Specifically, at an initial rising time of a first burst signal after power input [see a point of time (t11) of FIG. 26(a)], the up-and-down counter 116 performs up-counting only by 1 bit each in synchronization with a clock signal and an output voltage of the D/A converter 118, i.e., an LD driving control signal, is raised only by an amount equal to resolution of the D/A converter 118, the resolution being 1 LSB. Consequently, unnecessary time is required until an optional stable light output level is reached [see points of time (t12) to (t13) of FIG. 26(d)].

Resolution of the D/A converter 118 may be increased to achieve a high speed for an APC initial rising time. In this case, however, the occurrence of errors during an APC normal operation is increased. Thus, a loop compression residual may occur, which leads to power fluctuation.

In the digital APC using the up-and-down counter 116, because of the unstable condition of an output of the comparator 114 during an APC loop unstable operation (after convergence), an unstable operation may occur.

Specifically, when light output power nearly reaches its objective power [see points of time (t13) to (t14) of FIG. 26(e)], near coincidence can also be reached between the reference voltage Vref and an output of the amplifier 113. However, because of the occurrence of offsets or noises in the reference voltage Vref [see points of time (t13) to (t14) of FIG. 27(a)] or a conversion error in the D/A converter 118, an output voltage of the comparator 114 becomes a high level or a low level in an unstable condition. Consequently, variance may occur. [see points of time (t13) to (t14) of FIG. 27(b)].

As described above, if variance occurs in outputs of the comparator 114 after light output power nearly reaches its objective power and the APC loop is completed, the up-and-down counter 116 performs up-counting or down-counting optionally and, consequently, an operation condition becomes unstable.

A control signal as an output signal of the D/A converter 118 for the semiconductor laser driving unit 119 is used for an operation performed for each resolution (1 LSB). Thus, when a count value of the up-and-down counter 116 becomes unstable, fluctuation also occurs in an output of the D/A converter 118 in the vicinity of an objective voltage [see points of time (t13) to (t14) of FIG. 27(c)]. Consequently, an unstable operation such as light power fluctuation may occur [see points of time (t13) to (t14) of FIG. 27(d)].

SUMMARY OF THE INVENTION

The present invention was made in order to solve the problems discussed above. It is an object of the invention to provide a light emitting element driving apparatus which enables a light output to rise at a high speed in the head portion of a burst signal to be first inputted and simultaneously secures a stable operation by preventing light power fluctuation even when light output power is stable (after APC loop completion) while supplying light outputs of a second burst signal after the first and signals thereafter in a stable manner irrespective of a holding time (time between burst signals).

According to an aspect of the present invention, there is provided a light emitting element driving apparatus having a driving unit which can drive a light emitting element by means of a driving signal while performing automatic light power control, the light emitting element being capable of converting an input electric signal containing data information into an optical signal. The light emitting element driving apparatus comprises a reference voltage generation unit for generating a reference voltage from the input electric signal, the reference voltage being used for obtaining a light output having specified power from the light emitting element in a normal condition, a monitoring voltage generation unit for producing a monitoring voltage signal corresponding to power of an optical signal outputted from the light emitting element, a light power control unit for comparing the reference voltage from the reference voltage generation unit with the monitoring voltage signal from the monitoring voltage generation unit and controlling, based on a result of the comparison, the driving unit by a discrete control amount such that a light output from the light emitting element can have the specified power and an initial value setting unit for setting a raising component as an initial value in a control signal having the discrete control amount supplied from the light power control unit to the driving unit.

The light emitting element of the present invention is advantageous in that because of the inclusion of the initial value setting unit, by setting a raising component as an initial value in a control signal having a discrete control amount supplied from the light power control unit to the driving unit, the control signal being used for performing light power control, even if there is a long time interval between a first burst signal immediately after power input and a subsequent second burst signal, light output power of the first burst immediately after power input can be raised at a high speed to be stable while supplying a stable light output by preventing light power fluctuation from occurring at the head of the second burst signal.

According to another aspect of the present invention, there is provided a light emitting element driving apparatus having a driving unit which can drive a light emitting element by means of a driving signal while performing automatic light power control, the light emitting element being capable of converting an input electric signal containing data information into an optical signal. The light emitting element driving apparatus comprises a reference voltage generation unit for generating a reference voltage from the input electric signal, the reference voltage being used for obtaining a light output having specified power from the light emitting element in a normal condition, a monitoring voltage generation unit for generating a monitoring voltage signal corresponding to power of an optical signal outputted from the light emitting element, a light power control unit for comparing the reference voltage from the reference voltage generation unit with the monitoring voltage signal from the monitoring voltage generation unit and controlling, based on a result of the comparison, the driving unit by a discrete control amount such that a light output from the light emitting element can have the specified power and a stability identification unit for identifying the degree of stability of driving control performed by the light power control unit for driving unit.

The light emitting element driving apparatus of the present invention is advantageous in that because of the inclusion of the stability identification unit, the degree of stability of driving control performed by the light power control unit for the driving unit can be identified. If a clock supplied to the light power control unit is controlled by using at least one selected from information regarding the stability identification and input data information, driving control performed by the light power control unit for the light emitting element can be stabilized. Even if there is a long time interval between a first burst signal immediately after power input and a subsequent second burst signal, an unstable operation of a light output after the completion of light power control can be prevented while supplying a stable light output by preventing light power fluctuation from occurring at the head of the second burst signal.

According to yet another aspect of the present invention, there is provided a light emitting element driving apparatus having a driving unit which can drive a light emitting element by means of a driving signal while performing automatic light power control, the light emitting element being capable of converting an input electric signal containing data information into an optical signal. The light emitting element driving apparatus comprises a reference voltage generation unit for generating a reference voltage from the input electric signal, the reference voltage being used for obtaining a light output having specified power from the light emitting element in a normal condition, a monitoring voltage generation unit for generating a monitoring voltage signal corresponding to power of an optical signal outputted from the light emitting element, a light power control unit for comparing the reference voltage from the reference voltage generation unit with the monitoring voltage signal from the monitoring voltage generation unit and controlling, based on a result of the comparison, the driving unit by a discrete control amount such that a light output from the light emitting element can have the specified power and a clock control unit for controlling a clock supplied to the light power control unit so as to stabilize driving control performed by the light power control unit for the light emitting element.

The light emitting element driving apparatus of the present invention is advantageous in that the inclusion of the clock control unit enables clock control to be performed for the light power control unit without receiving any transmission switching signal or the like for identifying transmission/non-transmission of a transmitting signal from the outside and thus the number of pins can be reduced when the light emitting element driving apparatus is constructed by using, for instance an IC (Integrated Circuit). Also, since it is not necessary to produce any signals for identifying transmission/non-transmission of a transmitting signal in a signal processing system for performing signal processing concerning the transmitting signal, a system configuration can be simplified.

According to further aspect of the present invention, there is provided a light emitting element driving apparatus having a driving unit which can drive a light emitting element by means of a driving signal while performing automatic light power control, the light emitting element being capable of converting an input electric signal containing data information into an optical signal. The light emitting element driving apparatus comprises a reference voltage generation unit for generating a reference voltage from the input electric signal, the reference voltage being used for obtaining a light output having specified power from the light emitting element in a normal condition, a monitoring voltage generation unit for generating a monitoring voltage signal corresponding to power of an optical signal outputted from the light emitting element, a light power control unit for comparing the reference voltage from the reference voltage generation unit with the monitoring voltage signal from the monitoring voltage generation unit and controlling, based on a result of the comparison, the driving unit by a discrete control amount such that a light output from the light emitting element can have the specified power, a stability identification unit for identifying the degree of stability of driving control performed by the light power control unit for the driving unit and a clock control unit for controlling a clock supplied to the light power control unit by using at least one selected from stability identification information from the stability identification unit and data information to be inputted so as to stabilize driving control performed by the light power control unit for the light emitting element.

The light emitting element driving apparatus of the present invention is advantageous in that the inclusion of the stability identification unit makes it possible to identify the degree of stability of driving control performed by the light power control unit for the driving unit. If a clock supplied to the light power control unit is controlled by using at least one selected from stability identification information and input data information, driving control performed by the light power control unit for the light emitting element can be stabilized. Furthermore, even if there is a long time interval between a first burst signal immediately after power input and a subsequent second burst signal, an unstable operation of a light output can be prevented after the completion of light power control while supplying a stable light output by preventing light power fluctuation from occurring at the head of the second burst signal.

BRIEF DESCRIPTION OF THE DRAWINGS

These and other objects, features and advantages of the present invention will become apparent upon reading of the following detailed description and drawings, in which:

FIGS. 12(a) to 12 (k) are time charts each illustrating an operation of the light emitting element driving apparatus of the fifth modified example of the first embodiment;

DESCRIPTION OF THE PREFERRED EMBODIMENTS

[a] Aspects of the Invention

First, aspects of the present invention will be described with reference to the accompanying drawings.

Figure 1:
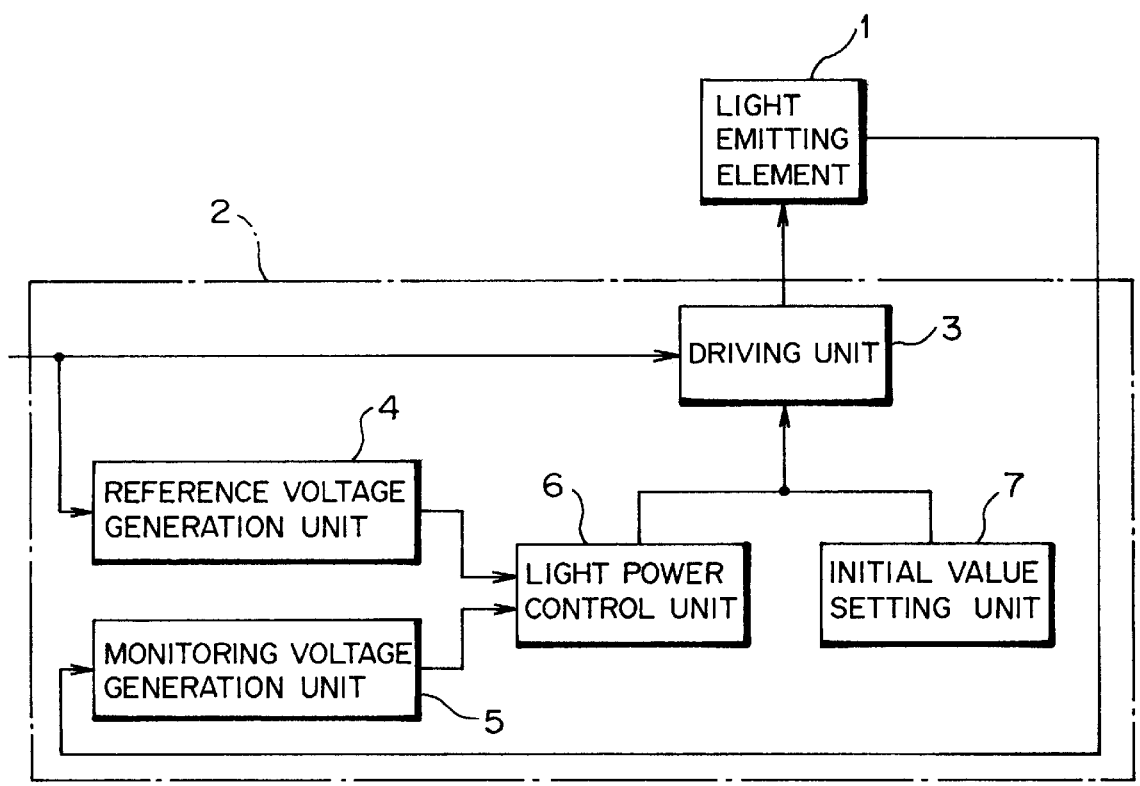
FIGS. 1 to 4 are block diagrams showing aspects of present invention.

FIG. 1 is a block diagram showing an aspect of the present invention. In FIG. 1, a reference numeral 1 denotes a light emitting element which can convert an input electric signal containing data information into an optical signal. A reference numeral 2 denotes a light emitting element driving apparatus. The light emitting element driving apparatus 2 comprises a driving unit 3, a reference voltage generation unit 4, a monitoring voltage generation unit 5, a light power control unit 6 and an initial value setting unit 7.

The driving unit 3 can drive the light emitting element 1 by means of a driving signal while performing automatic light power control. The reference voltage generation unit 4 generates a reference voltage from the input electric signal, the reference voltage being used for obtaining a light output having specified power from the light emitting element 1. The monitoring voltage generation unit 5 generates a monitoring voltage signal corresponding to power of an optical signal outputted from the light emitting element 1.

The light power control unit 6 compares the reference voltage from the reference voltage generation unit 4 with the monitoring voltage signal from the monitoring voltage generation unit 5 and controls, based on a result of the comparison, the driving unit 3 by a discrete control amount such that a light output from the light emitting element 1 can have the specified power.

The initial value setting unit 7 sets a raising component as an initial value in a control signal having the discrete control amount supplied from the light power control unit 6 to the driving unit 3. This initial value setting unit 7 can be constructed to set as the initial value a voltage signal equivalent to a driving current value used for obtaining a light output above a threshold current of the light emitting element 1 and below the specified power.

The light power control unit can be constructed to include a comparison unit for comparing the reference voltage from the reference voltage generation with the monitoring voltage signal from the monitoring voltage generation unit, an up-and-down counter circuit for performing up-counting/down-counting for a result of comparison from the comparison unit in synchronization with a counting clock and a digital/analog conversion unit for converting into an analog amount a count value obtained by up-counting/down-counting performed by the up-counting/down-counting counter circuit and outputting the same as a control signal having the discrete control amount.

The initial value setting unit can be constructed by a presetting unit for directly presetting a digital signal as a voltage signal to be used as the initial value in the up-and-down counter circuit.

The initial value setting unit can be constructed to include a voltage generation unit for generating a voltage signal used as the preset initial value and an analog/digital conversion unit for converting the voltage signal produced by the voltage generation unit into a digital signal. The digital signal from the analog/digital conversion unit is then preset in the up-and-down counter circuit of the light power control unit.

The initial value setting unit can be constructed to include a voltage generation unit for producing a voltage signal as the preset initial value and a voltage adding circuit for adding the voltage signal from the voltage generation unit to a control signal having the analog amount supplied from the digital/analog conversion unit to the driving circuit.

In this case, the voltage generation unit can be constructed to include a plurality of voltage sources for producing voltage signals different from one another and a switch for outputting a voltage signal from one selected from the plurality of voltage sources, the selected voltage source being capable of producing a voltage signal corresponding to a characteristic of the light emitting element.

The voltage generation unit may include a memory for storing as a digital signal information regarding the voltage signal used as the initial value and an analog/digital conversion unit for converting a value of the digital signal stored in the memory into an analog signal and outputting the same.

The initial value setting unit may include a memory for storing a digital signal as the voltage signal used as the initial value. The digital signal stored in the memory is then preset in the up-and-down counter circuit of the light power control unit.

The light power control unit may include a comparison unit for comparing the reference voltage from the reference voltage generation unit with the monitoring voltage signal from the monitoring voltage generation unit, an up-and-down counter circuit for performing up-counting/down-counting for a result of comparison from the comparison unit in synchronization with a counting clock and a counter value/current value converting circuit for producing a current signal corresponding to a count value from the up-and-down counter circuit and outputting the same as a control signal having the discrete control amount. The driving unit may be constructed to produce a driving signal for the light emitting element by using the input electric signal containing the data information and the current signal from the counter value/current value converting circuit.

In this case, the initial value setting unit can be constructed by presetting a raising component as an initial value in the current signal outputted from the counter value/current value converting circuit.

As described above, according to the light emitting element driving apparatus of the present invention, the initial value setting unit is provided and a raising component as an initial value is set in a control signal having a discrete control amount for light power control, the control signal being supplied from the light power control unit to the driving unit. Accordingly, even if there is a long time interval between a first burst signal immediately after power input and a subsequent second burst signal, power of a light output in the first burst signal immediately after power input can be raised at a high speed and stabilized while supplying a stable light output by preventing light power fluctuation from occurring at the head of the second burst signal.

Furthermore, according to the present invention, because of the inclusion of the memory in the initial value setting unit, in addition to the foregoing advantage, a digital value as an optimal initial value can be set according to the kind of an LD or the like and thus initial value setting for each used LD can be facilitated.

Figure 2:
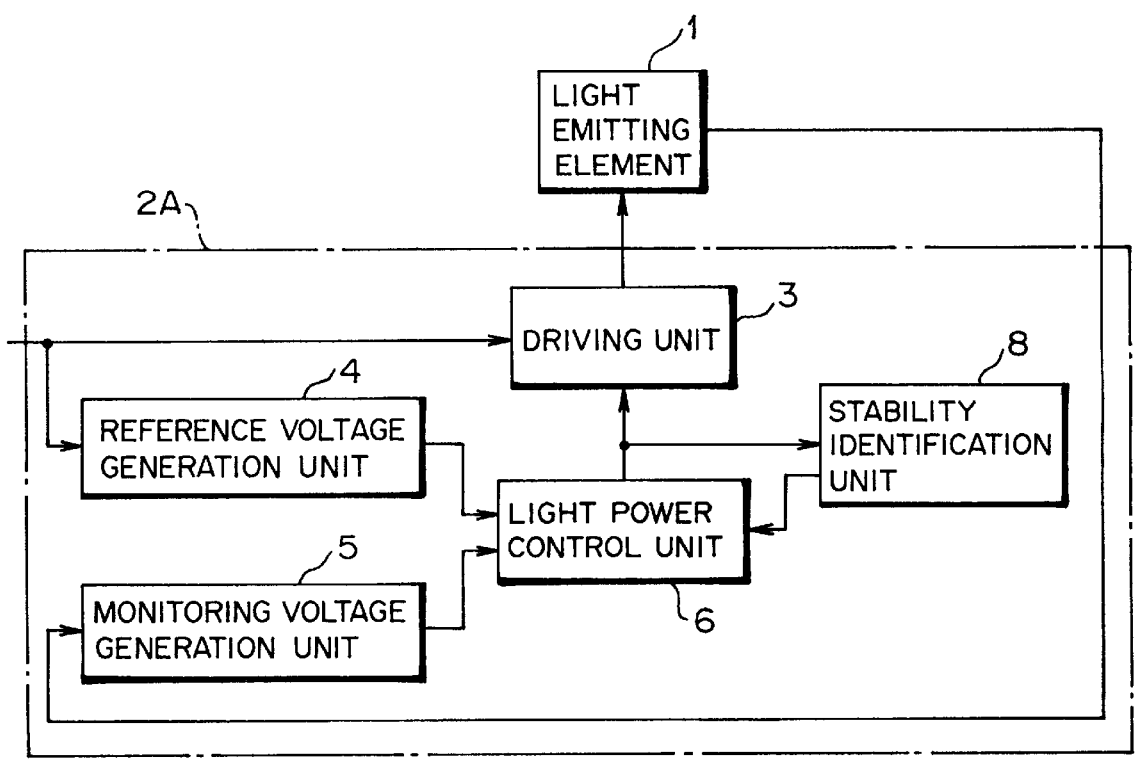

FIG. 2 is a block diagram showing an aspect of the present invention. In FIG. 2, a reference numeral 1 denotes a light emitting element which can convert an input electric signal containing data information into an optical signal. A reference numeral 2A denotes a light emitting element driving apparatus. The light emitting element driving apparatus 2A comprises a driving unit 3, a reference voltage generation unit 4, a monitoring voltage generation unit 5, a light power control unit 6 and a stability identification unit 8.

The driving unit 3 can drive the light emitting element 1 by means of a driving signal while performing automatic light power control. The reference voltage generation unit 4 generates a reference voltage from the input electric signal, the reference voltage being used for obtaining a light output having specified power from the light emitting element 1 in a normal condition. The monitoring voltage generation unit 5 generates a monitoring voltage signal corresponding to power of an optical signal outputted from the light emitting element 1.

The light power control unit 6 compares the reference voltage from the reference voltage generation unit 4 with the monitoring voltage signal from the monitoring voltage generation unit 5 and controls, based on a result of the comparison, the driving unit 3 by a discrete control amount such that a light output from the light emitting element 1 can have the specified power. The stability identification unit 8 identifies a degree of stability of driving control performed by the light power control unit 6 for the driving unit 3.

In this case, the light power control unit 6 may include a comparison unit for comparing the reference voltage from the reference voltage generation unit 4 with the monitoring voltage signal from the monitoring voltage generation unit 5, an up-and-down counter circuit for performing up-counting/down-counting for a result of comparison from the comparison unit in synchronization with a counting clock and a digital/analog conversion unit for converting into an analog amount a count value obtained by up-counting/down-counting performed by the up-and-down counter circuit and outputting the same as a control signal having the discrete control amount.

The stability identification unit 8 may include a first hysteresis comparison unit for performing comparison for the monitoring voltage signal from the monitoring voltage generation unit 5 with a first hysteresis characteristic based on the reference voltage from the reference voltage generation unit 4, a second hysteresis comparison unit for performing comparison for the monitoring voltage signal from the monitoring voltage generation unit 5 with a second hysteresis characteristic different from the first hysteresis characteristic based on the reference voltage from the reference voltage generation unit 4, and a determination unit for determining, based on a results of comparison from the first and second hysteresis comparison units, the completion of driving control performed by the driving unit 3 for the light emitting element and outputting a result of determination as the stability identifying result. If the completion of driving control performed by the light power control unit 6 for the driving unit 3 is determined based on the stability identifying result from the determination unit, the clock inputted to the light power control unit 6 is stopped.

The stability identification unit 8 can be constructed to include a window comparator for determining whether a potential difference between the reference voltage from the reference voltage generation unit 4 with the monitoring voltage signal from the monitoring voltage generation unit 5 is within a specified range or not and outputting a result of its determination as the stability identifying result. If the completion of driving control performed by the light power control unit 6 for the driving unit 3 is determined based on a result of comparison from the window comparator, the clock inputted to the light power control unit 6 is stopped.

The stability identification unit 8 can be constructed to include a level holding unit for holding a level of the comparison result from the comparison unit by an amount equal to a plurality of continuous bits and an equal level determination unit for determining, based on the level of the comparison result from the comparison unit and the level of the comparison result equivalent to the plurality of bits from the level holding unit, equality among all comparison result levels of at least 3 continuous bits and outputting a result of its determination as the stability identifying result. If equality among the comparison result levels of at least 3 continuous bits is determined based on the stability identifying result from the equal level determination unit, the clock inputted to the light power control unit is stopped.

As described above, according to the light emitting element driving apparatus of the present invention, the stability identification unit is provided. Accordingly, a degree of stability of driving control performed by the light power control unit for the driving unit can be identified. If a clock supplied to the light power control unit is controlled by using at least one selected from information regarding the stability identification and input data information, driving control performed by the light power control unit for the light emitting element can be stabilized. Even if there is a long time interval between a first burst signal immediately after power input and a subsequent second burst signal, an unstable operation of a light output after the completion of light power control can be prevented while supplying a stable light output by preventing light power fluctuation from occurring at the head of the second burst signal.

Figure 3:
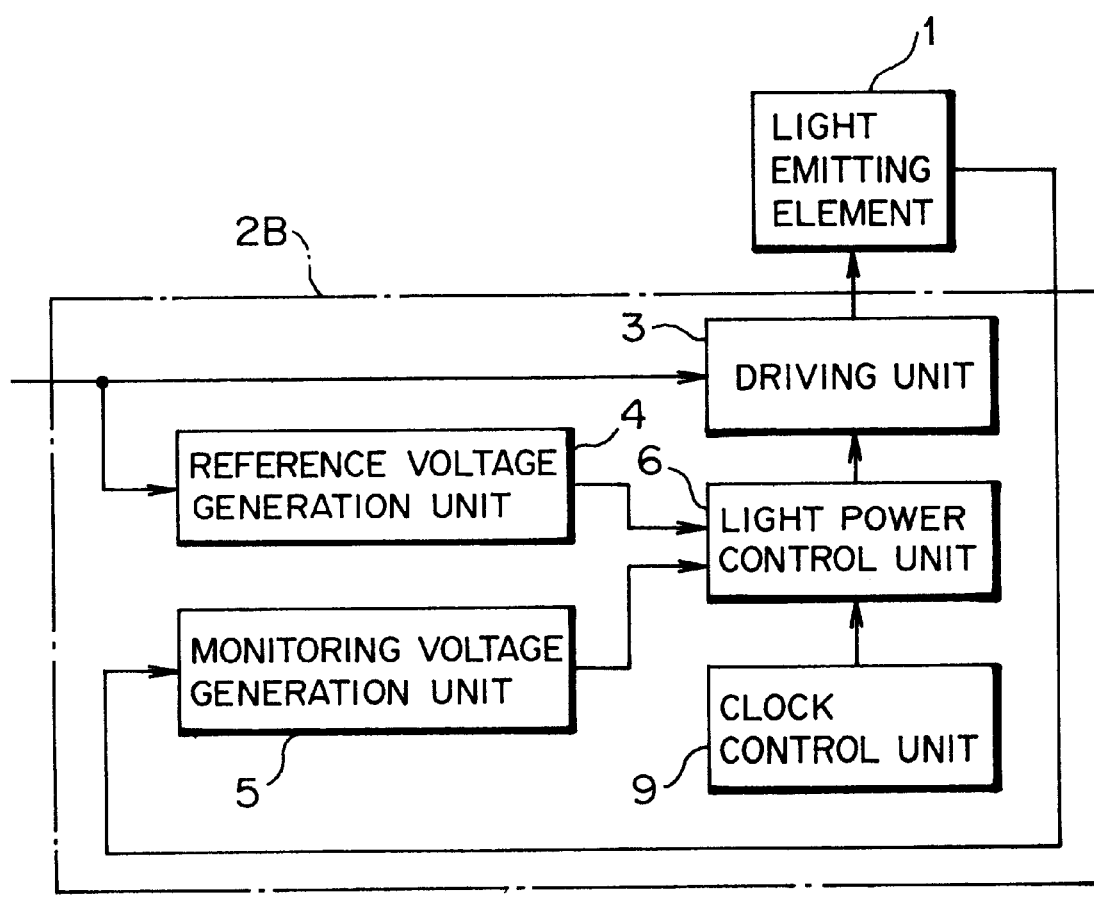

FIG. 3 is a block diagram showing an aspect of the present invention. In FIG. 3, a reference numeral 1 denotes a light emitting element which can convert an input electric signal containing data information into an optical signal. A reference numeral 2B denotes a light emitting element driving apparatus. The light emitting element driving apparatus 2B comprises a driving unit 3, a reference voltage generation unit 4, a monitoring voltage generation unit 5, a light power control unit 6 and a clock control unit 9.

The driving unit 3 can drive the light emitting element 1 by means of a driving signal while performing automatic light power control. The reference voltage generation unit 4 generates a reference voltage from the input electric signal, the reference voltage being used for obtaining a light output having specified power from the light emitting element 1 in a normal condition. The monitoring voltage generation unit 5 generates a monitoring voltage signal corresponding to power of an optical signal outputted from the light emitting element 1.

The light power control unit 6 compares the reference voltage from the reference voltage generation unit 4 with the monitoring voltage signal from the monitoring voltage generation unit 5 and controls, based on a result of the comparison, the driving unit 3 by a discrete control amount such that a light output from the light emitting element 1 can have the specified power. The clock control unit 9 controls, in order to stabilize driving control performed by the light power control unit 6 for the light emitting element 1, the clock supplied to the light power control unit 6.

In this case, the light power control unit 6 can be constructed to include a comparison unit for comparing the reference voltage from the reference voltage generation unit 4 with the monitoring voltage signal from the monitoring voltage generation unit 5, an up-and-down counter circuit for performing up-counting/down-counting for a result of comparison from the comparing unit in synchronization with a counting clock and a digital/analog conversion unit for converting into an analog amount a count value obtained by up-counting/down-counting performed by the up-and-down counter circuit and outputting the same as a control signal having the discrete control amount.

The clock control unit 9 can be constructed to include a data detecting unit for detecting the existence of data information to be transmitted and a switch unit for supplying the clock to the light power control unit 6 if the existence of data information to be transmitted is detected by the data detection unit and stopping supplying of the clock to the light power control unit 6 if non-existence of data information to be transmitted is detected by the data detection unit.

As described above, according to the light emitting element driving apparatus of the present invention, the clock control unit is provided. Accordingly, control of a clock supplied to the light power control unit can be performed without receiving any switching signals or the like from the outside for identifying transmission/non-transmission of a transmitting signal and thus the number of pins can be reduced if the light emitting element driving apparatus is constructed by using, for instance an IC (Integrated Circuit). Also, since it is not necessary to produce any signals for identifying transmission/non-transmission of a transmitting signal in a signal processing system for performing signal processing concerning the transmitting signal, a system configuration can be simplified.

Figure 4:
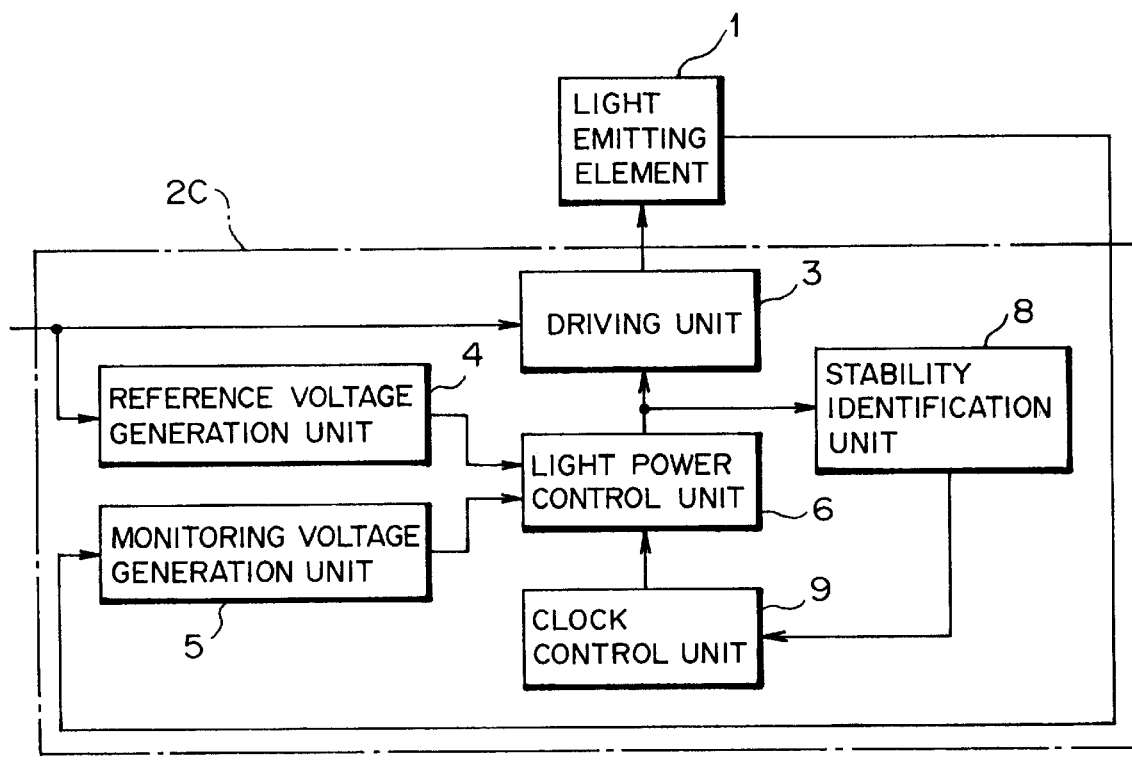

FIG. 4 is a block diagram showing an aspect of the present invention. In FIG. 4, a reference numeral 1 denotes a light emitting element which can convert an input electric signal containing data information into an optical signal. A reference numeral 2C denotes a light emitting element driving apparatus. The light emitting apparatus 2C comprises a driving unit 3, a reference voltage generation unit 4, a monitoring voltage generation unit 5, a light power control unit 6, a stability identification unit 8 and a clock control unit 9.

The driving unit 3 can drive the light emitting element 1 by means of a driving signal while performing automatic light power control. The reference voltage generation unit 4 generates a reference voltage from the input electric signal, the reference voltage being used for obtaining a light output having specified power from the light emitting element 1 in a normal condition. The monitoring voltage generation unit 5 generates a monitoring voltage signal corresponding to power of an optical signal outputted from the light emitting element 1.

The light power control unit 6 compares the reference voltage from the reference voltage generation unit 4 with the monitoring voltage signal from the monitoring voltage generation unit 5 and controls, based on a result of the comparison, the driving unit 3 by a discrete control amount such that a light output from the light emitting element 1 can have the specified power.

The stability identification unit 8 identifies a degree of stability of driving control performed by the light power control unit 6 for the driving unit 3. The clock control unit 9 controls, in order to stabilize driving control performed by the light power control unit 6 for the light emitting element 1, the clock supplied to the light power control unit 6 by using at least one selected from stability identification information from the stability identification unit 8 and input data information.

In this case, the clock control unit 9 can be constructed to include a data detection unit for detecting the existence of data information to be transmitted and a switch unit for stopping supplying of the clock to the light power control unit 6 if the existence of data information to be transmitted is detected by the data detection unit and the completion of driving control performed by the light power control unit 6 for the driving unit 3 is determined based on the stability identifying result from the stability identification unit 8, and alternatively if non-existence of data information to be transmitted is detected by the data detection unit.

As described above, according to the light emitting element driving apparatus of the present invention, the stability identification unit is provided. Accordingly, a degree of stability of driving control performed by the light power control unit for the driving unit can be identified. If a clock supplied to the light power control unit is controlled by using at least one selected from information regarding the stability identification and input data information, driving control performed by the light power control unit for the light emitting element can be stabilized. Furthermore, even if there is a long time interval between a first burst signal immediately after power input and a subsequent second burst signal, an unstable operation of a light output after the completion of light power control can be prevented while supplying a stable light output by preventing light power fluctuation from occurring at the head of the second burst signal.

[b] First Embodiment

In this section, the preferred embodiments of the present invention will be described with reference to the accompanying drawings.

Figure 5:
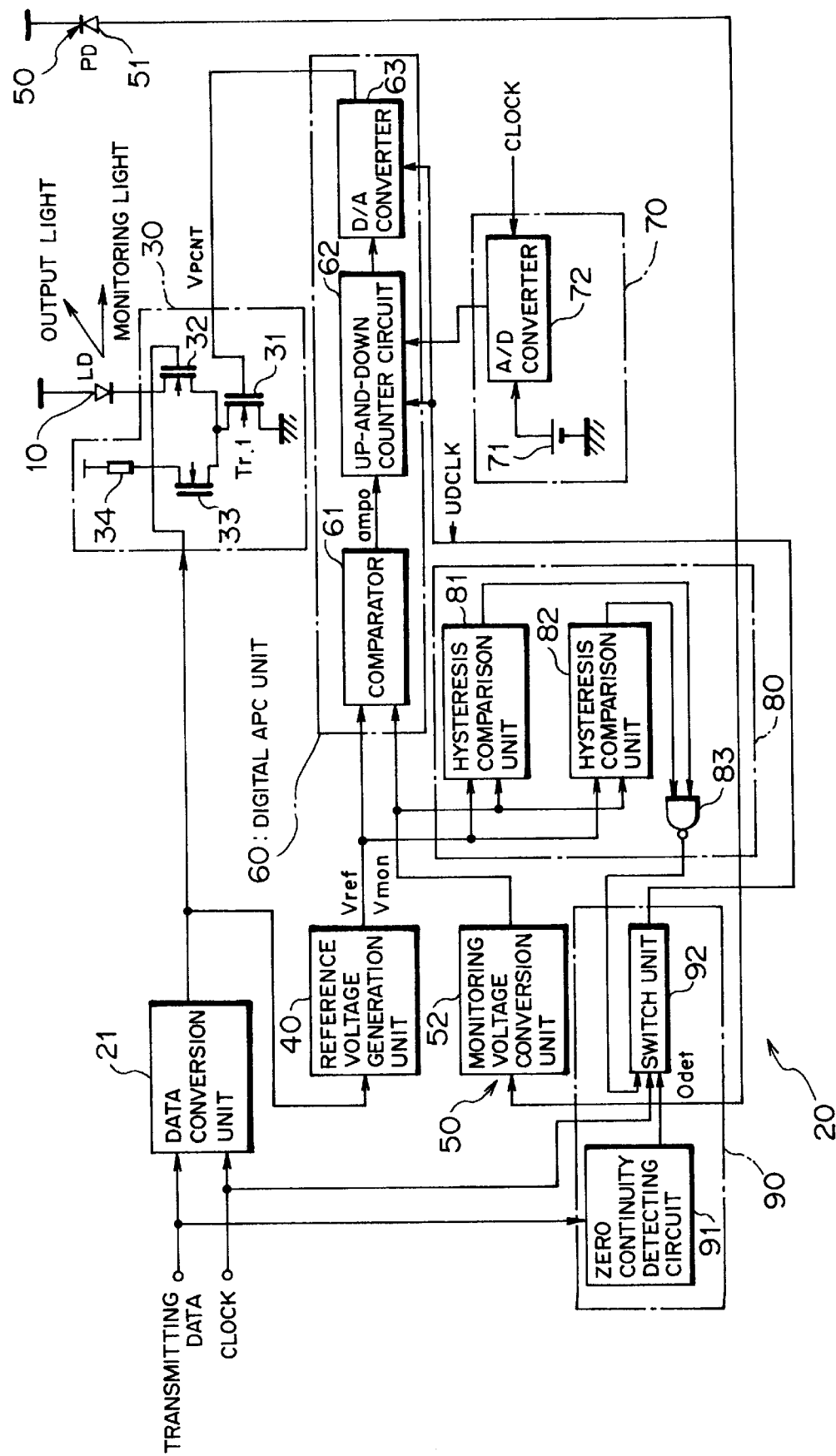
FIG. 5 is a block diagram showing a light emitting element driving apparatus of a first embodiment of the invention.

Referring first to FIG. 5 which is a block diagram, there is shown a light emitting element driving apparatus of the first embodiment of the present invention. In FIG. 5, a reference numeral 20 denotes a light emitting element driving apparatus which drive-controls a laser diode (LD) 10 under automatic light power control. The light emitting element driving apparatus 20 comprises a data conversion unit 21, a driving unit 30, a reference voltage generation unit 40, a monitoring voltage generation unit 50, a digital APC (Automatic Power Control) unit 60, an initial value setting unit 70, a stability identification unit 80 and a clock control unit 90.

The laser diode 10 converts an input electric signal containing data information into an optical signal. A converted optical signal can be transmitted, for instance through an optical transmission line.

A main signal data to be converted into an optical signal is inputted together with a clock to the data conversion unit 21. Based on such data information, the data conversion unit 21 converts the data into a signal (voltage signal) for driving the laser diode 10. The driving unit 30 produces, under later-described automatic light power control, a driving current signal for converting a signal outputted from the data conversion unit 21 into an optical signal and then outputting the same. The driving unit 30 includes three transistors 31 to 33 and a resistor 34.

Specifically, in the driving unit 30, a voltage signal supplied from the data conversion unit 21 for driving the laser diode 10 is inputted to the transistor 32. A control signal (voltage signal; $V_{PCNT}$) for automatic light power control is inputted to the transistor 31. Under automatic light power control performed by means of the control signal $V_{PCNT}$, the driving unit 30 produces a driving current signal for converting an output signal from the data conversion unit 21 into an optical signal and outputs the same to the laser diode 10. The laser diode 10 emits a light by light output power according to a value of the driving current signal.

Accordingly, signal processing is performed for the main signal by the data conversion unit 21 and the driving unit 30.

The reference voltage generation unit 40 generates, based on a signal (voltage signal) supplied from the data conversion unit 21 for driving the laser diode 10, a reference voltage $V_{ref}$ for automatic light power control, in other words a reference voltage for obtaining a light output having specified power from the light emitting element in a normal condition.

The monitoring voltage generation unit 50 generates a monitoring voltage signal $V_{mon}$ corresponding to power of an optical signal outputted from the laser diode 10. The monitoring voltage generation unit 50 includes a photodiode (PD) 51 and a monitoring voltage conversion unit 52.

The photodiode 51 receives a monitoring light outputted from the laser diode 10 and outputs a voltage signal according to a level of the monitoring light. The monitoring voltage conversion unit 52 performs, for a voltage signal indicating the level of the monitoring light outputted from the photodiode 51, level matching for comparison with the reference voltage from the reference voltage generation unit 40 in the rear-stage digital APC unit 60.

The digital APC unit (light power control unit) 60 compares the reference voltage $V_{ref}$ from the reference voltage generation unit 40 with the monitoring voltage signal $V_{mon}$ from the monitoring voltage generation unit 50 and controls, based on a result of the comparison, the driving unit 30 by a discrete control amount such that a light output from the laser diode 10 can have specified power. The digital APC unit 60 includes a comparator 61, an up-and-down counter circuit 62 and a D/A converter 63.

The comparator 61 as a comparison unit compares the reference voltage $V_{ref}$ from the reference voltage generation unit 40 with the monitoring voltage signal $V_{mon}$ from the monitoring voltage generation unit 50. The up-and-down counter circuit 62 performs up-counting/down-counting for a result of comparison ampo from the comparator 61 in synchronization with a counting clock UDCLK, The D/A converter (digital/analog conversion unit) 63 converts into an analog amount a count value [e.g., p (p; an integer of 2 or higher) by binary notation] obtained by up-counting/down-counting performed by the up-and-down counter circuit 62 and outputs the same as a control signal having a discrete control amount.

In other words, the up-and-down counter circuit 62 counts a result of comparison from the comparator 61 by using a clock inputted to the data conversion unit 21 as a counting clock. For example, if the monitoring voltage signal $V_{mon}$ is determined to be larger than the reference voltage $V_{ref}$ by the comparator 61, a count value is counted down. On the other hand, if the monitoring voltage signal $V_{mon}$ is determined to be smaller than the reference voltage $V_{ref}$ by the comparator 61, a count value is counted up.

A count value counted by the up-and-down counter circuit 62 is a digital value. The D/A converter 63 converts such a count value as a digital value into a voltage signal $V_{PCNT}$ of an analog amount and outputs to the driving unit 30 the same as a control signal having a discrete control amount (analog control amount changed discretely according to a count value).

The initial value setting unit 70 sets a raising component as an initial value in the control signal having the discrete control amount supplied from the D/A converter 63 of the digital APC unit 60 to the driving unit 30. The initial value setting unit 70 includes a voltage source 71 and an A/D converter 72.

The voltage source 71 as a voltage generation unit generates a voltage signal to be set as a raising initial value in the control signal supplied from the digital APC unit 60 to the driving unit 30.

The A/D converter 72 as an analog/digital conversion unit converts a voltage signal produced by the voltage source 71 into a digital signal. The digital signal obtained by conversion performed in the A/D converter 72 is preset as an initial count value in the up-and-down counter circuit 62.

In other words, when a clock (identical to a clock inputted to the data conversion unit 21) is inputted to the A/D converter 72 after power input for the light emitting element driving apparatus 20 of the first embodiment, a voltage signal from the voltage source 71 is converted into a digital signal and then given as an initial value to the preset input of the up-and-down counter circuit 62.

The stability identification unit 80 identifies a degree of stability of driving control performed by the digital APC unit 60 for the driving unit 30. Specifically, the stability identification unit 80 identifies variance in the outputs of the comparator 61 after automatic light power control is stabilized. The stability identification unit 80 includes hysteresis comparison units 81 and 82 and a NAND circuit 83.

The hysteresis comparison unit 81 as a first hysteresis comparison unit performs comparison for the monitoring voltage signal $V_{mon}$ from the monitoring voltage generation unit 50 with a first hysteresis characteristic based on the reference voltage from the reference voltage generation unit 40.

Specifically, the hysteresis comparison unit 81 can have a specified positive hysteresis width with respect to the reference voltage $V_{ref}$. For example, if the monitoring voltage signal $V_{mon}$ is within the hysteresis width, "0" is outputted. On the other hand, if the monitoring voltage signal $V_{mon}$ is outside the hysteresis width, "1" is outputted.

The hysteresis comparison unit 82 as a second hysteresis comparison unit performs comparison for the monitoring voltage signal $V_{mon}$ from the monitoring voltage generation unit 50 with a second hysteresis characteristic different from the first hysteresis characteristic based on the reference voltage from the reference voltage generation unit 40.

Specifically, the hysteresis comparison unit 82 can have a specified negative hysteresis width with respect to the reference voltage $V_{ref}$. For example, if the monitoring voltage signal $V_{mon}$ is within the hysteresis width, "0" is outputted. On the other hand, if the monitoring voltage signal $V_{mon}$ is outside the hysteresis width, "1" is outputted.

The NAND circuit 83 performs NAND operations for results of comparison from the hysteresis comparison units 81 and 82. For example, if the monitoring voltage signal $V_{mon}$ is within the positive hysteresis width or the negative hysteresis width with respect to the reference voltage $V_{ref}$, the NAND circuit 83 outputs a high level signal "1". If the monitoring voltage signal $V_{mon}$ is not within any of the positive and negative hysteresis widths, the NAND circuit 83 outputs a low level signal "0".

In other words, the NAND circuit 83 determines, based on the results of comparison from the hysteresis comparison units 81 and 82, a degree of stability of driving control performed by the driving unit 30 for the laser diode 10 (whether variance occurs or not after the completion of automatic light power control) and outputs the result of determination as a result of identifying the degree of stability of the driving control performed by the digital APC unit 60 for the driving unit 30. Thus, the NAND unit 83 functions as a determination unit.

The clock control unit 90 controls, in order to stabilize the driving control performed by the digital APC unit 60 for the laser diode 10, a clock supplied to the digital APC unit 60 by using at least one selected from stability identification information from the stability identification unit 80 and input data information. The clock control unit 90 includes a zero continuity detecting circuit 91 and a switch unit 92.

The zero connection detecting circuit 91 as a data detection unit detects the existence of data information to be transmitted by detecting the continuity of data "0" concerning data to be converted into an optical signal. A result of detection (0det) is outputted to the switch unit 92.

The switch unit 92 stops supplying of the clock to the digital APC unit 60 if the existence of data information to be transmitted is determined based on the detecting result (0det) from the zero continuity detecting circuit 91 and the completion of the driving control performed by the digital APC unit 60 for the driving unit 30 is determined based on the stability identifying result from the stability identification unit 80, and alternatively if non-existence of data information to be transmitted is detected.

Figure 6:
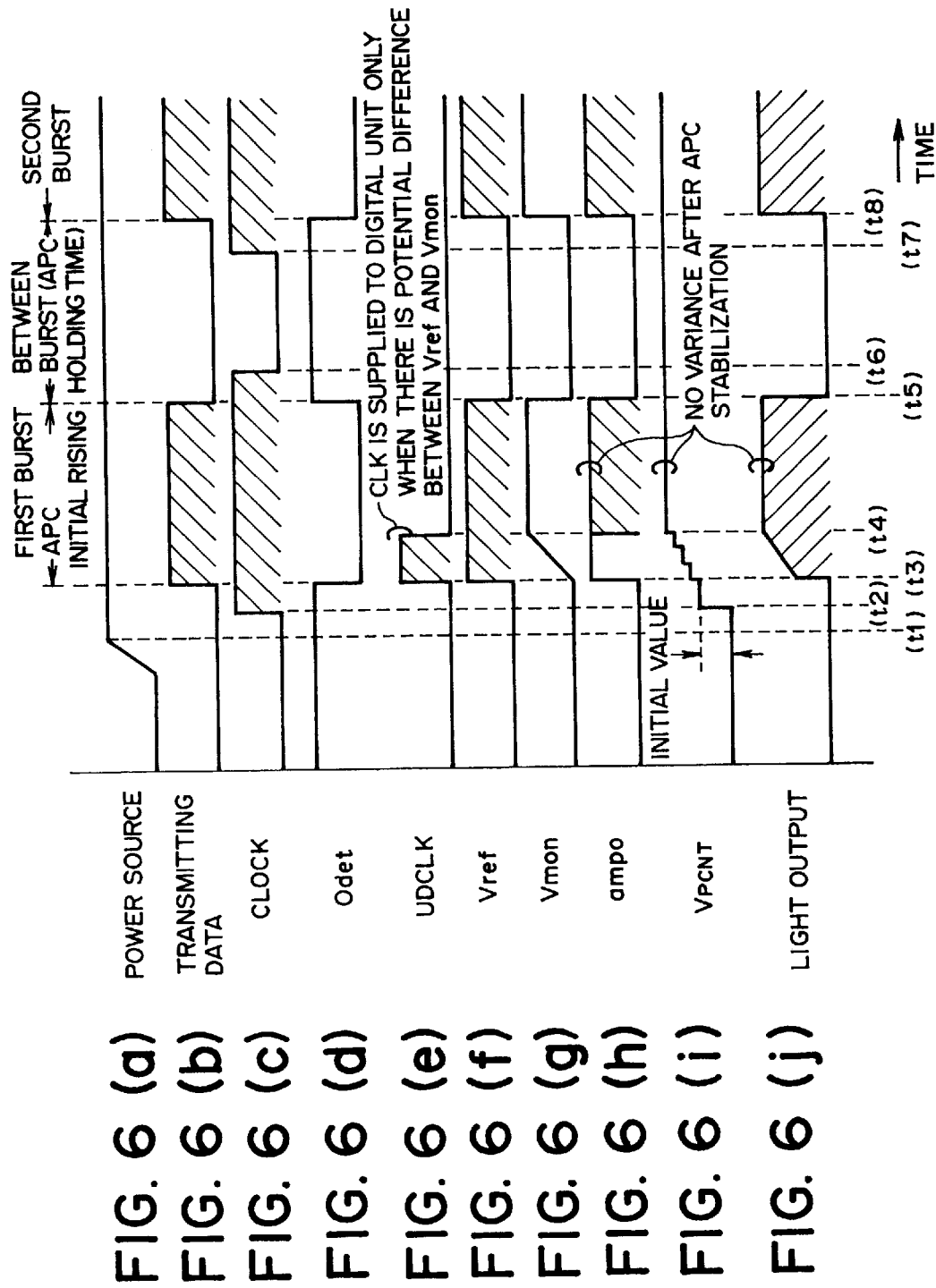
FIGS. 6(a) to 6(j) are time charts each illustrating an operation of the light emitting element driving apparatus of the first embodiment of the invention.

Next, an operation of the light emitting element driving apparatus 20 of the first embodiment of the present invention configured in the foregoing manner will be described by referring to a time chart shown in FIG. 6.

First, by driving the laser diode 10 as a light emitting element, power is inputted to the light emitting element driving apparatus 20 prior to transmission of data information [see a point time (t1) of FIG. 6(a)]. When a clock signal is inputted [see a point of time (t2) of FIG. 6(c)] after the power input, the A/D converter 72 converts a voltage value from the voltage source 71 into a digital signal and presets the same as an input to the up-and-down counter circuit 62.

Thus, an LD driving control voltage $V_{PCNT}$ supplied from the D/A converter 63 to the driving unit 30 becomes a voltage signal equivalent to the preset value after the power input [see a point of time (t2) of FIG. 6(i)]. The LD driving control voltage $V_{PCNT}$ (i.e., a voltage signal outputted from the voltage source 71) given as an initial value can be used to set a value equivalent to a driving current value which prevents the laser diode 10 from emitting lights [see points of time (t2) to (t3) of FIG. 6(j)].

Subsequently, when a first burst signal (first burst transmitting signal) is inputted after the power input [see points of time (t3) to (t5) of FIG. 6(b)], the digital APC unit 60 starts automatic light power control.

Specifically, if the input of the first burst signal after the power input is detected by the zero continuity detecting circuit 91 [see a point of time (t3) of FIG. 6(d)], until the hysteresis comparison units 81 and 82 of the stability identification unit 80 detect stabilizing of the monitoring voltage signal $V_{mon}$ within ± hysteresis widths of the reference voltage $V_{ref}$, the switch unit 92 of the clock control unit 90 switches a clock UDCLK to be inputted in order to supply the clock UDCLK to the up-and-down counter circuit 62 and the D/A converter 63 [see points of time (t3) to (t4) of FIG. 6(e)].

Then, the comparator 61 of the digital APC unit 60 compares the monitoring voltage signal $V_{mon}$ with the reference voltage $V_{ref}$. Since the monitoring voltage signal $V_{mon}$ is smaller than the reference voltage $V_{ref}$ at the time of the input of the first burst signal, the comparator 61 outputs an output voltage signal ampo of a low level ("0"). The up-and-down counter circuit 62 counts the result of comparison ampo from the comparator 61 in synchronization with a clock to be inputted [see points of time (t3) to (t4) of FIGS. 6(f) to 6(h)].

In this case, the up-and-down counter circuit 62 operates as an up-counter based on clock control performed by the clock control unit 90 until the monitoring voltage signal $V_{mon}$ is stabilized within ± hysteresis widths of the reference voltage $V_{ref}$.

The D/A converter 63 converts a discretely changed value from the up-and-down counter circuit 62 into a voltage signal $V_{PCNT}$ of an analog amount and outputs the same as an automatic light power control signal to the driving unit 30. In this case, the D/A converter 63 outputs the control signal $V_{PCNT}$ so as to raise light output power from the laser diode 10 until the monitoring voltage signal $V_{mon}$ is stabilized within ± hysteresis widths of the reference voltage $V_{ref}$.

In other words, the up-and-down counter circuit 62 performs up-counting until the monitoring voltage signal $V_{mon}$ and the reference voltage $V_{ref}$ nearly coincide with each other. The LD driving control signal $V_{PCNT}$ as a voltage outputted from the D/A converter 63 to the driving unit 30 is raised discretely by resolution (1 LSB) [see points of time (t3) to (t4) of FIG. 6(i)]. Thus, the driving unit 30 can drive the laser diode 10 such that light output power can reach a specified level [see points of time (t3) to (t4) of FIG. 6(j)].

Subsequently, after the monitoring voltage signal $V_{mon}$ has been stabilized within ± hysteresis widths of the reference voltage $V_{ref}$, the NAND circuit 83 of the stability identification unit 80 outputs a high level signal (signal indicating that stability has been identified, in other words, automatic light power control has been completed) as a stability identifying result.

Then, the switch unit 92 of the clock control unit 90 stops supplying of a clock UDCLK to the up-and-down counter circuit 62 and the D/A converter 63 to terminate a counting operation.

Even after the counting operation has been stopped, the up-and-down counter circuit 62 still holds a condition before the stopping of the counting operation for a count value. Accordingly, a value of the LD driving control voltage signal $V_{PCNT}$ outputted from the D/A converter 63 to the driving unit 30 is also held. In this way, an operation is prevented from becoming unstable after the completion of APC control.

In other words, assuming that automatic light power control is placed in its completed state, if the counting operation of the up-and-down counter circuit 62 is continued, an output from the comparator 61 will become unstable. Consequently, the counting operation of the up-and-down counter circuit 62 will also become unstable, which makes unstable driving control performed by the driving unit 30 for the laser diode 10. However, if the monitoring voltage signal $V_{mon}$ is within the hysteresis amounts of $V_{ref}\pm$hysteresis comparison units, the LD driving control voltage $V_{PCNT}$ can be held by stopping supplying of a clock UDCLK to the up-and-down counter circuit 62 and the D/A converter 63 and the operation after the completion of APC control can be prevented from becoming unstable [see points of time (t4) to (t5) of FIGS. 6(h) to 6(j)].

The zero continuity detecting circuit 91 of the clock control unit 90 identifies a section between burst signals (section where no burst signals are inputted) by detecting the continuance of a code "0" of input data by an amount of specified bits or more without using any external signals. Also, in this case, by stopping supplying of a clock to the D/A converter 63, the LD driving control voltage $V_{PCNT}$ can be held.

Subsequently, even if a burst signal as a transmitting signal is inputted again, the LD driving control signal $V_{PCNT}$ still holds its value. Accordingly, stable supplying of a light output can be performed without causing any light power fluctuation [see a point of time (t8) of FIGS. 6(i) and 6(j)].

As apparent from the foregoing, the light emitting element driving apparatus 20 of the first embodiment of the present invention is advantageous in the following respects. Even if there is a long time interval between a first burst signal immediately after power input and a subsequent second burst signal, a light output is stably supplied by preventing light power fluctuation from occurring at the head of the second burst signal. During this time, the initial value setting unit 70 sets a raising component as an initial value in a control signal $V_{PCNT}$ having a discrete control amount, the control signal $V_{PCNT}$ being supplied from the digital APC unit 60 to the driving unit 30 to be used for automatic light power control. The up-and-down counter circuit 62 starts its counting operation from the initial value. Accordingly, power of a light output in the first burst signal immediately after the power input can be raised at a high speed and stabilized.

The inclusions of the stability identification unit 80 and the clock control unit 90 enables a degree of stability to be identified for driving control performed by the digital APC unit 60 for the driving unit 30. A clock supplied to the digital APC unit 60 can be controlled by using at least one selected from information regarding the stability identification and input data information. Accordingly, driving control performed by the digital APC unit 60 for the laser diode 10 can be stabilized. Even if a noise signal or the like occurs in reference and monitoring signals after the completion of automatic light power control, an unstable operation of a light output can be prevented.

Furthermore, the clock control unit 90 can perform clock control for the digital APC unit 60 without receiving any external transmission switching signals or the like for identifying transmission/non-transmission of a transmitting signal such as a burst signal. Accordingly, the number of pins can be reduced when the light emitting element driving apparatus 20 is constructed by using, for instance an IC (Integrated Circuit). Since it is not necessary to produce any signals for identifying transmission/non-transmission of the transmitting signal in the signal processing system for performing signal processing concerning the transmitting signal, a system configuration can be simplified.

In the first embodiment, the stability identification unit 80 is constructed to include the hysteresis comparison units 81 and 82 respectively as first and second hysteresis comparison units and the NAND circuit 83 as a determination unit. However, there is no limitation for the construction of the stability identification unit 80. The functions of the two hysteresis comparison units 81 and 82 may be provided by using window comparators.

In other words, the functions of the two hysteresis comparison units 81 and 82 can be provided by two window comparators having windows (dead zones) equivalent to the respective hysteresis widths.

In this case, each window comparator determines whether a potential difference between the reference voltage from the reference voltage generation unit 40 and the monitoring voltage signal from the monitoring voltage generation unit 50 is within a specified range or not and then outputs a result of its determination as the stability identifying result.

Furthermore, in the NAND circuit 83 as a determination unit, if the completion of driving control performed by the digital APC unit 60 for the driving unit 30 is determined based on a result of comparison from the window comparator, supplying of a clock to the digital APC 60 is stopped.

[b1] First Modified Example of the First Embodiment

Figure 7:
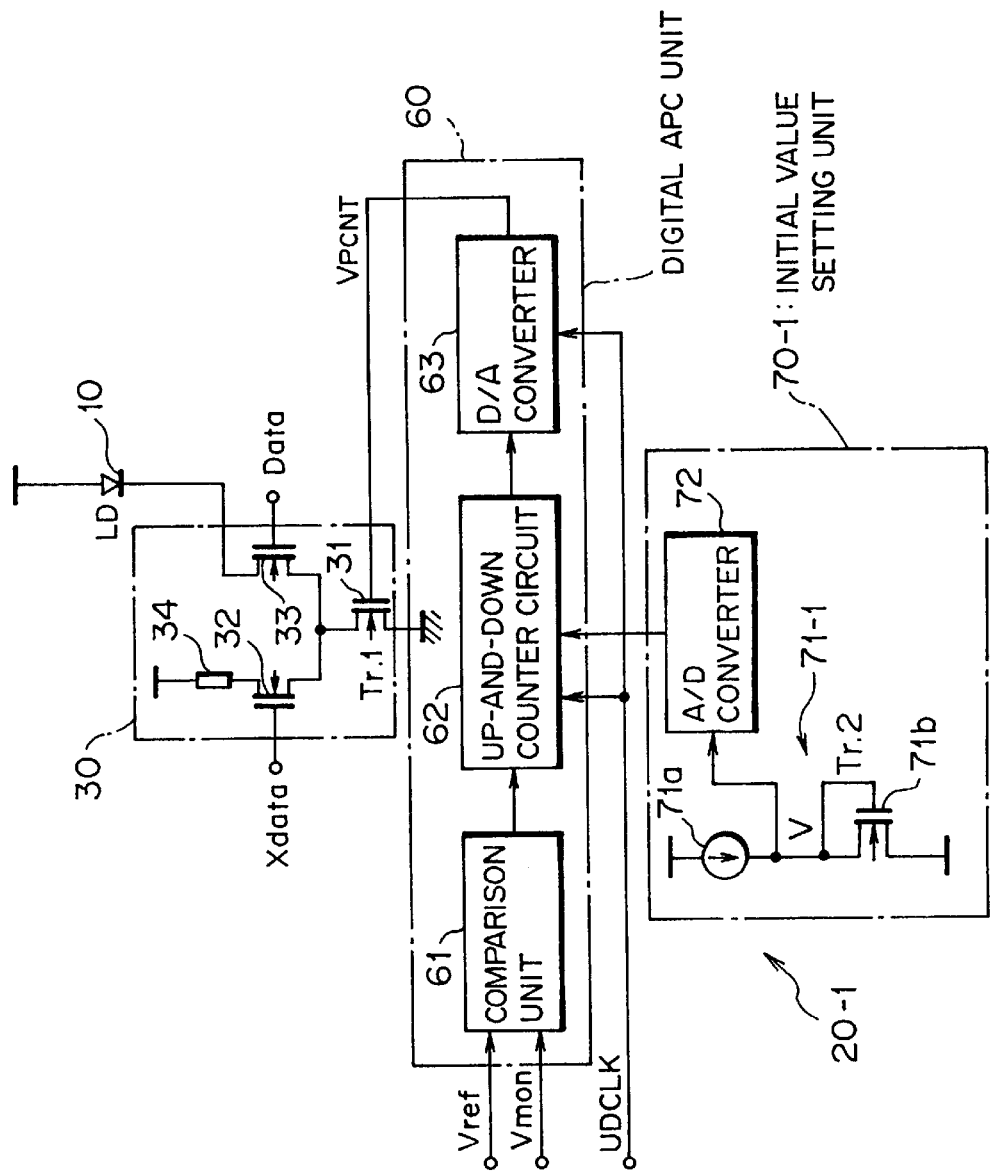
FIG. 7 is a block diagram showing main portions of a light emitting element driving apparatus of a first modified example of the first embodiment.

Referring now to FIG. 7 which is a block diagram, there are shown main portions of a light emitting element driving apparatus 20-1 of the first modified example of the first embodiment. The light emitting element driving apparatus 20-1 shown in FIG. 7 is different from the light emitting element driving apparatus 20 of the first embodiment only in construction between an initial value setting unit 70-1 and that of the latter. Other portions are basically the same and thus detailed description thereof will be omitted.

In FIG. 7, constituting elements of the apparatus other than the driving unit 30, the digital APC unit 60 and the initial value setting unit 70-1 are not shown. The same reference numerals in FIG. 7 as those in FIG. 5 respectively denote the same portions.

The initial value setting unit 70-1 shown in FIG. 7 sets a voltage signal in the up-and-down counter circuit 62 of the digital APC unit 60 as an initial value, the voltage signal V being equivalent to a driving current value for obtaining a light power which is above a threshold current $I_{th}$ of the laser diode 10 and below set light power. The initial value setting unit 70-1 includes a voltage generating circuit 71-1 as a voltage source and an A/D converter 72.

The voltage generating circuit 71-1 includes a current source 71a and a transistor (Tr2) 71b. The voltage generating circuit 71-1 generates a voltage signal equivalent to a driving current value for obtaining a light output which is above a minimum driving current (threshold current $I_{th}$) emitted from the laser diode 10 and the set light power.

The A/D converter 72 converts the voltage signal V (analog value) from the voltage generating circuit 71-1 into a digital signal and then sets (presets) a result of this conversion as an initial value in the up-and-down counter circuit 62 of the digital APC unit 60.

In the light emitting element driving apparatus 20-1 of the first modified example of the first embodiment configured in the foregoing manner, as in the case of the first embodiment, power is inputted for the light emitting element driving apparatus 20-1 prior to transmitting of data information with an optical signal by driving the laser diode 10 as a light emitting element. When a clock is inputted after the power input, the A/D converter 72 of the initial value setting unit 70-1 converts a voltage signal V into a digital signal, the voltage signal V being equivalent to a driving current value for obtaining a light output which is above a threshold current $I_{th}$ from the voltage generating circuit 71-1 and below set light power, and presets the same in the up-and-down counter circuit 62. Thus, light power in a first burst signal is raised to a specified level at a high speed and efficiently so as to quicken stabilizing of automatic light power control performed by the digital APC unit 60.

By forming the transistor 71b of the voltage generating circuit 71-1 and the transistor 31 of the driving unit 30 to be similar in size, fluctuation caused by process changes or the like is similar to each other. Accordingly, the digital APC unit 60 can be operated without deteriorating initial rising time in the first burst signal.

As apparent from the foregoing, the light emitting element driving apparatus 20-1 of the first modified example of the first embodiment of the present invention is advantageous in the following respects. The inclusion of the initial value setting unit 70-1 enables a voltage signal V (digital value) to be set as an initial value in a control signal $V_{PCNT}$ having a discrete control amount supplied from the digital APC unit 60 to the driving unit 30 and used for automatic light power control, the voltage signal V being equivalent to a driving current value for obtaining a light output which is above a threshold current $I_{th}$ of the laser diode 10 and below set light power. The up-and-down counter circuit 62 can start its counting operation from the initial value. Light output power in the first burst signal immediately after power input can be raised at a high speed and efficiently so as to greatly improve an automatic light power control function.

[b2] Second Modified Example of the First Embodiment

Figure 8:
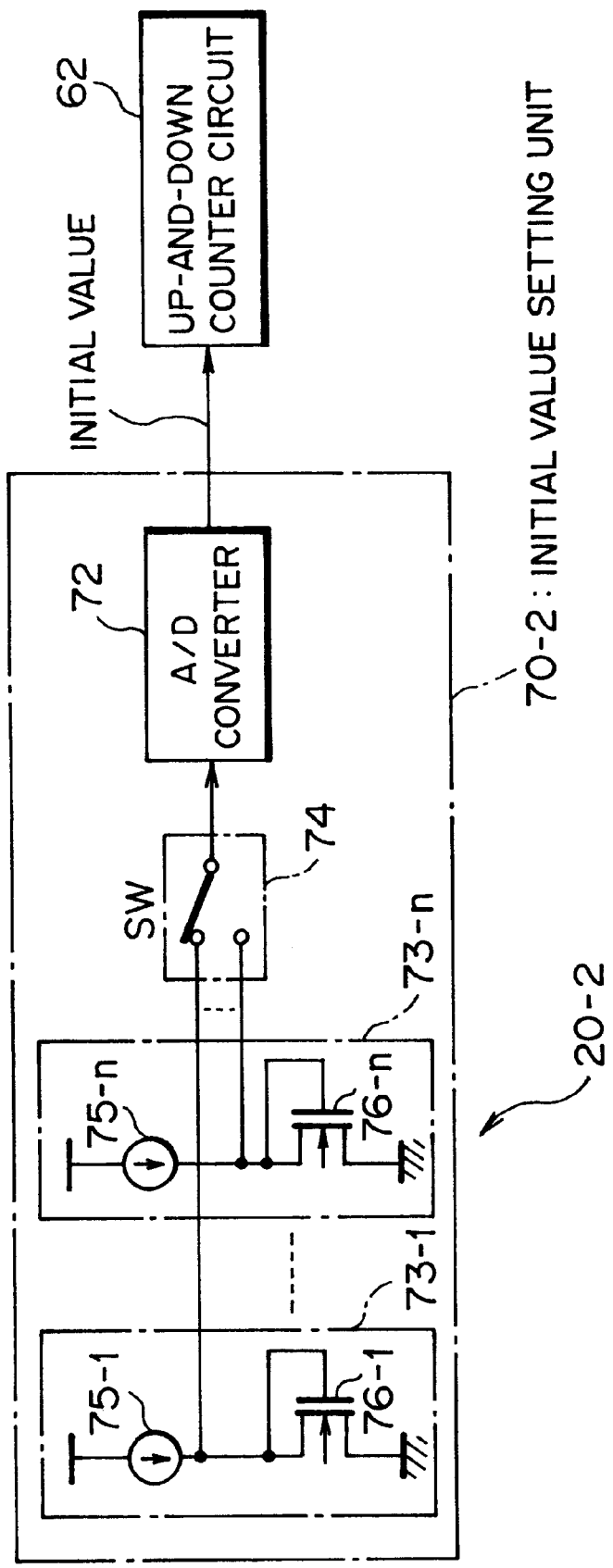
FIG. 8 is a block diagram showing main portions of a second modified example of a light emitting element driving apparatus of the first embodiment.

Referring to FIG. 8 which is a block diagram, there are shown main portions of a light emitting element driving apparatus 20-2 of the second modified example of the first embodiment. The light emitting element driving apparatus 20-2 shown in FIG. 8 is different from the light emitting element driving apparatus (reference numerals 20 or 20-1) shown in either FIG. 5 or FIG. 7 only in construction between an initial value setting unit 70-2 and that of the latter. Portions other then the initial value setting unit 70-2 are basically the same and thus detailed description thereof will be omitted.

In FIG. 8, constituting elements of the apparatus other than the up-and-down counter circuit 62 and the initial value setting unit 70-2 are not shown. The same reference numerals as those in FIG. 5 respectively denote the same portions.

The initial value setting unit 70-2 of the light emitting element driving apparatus 20-2 includes an A/D converter 72 basically similar to that of the first modified example of the first embodiment, voltage generating circuits 73-1 to 73-n (n; an integer of 2 or higher) as a plurality of voltage sources for producing voltage signals V different from one another and a switch 74.

The plurality of voltage sources 73-1 to 73-n generate voltage signals according to characteristics of the laser diode 10. By the rear stage switch 74, a voltage signal generated from any of the plurality of voltage generating circuits 73-1 to 73-n according to a used characteristic of the laser diode 10 is selectively outputted.

The voltage generating circuits 73-1 to 73-n generate voltage signals V different from one another according to threshold current characteristics of the laser diode 10, each of the voltage signals V being equivalent to a driving current value for obtaining a light output which is above a threshold current $I_{th}$ and below set light power. The voltage generating circuits 73-1 to 73-n respectively include current sources 75-1 to 75-n and transistors 76-1 to 76-n which function as load Nch (N channel) transistors different from one another in size.

Specifically, the switch 74 is set to output a voltage signal V selected from voltage signals generated by the voltage generating circuit 73-1 to 73-n according to a used characteristic of the laser diode 10, the selected voltage signal V being equivalent to a driving current value for obtaining a light output which is above the threshold value $I_{th}$ and the set light power. For example, if a used threshold value $I_{th}$ of the laser diode 10 is high, the switch 74 selects from the voltage generating circuits 73-1 to 73-n one for outputting a corresponding voltage signal.

Thus, in the initial value setting unit 70-2 in the second modified example of the first embodiment, a voltage signal V can be outputted to the driving unit 30 based on setting of the switch 74 irrespective of the kind of the laser diode 10, the voltage signal V being equivalent to a driving current value for obtaining a light output which is above a threshold current $I_{th}$ and below set light power. Accordingly, it is possible to deal with threshold currents $I_{th}$ varied according to the kind of the laser diode 10 used as a light emitting element.

In the light emitting element driving apparatus 20-2 of the second modified example of the first embodiment configured in the foregoing manner, as in the case of the first embodiment, power is inputted for the light emitting element 20-2, the laser diode 10 as a light emitting element is driven and thereby data information is converted into an optical signal and transmitted.

Specifically, when a clock is supplied after power input, the initial value setting unit 70-2 presets a voltage signal V as a digital value in the up-and-down counter circuit 62 based on setting of the switch 74 according to the kind of the used laser diode 10, the voltage signal V being equivalent to a driving current value for obtaining a light output which is above a threshold current $I_{th}$ and below set light power.

In other words, the switch 74 is set so as to output a voltage signal V from one of the voltage generating circuits 73-1 to 73-n to the A/D converter 72, the voltage generating circuits 73-1 to 73-n being capable of generating voltage signals V, each of which is equivalent to a threshold current $I_{th}$ of the used laser diode 10 and below set light power.

Then, a result of converting the voltage signal V into a digital value by the A/D converter 72 is preset in the count value of the up-and-down counter circuit 62. The driving unit 30 can supply a driving current equivalent to the voltage signal V to the laser diode 10 from the time of light power rising in the first burst signal. In other words, based on the initial value preset in the up-and-down counter circuit 62, light power in the first burst signal can be raised to a specified level at a high speed and efficiently irrespective of the kind of the used laser diode 10.

Furthermore, a characteristic of the laser diode 10 (kind, type or solid variance) is prevented from causing deterioration of light power initial rising control performed by the digital APC unit 60.

As apparent from the foregoing, the light emitting element driving apparatus 20-2 of the second modified example of the first embodiment of the present invention is advantageous in the following respects. The inclusion of the initial value setting unit 70-2 enables a voltage signal V to be set as an initial value in a control signal $V_{PCNT}$ having a discrete control amount supplied from the digital APC unit 60 to the driving unit 30 and used for automatic light power control irrespective of the kind of the used laser diode 10, the voltage signal V being equivalent to a driving current value for obtaining a light output which is above a threshold current $I_{th}$ and below set light power. Accordingly, during configuring of a transmission system, even if an optional laser diode is selected, by staring the counting operation of the up-and-down counter circuit 62 from the initial value, light power in the first burst signal immediately after power input can be raised at a high speed and efficiently irrespective of the kind, type or solid variance of the laser diode. In addition, a degree of freedom for configuring the system can be increased.

[b3] Third Modified Example of the First Embodiment

Figure 9:
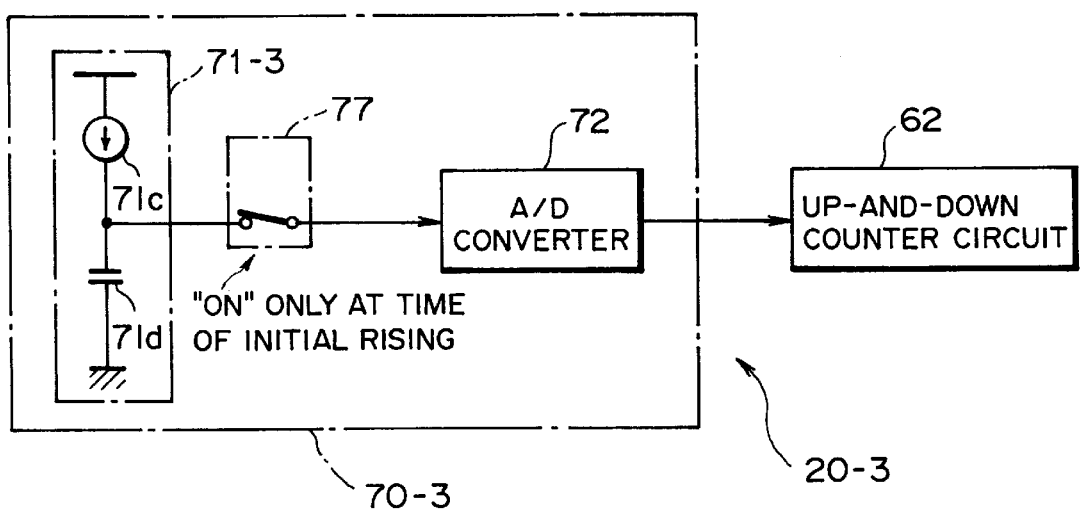
FIG. 9 is a block diagram showing main portions of a light emitting element driving apparatus of a third modified example of the first embodiment.

Referring to FIG. 9 which is a block diagram, there are shown main portions of a light emitting element driving apparatus 20-3 of the third modified example of the first embodiment. The light emitting element driving apparatus 20-3 shown in FIG. 9 is different from the light emitting element driving apparatus (reference numeral 20, 20-1 or 20-2) shown in any of FIGS. 5, 7 and 8 only in construction between an initial value setting unit 70-3 and that of the latter. Portions other than the initial value setting unit 70-3 are the same and thus detailed description thereof will be omitted.

In FIG. 9, the constituting elements other than the up-and-down counter circuit 62 and the initial value setting unit 70-3 are not shown, and the same reference numerals as those in FIG. 5 respectively denote the same portions.

The initial value setting unit 70-3 of the light emitting element driving apparatus 20-3 shown in FIG. 9 includes a voltage generation unit 71-3, a switch 77 and an A/D converter 72 basically similar to that in the first modified example of the first embodiment.

The voltage generation unit 71-3 includes a current source 71c and a capacitor 71d. The voltage generation unit 71-3 can function as a constant voltage source for providing output signals of constant voltages by charging the capacitor 71d by using a current outputted from the current source 71c.

The switch 77 is controlled to be ON only when a first burst signal is inputted (at the time of initial rising) immediately after power input for the light emitting element driving apparatus 20-3 and OFF in other cases. Accordingly, a voltage value from the voltage generation unit 71-3 is converted into a digital value by the A/D converter 72 only at the time of the initial rising and set as an initial value in the up-and-down counter circuit 62.

In the light emitting element driving apparatus 20-3 of the third modified example of the first embodiment configured in the foregoing manner, as in the case of the first embodiment, by driving the laser diode 10 as a light emitting element after power input for the light emitting element driving apparatus 20-3, data information is converted into an optical signal and then transmitted.

Specifically, after the power input, the switch 77 is turned ON. When a clock is subsequently inputted, the initial value setting unit 70-3 presets a voltage signal as an initial setting value converted into a digital value in the up-and-down counter circuit 62.

The D/A converter 63 converts a count value from the up-and-down counter circuit 62 into an analog signal and outputs the same as a driving control signal for the driving unit 30. Thus, light power rising can be made faster by an amount equivalent to the count value preset in the up-and-down counter circuit 62.

After an output of the comparator 61 has been stabilized and driving control performed by the digital APC unit 60 for the driving unit 30 has been completed, the switch 77 is turned OFF. However, the count value preset in the up-and-down counter circuit 62 is held. Accordingly, when a next burst signal (second burst signal) is inputted, by supplying an automatic light power control signal to the driving unit 30 based on the held count value, the laser diode 10 can be driven by stable light output power.

As apparent from the foregoing, the light emitting element driving apparatus 20-3 of the third modified example of the first embodiment of the present invention is advantageous in the following respects. The inclusion of the initial value setting unit 70-3 enables, as in the case of the first embodiment, a raising component to be set as an initial value in a control signal $V_{PCNT}$ having a discrete control amount supplied from the digital APC unit 60 to the driving unit 30 and used for automatic light power control. By causing the up-and-down counter circuit 62 to start its counting operation from the initial value, light output power in the first burst signal immediately after power input can be raised at a high speed and stabilized.

[b4] Fourth Modified Example of the First Embodiment

Figure 10:
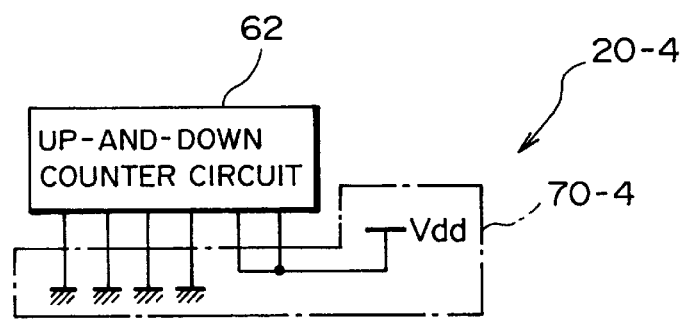
FIG. 10 is a block diagram showing main portions of a light emitting element of a fourth modified example of the first embodiment.

Referring to FIG. 10 which is a block diagram, there are shown main portions of a light emitting element driving apparatus 20-4 of the fourth modified example of the first embodiment. The light emitting element driving apparatus shown in FIG. 10 is different from the light emitting element driving apparatus (reference numeral 20 or 20-1 to 20-3) only in construction between an initial value setting unit 70-4 and that of the latter. Portions other than the initial value setting unit 70-4 are basically the same and thus detailed description thereof will be omitted.

In FIG. 10, the constituting elements of the apparatus other than the up-and-down counter circuit 62 and the initial value setting unit 70-4 are not shown.

The initial value setting unit 70-4 shown in FIG. 10 sets a count value as a preset input to the up-and-down counter circuit 62 such that a control signal $V_{PCNT}$ for automatic light control can become a digital value of a voltage signal equivalent to a driving current value for obtaining a light output which is above a threshold current of the laser diode 10 and below set light power. The initial value setting unit 70-4 functions as a presetting unit for directly presetting a digital signal as a voltage signal V to be used as the initial value in the up-and-down counter circuit 62.

Specifically, the initial value setting unit 70-4 presets each bit data constituting a count value in the up-and-down counter circuit 62 by grounding (GND; set bit data "0") or supplying a voltage Vdd (set bit data "1").

In the light emitting element driving apparatus 20-4 of the fourth modified example of the first embodiment configured in the foregoing manner, as in the case of the first embodiment, after power input for the light emitting element driving apparatus 20-4, by driving the laser diode 10 as a light emitting element, data information is converted into an optical signal and then transmitted.

In other words, when a clock is inputted after the power input, count value data outputted from the up-and-down counter circuit 62, the count value having been set therein as an initial value by the initial value setting unit 70-4 as a presetting unit, is converted into an analog signal by the D/A converter 63 and then outputted to the driving unit 30 as a control signal $V_{PCNT}$ for automatic light power control. Accordingly, the driving unit 30 can drive the laser diode 10 so as to raise light power in a first burst signal to a specified level at a high speed and efficiently.

As apparent from the foregoing, the light emitting element driving apparatus 20-4 of the fourth modified example of the first embodiment of the present invention is advantageous in the following respects. The inclusion of the initial value setting unit 70-4 enables, as in the case of the first embodiment, a raising component to be set as an initial value in a control signal $V_{PCNT}$ having a discrete control amount supplied from the digital APC unit 60 to the driving unit 30 and used for automatic light power control. By causing the up-and-down counter circuit 62 to start its counting operation from the initial value, light output power in a first burst signal immediately after power input can be raised at a high speed and stabilized. Further, a chip area can be reduced because it is not necessary to provide any A/D converters in an initialization setting unit.

[b5] Fifth Modified Example of the First Embodiment

Figure 11:
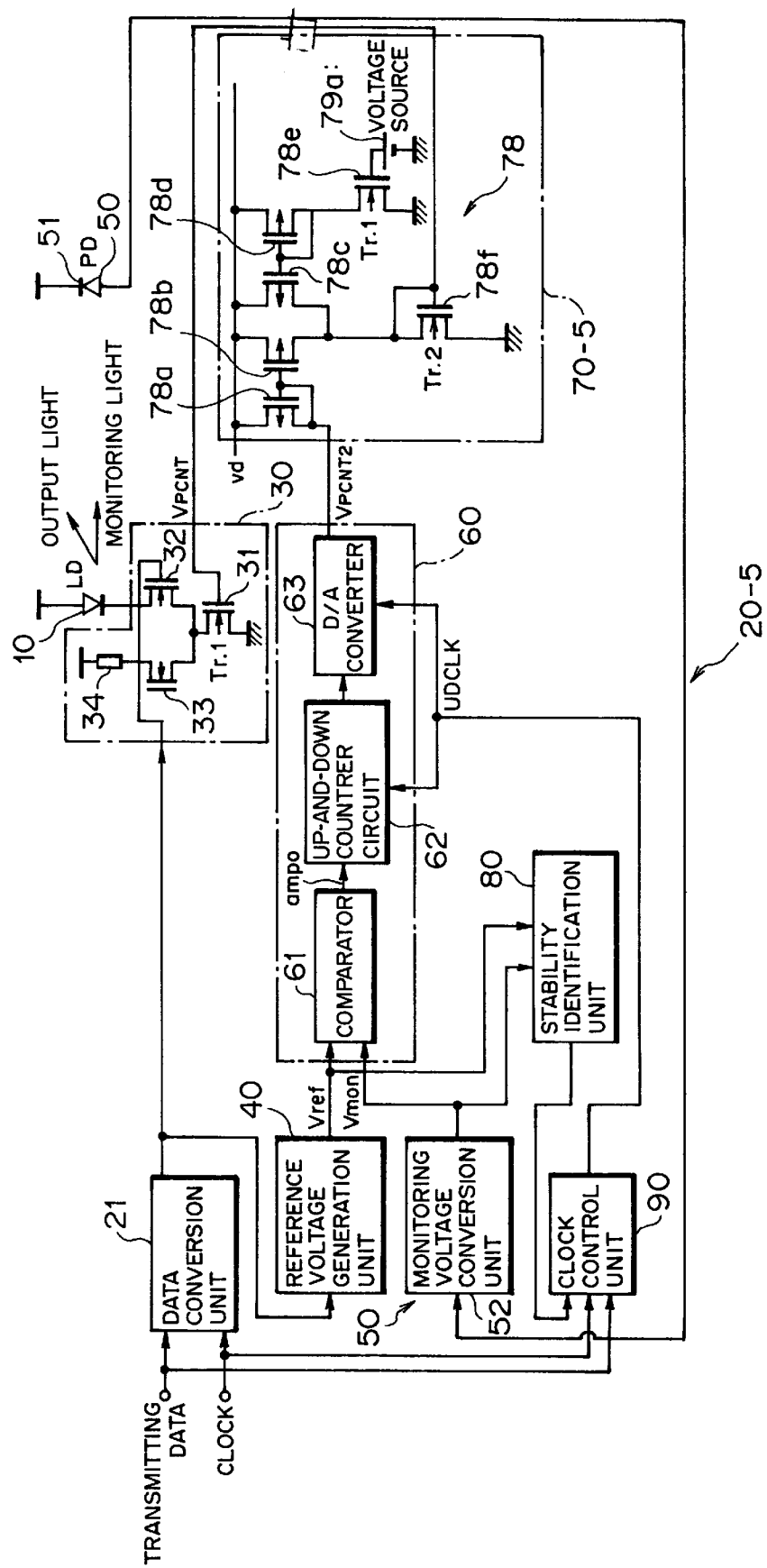
FIG. 11 is a block diagram showing a light emitting element driving apparatus of a fifth modified example of the first embodiment.

Referring to FIG. 11 which is a block diagram, there is shown a light emitting element driving apparatus 20-5 of the fifth modified example of the first embodiment. The light emitting element driving apparatus 20-5 shown in FIG. 11 comprises an initial value setting unit 70-5 different from those of the respective light emitting element driving apparatuses (reference numerals 20 and 20-1 to 20-4) shown in FIGS. 5 and 7 to 10. However, portions other than the initial value setting unit 70-5 are basically the same and thus detailed description thereof will be omitted.

In FIG. 11, the same reference numerals as those in FIG. 5 respectively denote the same portions.

The initial value setting unit 70-5 includes a voltage source 79a as a voltage generation unit for producing a voltage signal to be used as a preset initial value and a voltage adding circuit 78 for adding the voltage signal from the voltage source 79a to a control signal of an analog amount supplied from the D/A converter 63 to the driving unit 30.

The voltage adding circuit 78 includes transistors 78a to 78f. The transistors 78a and 78b constitute a current mirror circuit. The transistors 78c and 78d constitute another current mirror circuit. The transistors 78f and the transistor 31 of the driving unit 30 constitute yet another current mirror circuit.

Specifically, concerning a control signal $V_{PCNT}$ outputted from the transistor 78f and used for automatic light power control, an initial setting value from the voltage source 79a has been applied to an analog signal $V_{PCNT2}$ equivalent to a count value outputted from the D/A converter 63. Accordingly, a raising component can be set as an initial setting value for automatic light power control performed for the driving unit 30.

In the light emitting element driving apparatus 20-5 of the fifth modified example of the first embodiment configured in the foregoing manner, as in the case of the first embodiment, by driving the laser diode 10 as a light emitting element after power input for the light emitting element driving apparatus 20-5, data information is converted into an optical signal and then transmitted.

Figure 12:
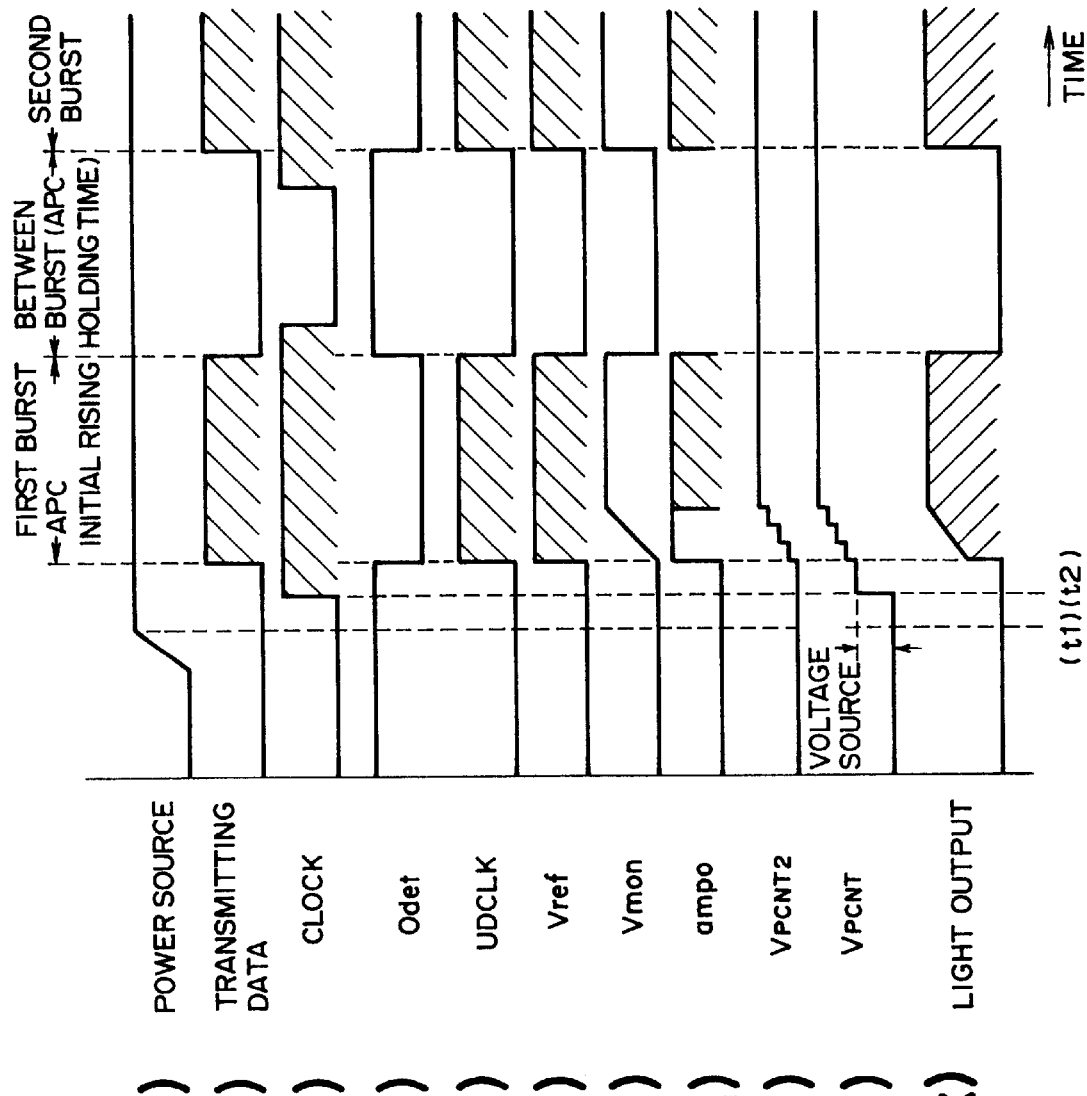

After the power input [see a point of time (t1) of FIG. 12(a)], the voltage source 79a generates a voltage signal as an initial setting value. The voltage signal is then impressed to an LD driving control voltage $V_{PCNT2}$ [see FIG. 12(i)] from the D/A converter 63 in the voltage adding circuit 78 and outputted to the driving unit 30 as a control signal $V_{PCNT}$ for automatic light power control [see points of time (t2) and thereafter of FIG. 12(j)]. In this way, the driving unit 30 can drive the laser diode 10 so as to raise light power in a first burst signal to a specified level at a high speed and efficiently.

As apparent from the foregoing, the light emitting element driving apparatus 20-5 of the fifth modified example of the first embodiment of the present invention is advantageous in the following respects. The inclusion of the initial value setting unit 70-5 enables a raising component to be set as an initial value in a control signal $V_{PCNT}$ having a discrete control amount supplied from the digital APC unit 60 to the driving unit 30 and used for automatic light power control. Accordingly, light output power in the first burst signal immediately after power input can be raised at a high speed and stabilized.

[b6] Sixth Modified Example of the First Embodiment

Figure 13:
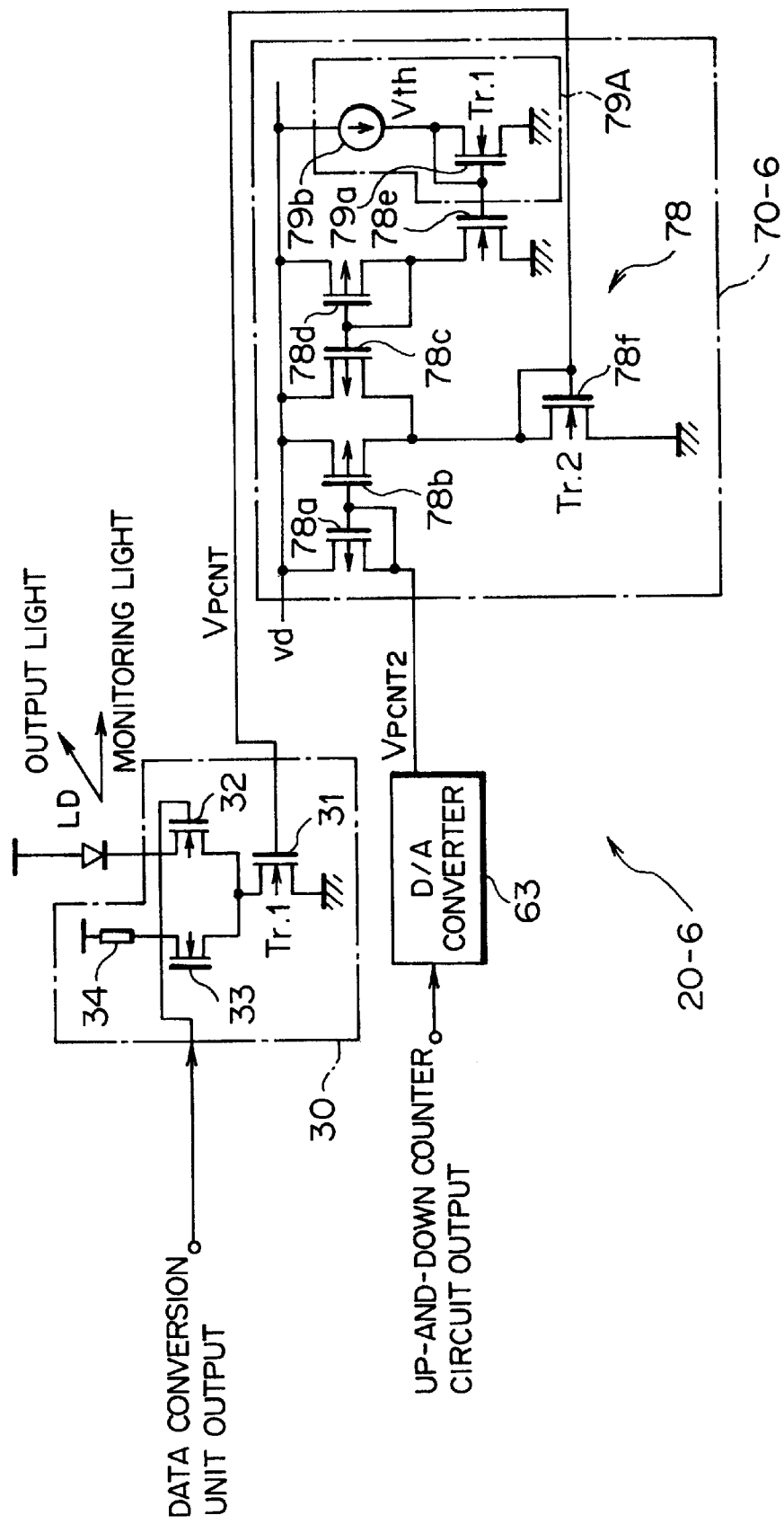
FIG. 13 is a block diagram showing main portions of a light emitting element driving apparatus of a sixth modified example of the first embodiment.

Referring to FIG. 13 which is a block diagram, there are shown main portions of a light emitting element 20-6 of the sixth modified example of the first embodiment. The light emitting element driving apparatus 20-6 shown in FIG. 13 comprises an initial value setting unit 70-6 different from those of the respective light emitting element driving apparatuses (reference numerals 20 and 20-1 to 20-5) shown in FIGS. 5 and 7 to 11. However, portions other than the initial value setting unit 70-6 are basically the same and thus detailed description thereof will be omitted.

In FIG. 13, constituting elements other than the D/A converter 63 and the initial value setting unit 70-6 are not shown, and the same reference numerals as those in FIG. 11 respectively denote the same portions.

The initial value setting unit 70-6 shown in FIG. 13 includes, different from the initial value setting unit 70-5 shown in FIG. 11, a voltage generating circuit 79A as a voltage generation unit for generating a voltage signal to be used as a preset initial value. The initial value setting unit 70-6 includes a voltage adding circuit 78 which is the same as that of the initial value setting unit 70-5.

As in the case of the voltage generating circuit 71-1 of the first modified example of the first embodiment, the voltage generating circuit 79A includes a current source 79b (equivalent to the current source 71a) and a transistor 79c (equivalent to the transistor 71b). The voltage generating circuit 79A generates a voltage signal V equivalent to a driving current value for obtaining a light output which is above a maximum current value (threshold value $I_{th}$) for disabling the laser diode 10 to emit lights and below set light power.

In the light emitting element driving apparatus 20-6 of the sixth modified example of the first embodiment configured in the foregoing manner, as in the case of the first embodiment, by driving the laser diode 10 as a light emitting element after power input for the light emitting element driving apparatus 20-6, data information is converted into an optical signal and then transmitted.

After the power input, the voltage generating circuit 79A generates a voltage signal V as an initial setting value equivalent to a driving current value for obtaining a light output which is above the threshold current of the laser diode 10 and below the set light power. The voltage signal V is then impressed to an LD driving control voltage $V_{PCNT2}$ from the D/A converter 63 and outputted to the driving signal to be used as a control signal $V_{PCNT}$ for automatic light power control. In this way, the driving unit 30 can drive the laser diode 10 so as to raise light power in a first burst signal to a specified level at a high speed and efficiently.

By forming the transistor 78f of the initial value setting unit 70-6 and the transistor 31 of the driving unit 30 to be similar in size, process changes are prevented from causing different fluctuation therein. Accordingly, a control operation by the digital APC unit 60 can be performed without deteriorating time needed for initial rising in the first burst signal.

As apparent from the foregoing, the light emitting element driving apparatus 20-6 of the sixth modified example of the first embodiment of the present invention is advantageous in the following respects. The inclusion of the initial value setting unit 70-6 enables a raising component to be set to a voltage value equivalent to a driving current for obtaining a light output which is above a threshold value of the laser diode 10 and below set light power, the raising component being set as an initial value in a control signal $V_{PCNT}$ having a discrete control amount supplied from the digital APC unit 60 to the driving unit 30 and used for automatic light power control. Accordingly, light output power in a first burst signal immediately after power input can be raised at a high speed and efficiently and stabilized.

[b7] Seventh Modified Example of the First Embodiment

Figure 14:
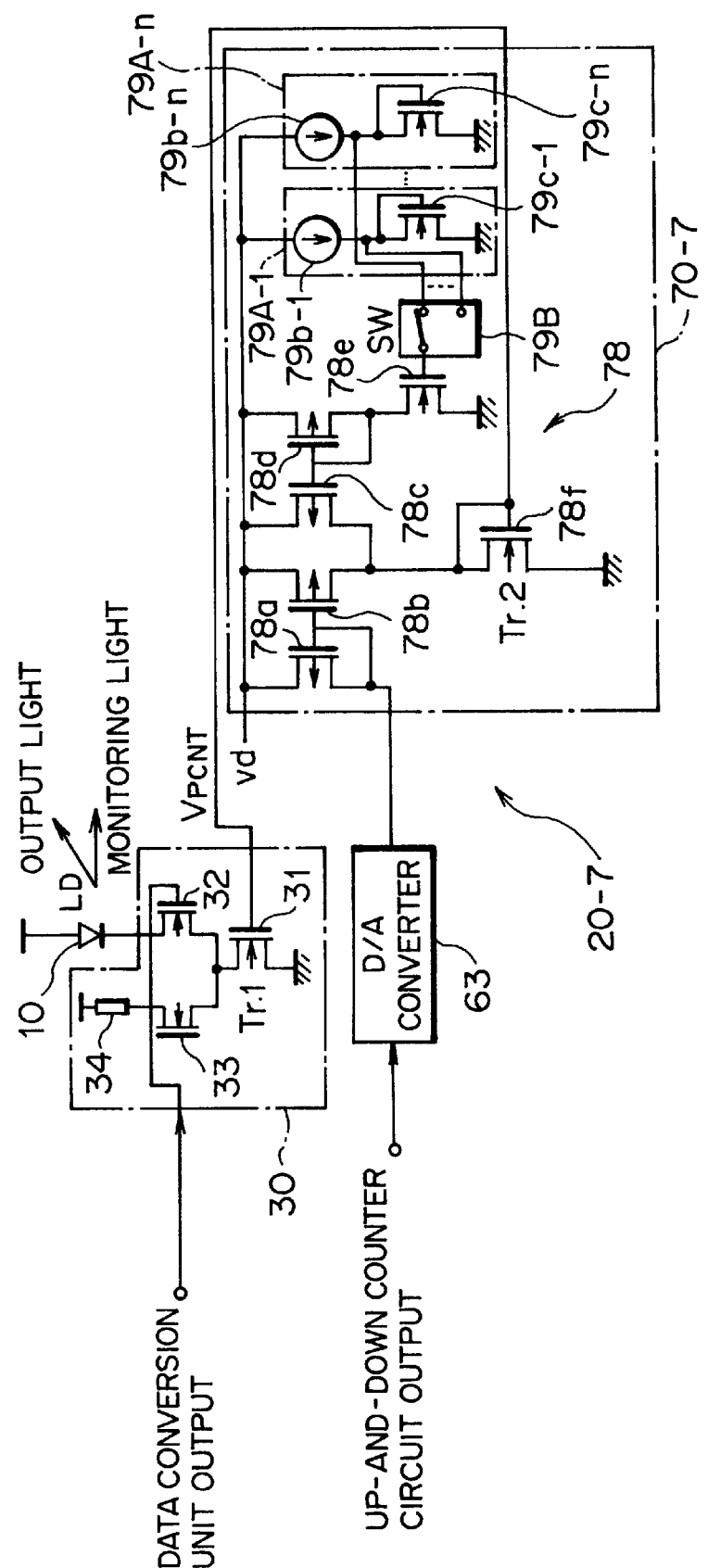
FIG. 14 is a block diagram showing main portions of a light emitting element driving apparatus of a seventh modified example of the first embodiment.

Referring to FIG. 14 which is a block diagram, there are shown main portions of a light emitting element driving apparatus 20-7 of the seventh modified example of the first embodiment. The light emitting element driving apparatus 20-7 shown in FIG. 14 comprises an initial value setting unit 70-7 different from those of the respective light emitting element driving apparatuses (reference numerals 20 and 20-1 to 20-6) shown in FIGS. 5, 7 to 11 and 13. Portions other than the initial value setting unit 70-7 are basically the same, and thus detailed description thereof will be omitted.

In FIG. 14, constituting elements other than the D/A converter 63, the initial value setting unit 70-7 and the driving unit 30 are now shown. The same reference numerals as those in FIG. 11 respectively denote the same portions.

The initial value setting unit 70-7 includes a voltage adding circuit 78 which is basically the same as the initial value setting unit 70-6 described above with reference to FIG. 13. The initial value setting unit 70-7 also includes a plurality of voltage generating circuits 79A-1 to 79A-n as voltage sources for producing voltage signals different from one another and a switch 79B.

The plurality of voltage generating circuits 79A-1 to 79A-n can generate voltage signals corresponding to characteristics of the laser diode 10. The voltage generating circuits 79A-1 to 79A-n respectively include current sources 79b-1 to 79b-n and transistors 79c-1 to 79c-n which function as load Nc transistors different from one another in size.

The voltage generating circuits 79A-1 to 79A-n generate voltage signals V equivalent to driving current values for obtaining light outputs which are above different threshold currents $I_{th}$ corresponding to threshold current characteristics of the laser diode 10 and below set light power.

The switch 79B is set to output one selected from the voltage signals V from the voltage generating circuits 79A-1 to 79A-n according to a used characteristic of the laser diode 10, the selected voltage signal V being equivalent to a driving current value for obtaining a light output which is above the threshold current $I_{th}$ and below the set light power. For example, if a used threshold voltage $I_{th}$ of the laser diode 10 is large, the switch 79B selects one from the voltage generating circuits 79A-1 to 79A-n, the selected voltage generating circuit being capable of producing a corresponding voltage signal.

Thus, in the initial value setting unit 70-7 in the seventh modified example of the first embodiment, based on setting of the switch 79B, a voltage signal V can be added to a voltage signal $V_{PCNT}$ outputted from the D/A converter 63 irrespective of the kind of the laser diode 10, the voltage signal V being equivalent to a driving current value for obtaining a light output which is above a threshold current $I_{th}$ and below set light power, and then outputted to the driving unit 30 as a control signal $V_{PCNT}$ for automatic light power control.

In other words, a control signal $V_{PCNT}$ outputted from the transistor 78f to be used for automatic light power control is obtained by applying an initial setting value V from the switch 79B to an analog signal $V_{PCNT2}$ equivalent to a count value outputted from the D/A converter 63. Accordingly, a raising component can be set as an initial setting value for automatic light power control performed for the driving unit 30. Further, it is possible to deal with a difference in threshold currents $I_{th}$, which occurs depending on the kinds of laser diodes 10.

In the light emitting element driving apparatus 20-7 of the seventh modified example of the first embodiment configured in the foregoing manner, as in the case of the first embodiment, by driving the laser diode 10 as a light emitting element after power input for the light emitting element driving apparatus 20-7, data information is converted into an optical signal and then transmitted.

After the power input, any one of voltage signals produced by the voltage generating circuits 79A-1 to 79A-n is selectively outputted by the switch 79B. Thereby, a voltage signal corresponding to a characteristic of the used laser diode 10 is outputted to the voltage adding circuit 78.

The voltage adding circuit 78 impresses the voltage signal V to an LD driving control voltage $V_{PCNT2}$ from the D/A converter 63 and then outputs the same to the driving unit 30 as a control signal $V_{PCNT}$ for automatic light power control. In this way, the driving unit 30 can drive the laser diode 10 so as to raise light power in a first burst signal to a specified level at a high speed and efficiently.

In addition, a characteristic (kind, type or solid variance) of the laser diode 10 is prevented from causing deterioration of light power initial rising control performed by the digital APC unit 60.

As apparent from the foregoing, the light emitting element driving apparatus 20-7 of the seventh modified example of the first embodiment of the present invention is advantageous in the following respects. The inclusion of the initial value setting unit 70-7 enables a raising component to be set to a voltage value equivalent to a driving current value for obtaining a light output which is above a threshold current of the used laser diode 10 and below set light power, the raising component being set as an initial value in a control signal $V_{PCNT}$ having a discrete control amount supplied from the digital APC unit 60 to the driving unit 30 and used for automatic light power control. Accordingly, as in the case of the fifth modified example of the first embodiment, light output power in a first burst signal immediately after power input can be raised at a high speed and efficiently. Also, a degree of freedom for system configuration can be increased.

[b8] Eighth Modified Example of the First Embodiment

Figure 15:
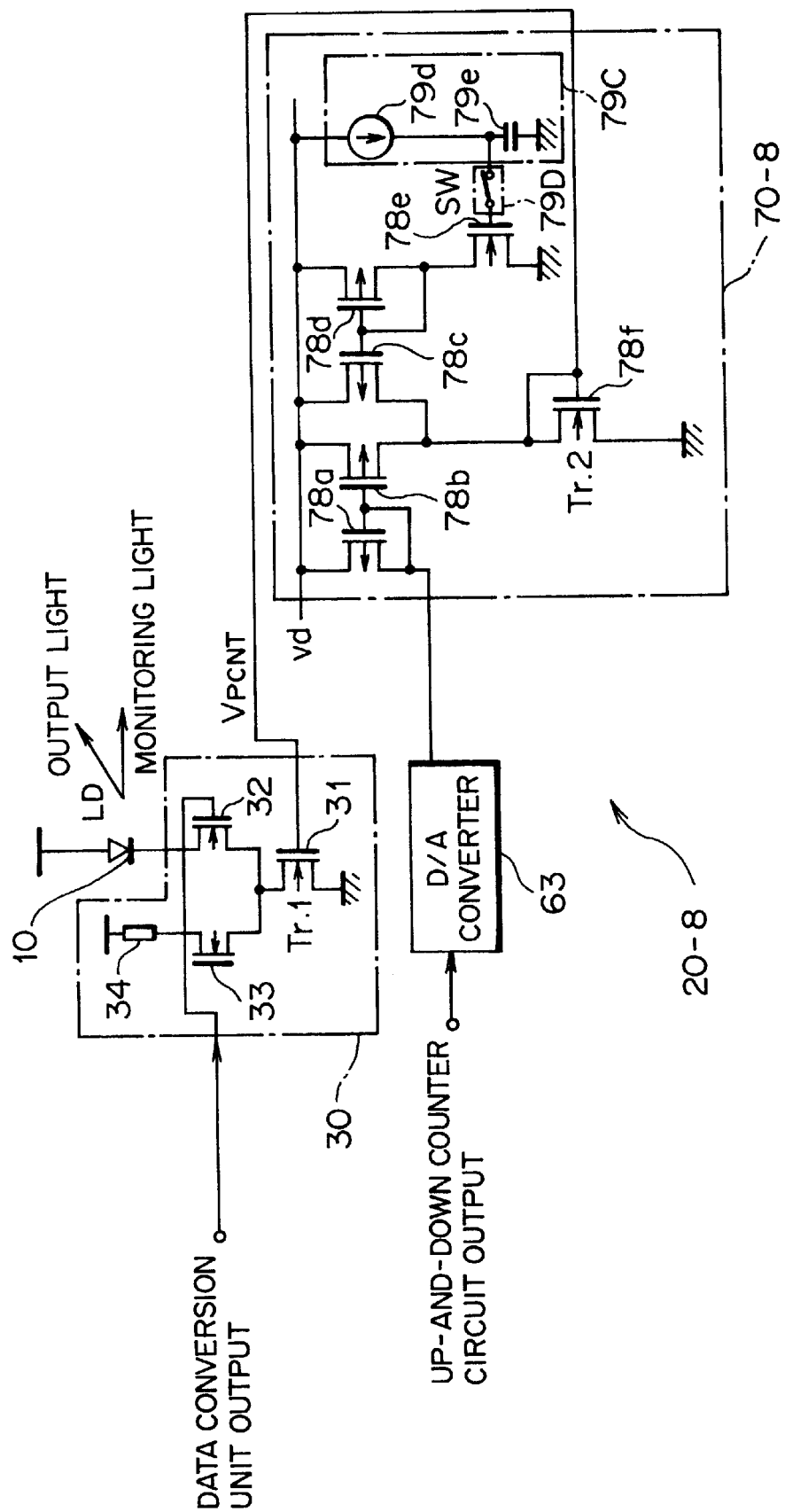
FIG. 15 is a block diagram showing main portions of a light emitting element driving apparatus of an eighth modified example of the first embodiment.

Referring to FIG. 15 which is a block diagram, there are shown main portions of a light emitting element driving apparatus 20-8 of the eighth modified example of the first embodiment. The light emitting element driving apparatus 20-8 shown in FIG. 15 comprises an initial value setting unit 70-8 different from those of the respective light emitting element driving apparatuses (reference numerals 20 and 20-1 to 20-7) shown in FIGS. 5, 7 to 11, 13 and 14. Portions other than the initial value setting unit 70-8 are basically the same, and thus detailed description thereof will be omitted.

In FIG. 15, constituting elements other than the D/A converter 63, the initial value setting unit 70-8 and the driving unit 30 are not shown. The same reference numerals as those in FIG. 11 respectively denote the same portions.

The initial value setting unit 70-8 shown in FIG. 15 includes a voltage generation unit 79C, a switch 79D and a voltage adding circuit 78 which is the same as that of the initial value setting unit 70-5 described above with reference to FIG. 11.

The voltage generation unit 79C includes a current source 79d and a capacitor 79e. The voltage generation unit 79C functions as a constant voltage source for obtaining an output signal of a constant voltage by charging the capacitor 79e by means of a current outputted from the current source 79d.

The switch 79D is turned ON only at the time of inputting of a first burst signal immediately after power input for the light emitting element driving apparatus 20-8 (at the time of initial rising). The switch 79D is turned OFF in other cases.

Thus, in the light emitting element driving apparatus 20-8 of the eighth modified example, a voltage value from the voltage generation unit 79C can be added as an initial setting value to a signal $V_{PCNT2}$ outputted from the D/A converter 63 only at the initial rising time and supplied to the driving unit 30 as a control signal $V_{PCNT}$ for automatic light power control.

In the light emitting element driving apparatus 20-8 of the eighth modified example of the first embodiment configured in the foregoing manner, as in the case of the first embodiment, by driving the laser diode 10 as a light emitting element after power input for the light emitting element driving apparatus 20-8, data information is converted into an optical signal and then transmitted.

After the power input, the voltage generation unit 79C generates a voltage value as an initial setting value. The voltage adding circuit 78 impresses a voltage signal V thereof to an LD driving control voltage $V_{PCNT2}$ from the D/A converter 63 and outputs the same to the driving unit 30 as a control signal $V_{PCNT}$ for automatic light power control. In this way, the driving unit 30 can drive the laser diode 10 so as to raise light power in a first burst signal to a specified level at a high speed and efficiently.

As apparent from the foregoing, the light emitting element driving apparatus 20-8 of the eighth modified example of the first embodiment of the present invention is advantageous in the following respects. The inclusion of the initial value setting unit 70-8 enables a raising component to a voltage value equivalent to a driving current value for obtaining a light output which is above a threshold current of the laser diode 10 and below set light power, the raising component being set as an initial value in a control signal $V_{PCNT}$ having a discrete control amount supplied from the digital APC unit 60 to the driving unit 30 and used for automatic light power control. Accordingly, light output power in a first burst signal immediately after power input can be raised at a high speed and efficiently and stabilized.

[b9] Ninth Modified Example of the First Embodiment

Figure 28:
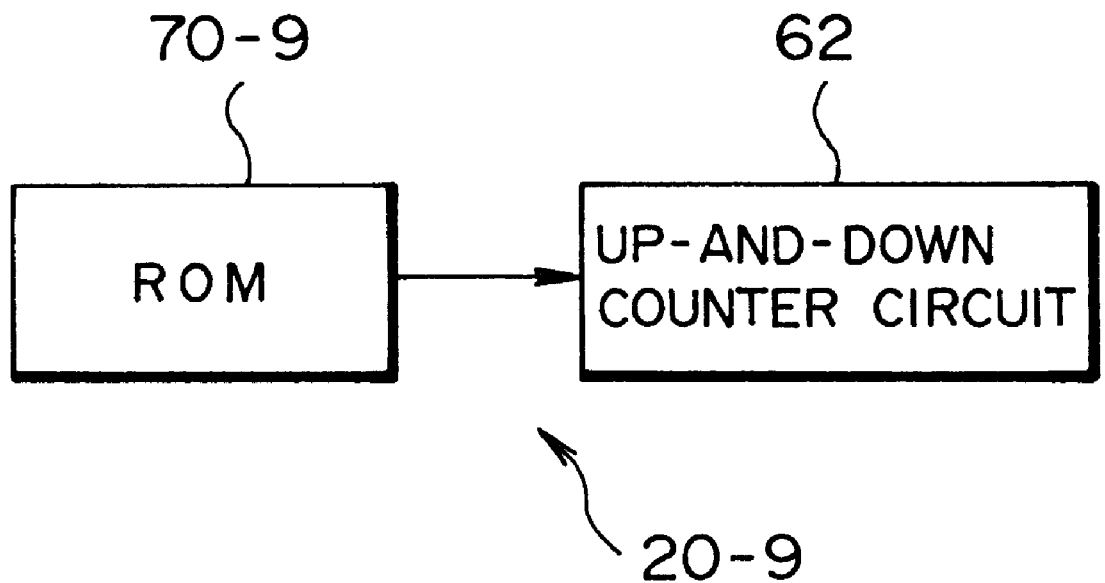
FIG. 28 is a block diagram showing main portions of a light emitting element driving apparatus of a ninth modified example of the first embodiment.

Referring to FIG. 28 which is a block diagram, there are shown main portions of a light emitting element driving apparatus 20-9 of the ninth modified example of the first embodiment. The light emitting element driving apparatus 20-9 shown in FIG. 28 is different from the light emitting element driving apparatus 20-4 described above with reference to FIG. 10 in that a count value in the up-and-down counter circuit 62 is set by means of a value stored in a ROM (Read Only Memory) 70-9 as an initial value setting unit. Other portions are basically the same as those in the fourth modified example of the first embodiment.

The ROM 70-9 stores, according to the kind of an LD or the like, a digital value equivalent to a driving current value for obtaining a light output which is above a threshold current $I_{th}$ and below set light power. For the ROM 70-9, an electrically rewritable ROM such as an EEPROM (Electrically Erasable Programmable Read Only Memory) can be used.

In other words, the ROM 70-9 functions as a memory for storing a digital signal as a voltage signal to be used as an initial value. The digital signal stored in the ROM 70-9 is preset in the up-and-down counter circuit 62 of the digital APC unit 60.

In the light emitting element driving apparatus 20-9 of the ninth modified example of the first embodiment configured in the foregoing manner, as in the case of the first embodiment, by driving the laser diode 10 as a light emitting element after power input for the light emitting element driving apparatus 20-9, data information is converted into an optical signal and then transmitted.

When a clock is inputted after the power input, count value data outputted from the up-and-down counter circuit 62 is converted into an analog signal by the D/A converter 63, the count value having been preset therein by the ROM 70-9, and then outputted to the driving unit 30 as a control signal $V_{PCNT}$ for automatic light power control. In this way, the driving unit 30 can drive the laser diode 10 so as to raise light power in a first burst signal to a specified level at a high speed and efficiently.

As apparent from the foregoing, the light emitting element driving apparatus 20-9 of the ninth modified example of the first embodiment is advantageous in the following respect. The inclusion of the ROM 70-9 as an initial value setting unit enables, as in the case of the first embodiment, a raising component to be set as an initial value in a control signal $V_{PCNT}$ having a discrete control amount supplied from the digital ACP unit 60 to the driving unit 30 and used for automatic light power control. By causing the up-and-down counter circuit 62 to start its counting operation from the initial value, light output power in a first burst signal can be raised at a high speed and stabilized. A chip area can be reduced because it is not necessary to provide any A/D converters in an initialization setting unit.

Furthermore, since an electrically rewritable ROM such an EEPROM can be used for the ROM 70-9 as an initial value setting unit, a digital value (equivalent to a driving current value for obtaining a light output which is above a threshold current $I_{th}$ and below set light power) is used as an optimal initial value according to the kind of, for example an LD. Initial value setting for each used LD can also be facilitated.

[b10] Tenth Modified Example of the First Embodiment

Figure 29:
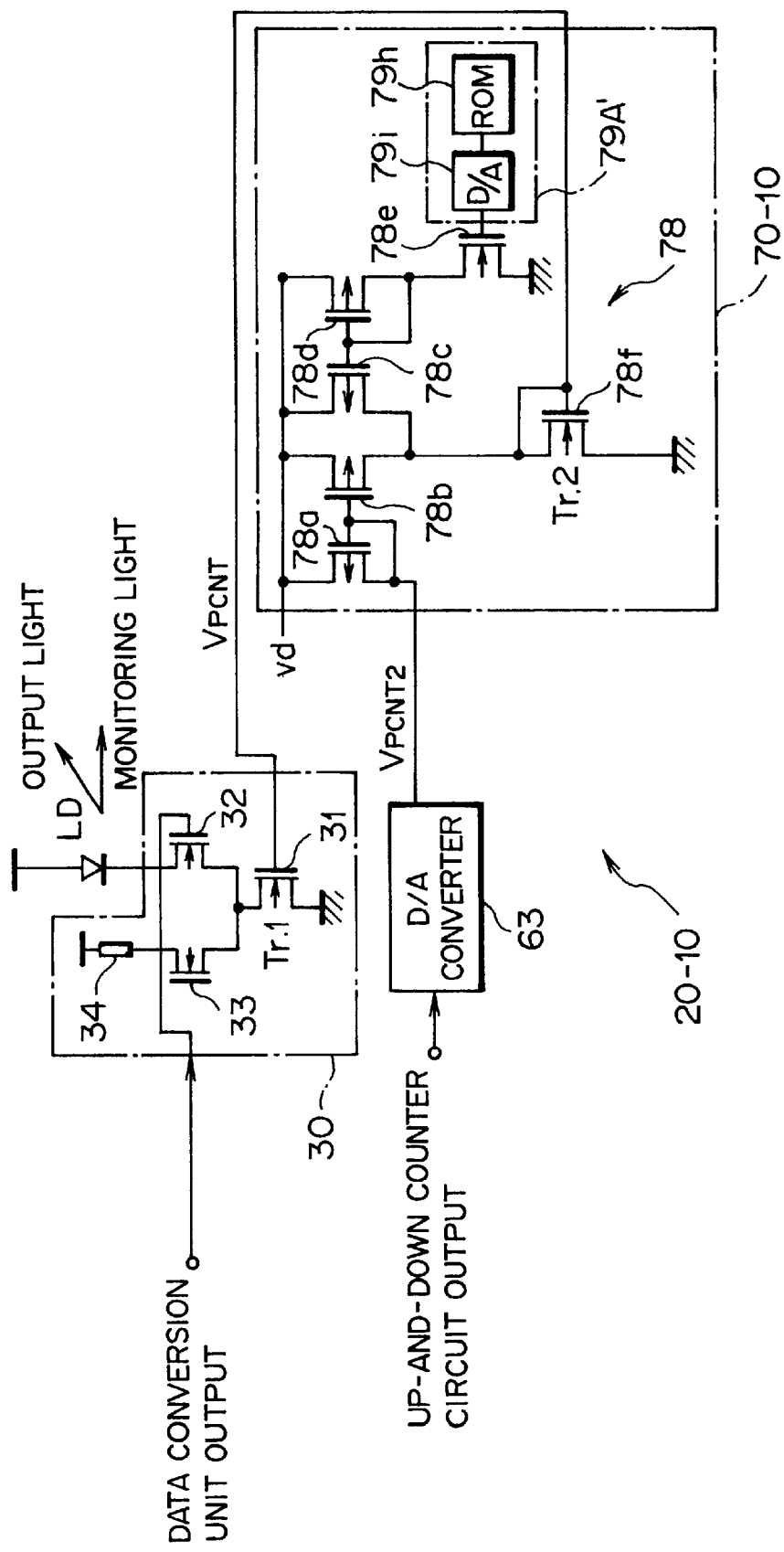
FIG. 29 is a block diagram showing main portions of a light emitting element driving apparatus of a tenth modified example of the first embodiment.

Referring to FIG. 29 which is a block diagram, there are shown main portions of a light emitting element driving apparatus 20-10 of the tenth modified example of the first embodiment. The light emitting element driving apparatus 20-10 shown in FIG. 29 is different from the light emitting element driving apparatus 20-6 described above with reference to FIG. 13 in construction of the voltage generating circuit 79A of its initial value setting unit 70-10. In FIG. 29, the same reference numerals as those in FIG. 13 respectively denote the same portions.

The voltage generating circuit 79A' shown in FIG. 29 includes a ROM 79h and a D/A converter 79i. The voltage generating circuit 79A' generates a voltage signal V equivalent to a driving current value for obtaining a light output which is above a minimum current value (threshold current $I_{th}$) emitted and below set light power.

The ROM 79h stores a digital value of a voltage signal equivalent to a driving current value for obtaining a light output which is above a threshold value $I_{th}$ and light power set according to the kind of the laser diode 10. The ROM 79h includes an electrically rewritable ROM such as an EEPROM. In other words, the ROM 79h functions as a memory for storing, as a digital signal, information regarding a voltage signal to be used as an initial value.

The D/A converter 79i converts a digital signal value stored in the ROM 79h into an analog signal and then outputs the same. In this way, an output of the D/A converter 79i can be outputted to the transistor 78f as an initial value to be applied to an LD driving control voltage, the output of the D/A converter 79i being a result of converting the digital value from the ROM 79h into the analog value.

In the light emitting element driving apparatus 20-10 of the tenth modified example of the first embodiment configured in the foregoing manner, as in the case of the first embodiment, by driving the laser diode 10 as a light emitting element after power input for the light emitting element driving apparatus 20-10, data information is converted into an optical signal and then transmitted.

After the power input, the voltage generating circuit 79A' of the initial value setting unit 70-10 generates a voltage signal V as an initial setting value optimally set according to the kind of the laser diode 10. The voltage adding circuit 78 then impresses the voltage signal V to an LD driving control voltage $V_{PCNT2}$ from the D/A converter 63 and outputs the same to the driving unit 30 as a control signal $V_{PCNT}$ for automatic light power control. In this way, the driving unit 30 can drive the laser diode 10 so as to raise light power in a first burst signal to a specified level at a high speed and efficiently.

As apparent from the foregoing, the light emitting element driving apparatus 20-10 of the tenth modified example of the first embodiment of the present invention is advantageous in the following respects. The inclusion of the initial value setting unit 70-10 enables a raising component to a threshold voltage of the laser diode 10, the raising component being set as an initial value in a control signal $V_{PCNT}$ having a discrete control amount supplied from the digital APC unit 60 to the driving unit 30 and used for automatic light power control. Accordingly, light output power in a first burst signal immediately after power input can be raised at a high speed and efficiently and stabilized.

Furthermore, the ROM 70-10 as an initial value setting unit can be constructed by using an electrically rewritable ROM 79h such as an EEPROM in the voltage generating circuit 79A'. Accordingly, a digital value to be an optimal initial value (equivalent to a current value for obtaining a light output which is above a threshold current $I_{th}$ and below set light power) according to the kind of, for example an LD, can be set. Also, initial value setting for each used LD can be facilitated.

[c] Second Embodiment

Figure 16:
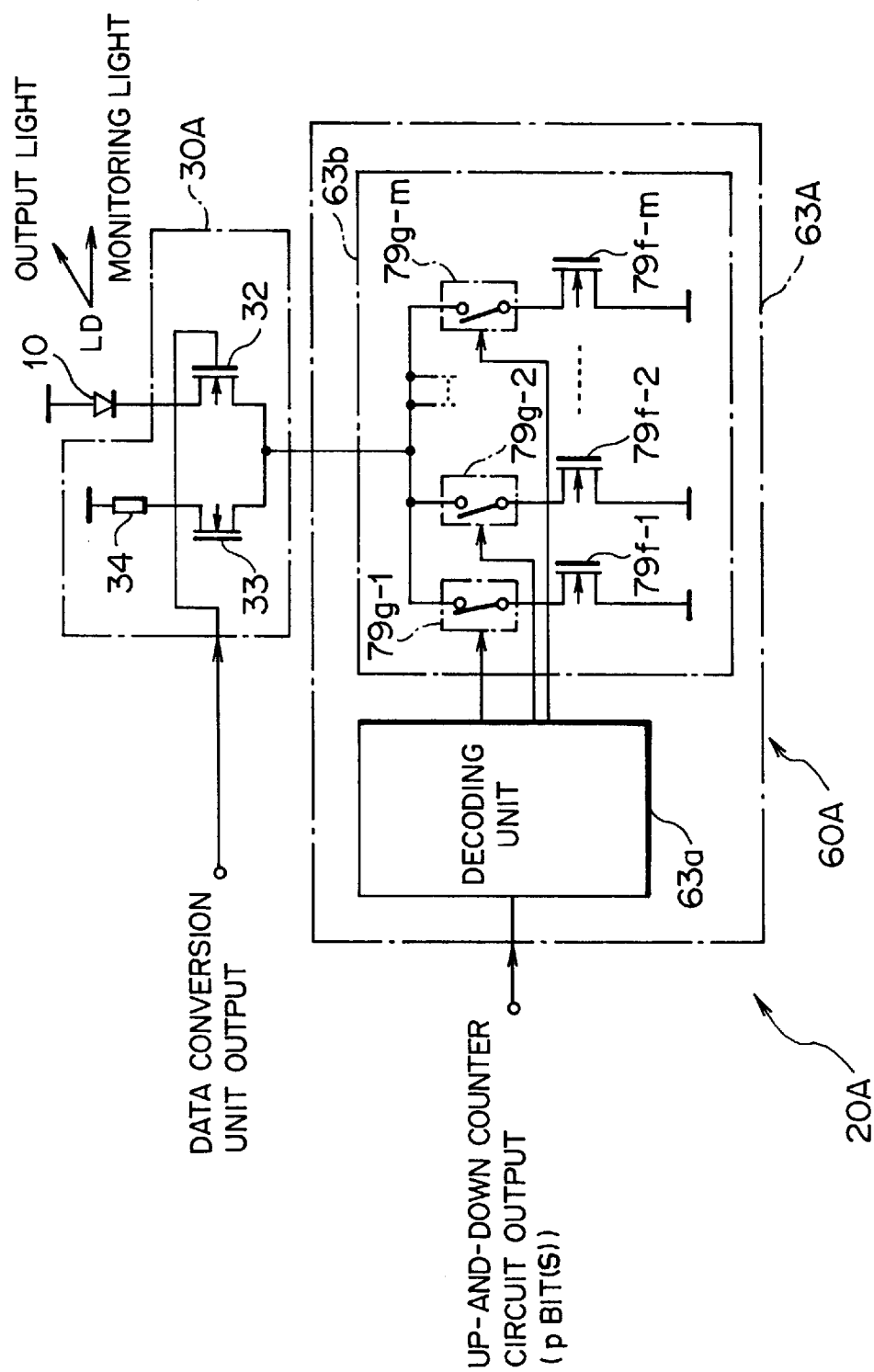
FIG. 16 is a block diagram showing main portions of a light emitting element driving apparatus of a second embodiment of the invention.

Referring next to FIG. 16 which is a block diagram, there are shown main portions of a light emitting element driving apparatus 20A of the second embodiment. The light emitting element driving apparatus 20A shown in FIG. 16 comprises a digital APC unit 60A and a driving unit 30A which are respectively different from those of the light emitting element driving apparatuses (reference numerals 20 and 20-1 to 20-8) described above with reference to FIGS. 5, 7 to 11 and 13 to 15. Portions other than the digital APC unit 60A and the driving unit 30A are basically the same, and thus detailed description thereof will be omitted.

In FIG. 16, constituting elements other than the D/A converter 63A of the digital APC unit 60A and the driving unit 30A are not shown. The same reference numerals as those in FIG. 11 respectively denote the same portions.

The digital APC unit 60A shown in FIG. 16 includes a comparator 61 and an up-and-down counter circuit 62 which are the same as those in the first embodiment and each of its modified examples. The digital APC unit 60A also includes a D/A converter 63A which is different from that in the first embodiment or each of its modified examples.

The D/A converter 63A includes a decoding unit 63a for converting a count value of p bits from the up-and-down counter circuit 62 into m bits through decoding and a current supplying unit 63b for supplying a specified current signal to the driving unit 30A based on information regarding the bits converted by the decoding unit 63a.

The current supplying unit 63b includes transistors 79f-1 to 79f-m amounting to m in number for supplying current signals different from one another and switches 79g-1 to 79g-m provided corresponding to the respective transistors 79f-1 to 79f-m and controlled ON/OFF based on an m bit signal from the decoding unit 63a.

Each bit signal constituting the m bit signal outputted from the decoding unit 63a is inputted as an ON/OFF control signal to each of the switches 79g-1 to 79g-m. Based on the switch control signal, switching between supplying and non-supplying of a current signal from each of the transistors 79f-1 to 79f-m to the driving unit 30A is controlled.

Concerning m bit signals from the decoding unit 63a, current signals can be outputted in the order of values from the transistor connected to the switch which uses a most significant bit as an ON/OFF control signal. A smallest current signal can be outputted from the transistor connected t the switch which uses a least significant bit as an ON/OFF control signal.

In other words, a current signal value outputted from each of the transistors 79f-1 to 79f-m is given a weight according to the bit position of a bit signal used as a control signal.

Specifically, assuming that among the transistors 79f-1 to 79f-m amounting to m in number, it is a transistor 79f-1 that can output a largest current signal value, the switch 79g-1 connected to the transistor 79f-1 is ON/OFF controlled by means of a most significant bit of an m bit signal from the decoding unit 63a.

Similarly, assuming that it is a transistor 79f-m that can output a smallest current signal value, the switch 79g-m connected to the transistor 79f-m is ON/OFF controlled by means of a least significant bit of the m bit signal from the decoding unit 63a.

The transistors 79f-1 and the 79f-m and the switches 79g-1 and 79g-m provided corresponding to the transistors 79f-1 to 79f-m are connected to the driving unit 30A in parallel. Accordingly, when any of the switches 79g-1 and the 79g-m is ON/OFF controlled based on m bit information from the decoding unit 63a, the D/A converter 63A can supply a current signal (having a discrete value) to the driving unit 30A, the current signal being a sum total of current signals supplied from the transistor connected to the ON-controlled switch.

In other words, the D/A converter 63A functions as a counter value/current value converting circuit for generating a current value according to a count value from the up-and-down counter circuit 62 and outputting the same as a control signal (current signal) having a discrete control amount.

In the light emitting element driving apparatus 20A of the second embodiment, a raising component is preset in a current signal outputted from the D/A converter 63A as an initial value for preventing the laser diode 10 from emitting lights. In this way, the D/A converter 63A can function as an initial value setting unit.

Specifically, in the decoding unit 63a, a count value from the up-and-down counter circuit 62 is "0" by a decimal notation immediately after power input. However, by performing decoding such that a low-order bit can become "1" by a binary notation, the corresponding switch is controlled to be ON and thereby a current signal from the transistor corresponding to the low-order bit can be supplied as an initial value to the driving unit 30A.

The driving unit 30A includes transistors 32 and 33 and a resistor. The driving unit 30A produces, from a current signal for automatic light power control from the D/A converter 63A, a driving current signal for converting a signal outputted from the data conversion unit 21 into an optical signal and outputs the same. In other words, the driving unit 30A generates a driving signal for the laser diode 10 by using an input electric signal containing data information and the current signal from the D/A converter 63A.

In other words, in the driving unit 30A, unlike the driving unit 30 in the first embodiment, the transistor 31 is not provided, and the D/A converter 63A is constructed to include the decoding unit 63a and the current supplying unit 63b. Accordingly, an analog signal as a result of D/A conversion from the D/A converter 63A can be used as a current signal to be supplied to the driving unit 30A.

Next, an operation of the light emitting driving apparatus 20A of the second embodiment of the present invention configured in the foregoing manner will be described with particular attention paid to transmission of a burst signal as an optical signal.

First, by driving the laser diode 10 as a light emitting element, power is inputted for the light emitting element driving apparatus 20A prior to transmission of data information. After the power input, a counting operation is maintained in a stopped condition in the up-and-down counter circuit 62 until a first burst signal is inputted based on controlling by the clock control unit 90. A count value "0" by a decimal notation is outputted to the decoding unit 63a.

The decoding unit 63a performs decoding such that at least a low-order bit can become "1" by a binary notation even if the count value from the up-and-down counter circuit 62 is "0" by a decimal notation, and thereby sets a current signal from the transistor 79f-m to a raising component as an initial value for the driving unit 30A. The current signal provided as an initial value can be set to a value equivalent to a driving current signal which prevents the laser diode 10 from emitting lights.

Subsequently, after the first burst signal (first burst transmitting signal) has been inputted after the power input, the digital APC unit 60A starts its automatic light power control.

Specifically, if inputting of the first burst signal after the power input is detected by the zero continuity detecting circuit 91, the switching unit 92 of the clock control unit 90 switches clocks to be inputted so as to supply the same to the up-and-down counter circuit 62 and the D/A converter 63A until the hysteresis comparison units 81 and 82 of the stability identification unit 80 detect stabilizing of a monitoring voltage signal $V_{mon}$ within ±hysteresis widths of a reference voltage $V_{ref}$.

Then, the comparator 61 of the digital APC unit 60A compares the monitoring voltage signal $V_{mon}$ with the reference voltage $V_{ref}$. Since the monitoring voltage signal $V_{mon}$ is smaller than the reference voltage $V_{ref}$ at the time of inputting the first burst signal, the comparator 61 outputs an output voltage signal ampo of a low level ("0"). The up-and-down counter circuit 62 performs counting for a result of the comparison from the comparator 61 in synchronization with a clock to be inputted.

In this case, the up-and-down counter circuit 62 functions as an up-counter based on clock control performed by the clock control unit 90 until monitoring voltage signal $V_{mon}$ is stabilized within ±hysteresis widths of the reference voltage $V_{ref}$.

The decoding unit 63a of the D/A converter 63A performs decoding for a discretely changed count value (p bits) from the up-and-down counter circuit 62 and then outputs the same as an ON/OFF control signal of m bits. The switches 79g-1 to 79g-m are controlled to be ON/OFF based on a bit signal as an ON/OFF control signal from the decoding unit 63a. A sum total of current signals outputted from the transistors 79f-1 to 79f-m corresponding to the ON-controlled switches 79g-1 to 79g-m is supplied to the driving unit 30A.

In this case, in the D/A converter 63A, in order to increase light output power from the laser diode 10, a current signal to be supplied to the driving unit 30A is increased until the monitoring voltage signal $V_{mon}$ is stabilized within ±hysteresis widths of the reference voltage $V_{ref}$.

In other words, the up-and-down counter circuit 62 continues its up-counting until the monitoring voltage signal $V_{mon}$ is nearly coincided with the reference voltage $V_{ref}$, and a current signal outputted from the D/A converter 63A to the driving unit 30A is increased in a discrete manner. Accordingly, the driving unit 30A can drive the laser diode 10 so as to bring light output power close to a specified level.

As in the case of the first embodiment, if the stability identification unit 80 determines stabilization of the monitoring voltage signal $V_{mon}$ within ± hysteresis widths of the reference voltage $V_{ref}$, the clock control unit 90 then stops supplying of the clock to the up-and-down counter circuit 62 and the D/A converter 63A. Also by causing the up-and-down counter circuit 62 to stop its counting operation, a count value at the point of this time is held.

Thus, the D/A converter 63A can supply a constant current signal to the driving unit 30A and variance in light output power after the completion of an APC loop can be prevented.

As apparent from the foregoing, the light emitting element driving apparatus 20A of the second embodiment of the present invention is advantageous in the following respects. The inclusion of the A/D converter 63A having a function as an initial value setting unit enables a raising component to be set as an initial value in a current signal having a discrete control amount supplied from the digital APC unit 60A to the driving unit 30A and used for automatic light power control. Accordingly, light output power in a first burst signal immediately after power input can be raised at a high speed and efficiently and stabilized.

[d] Third Embodiment

Figure 17:
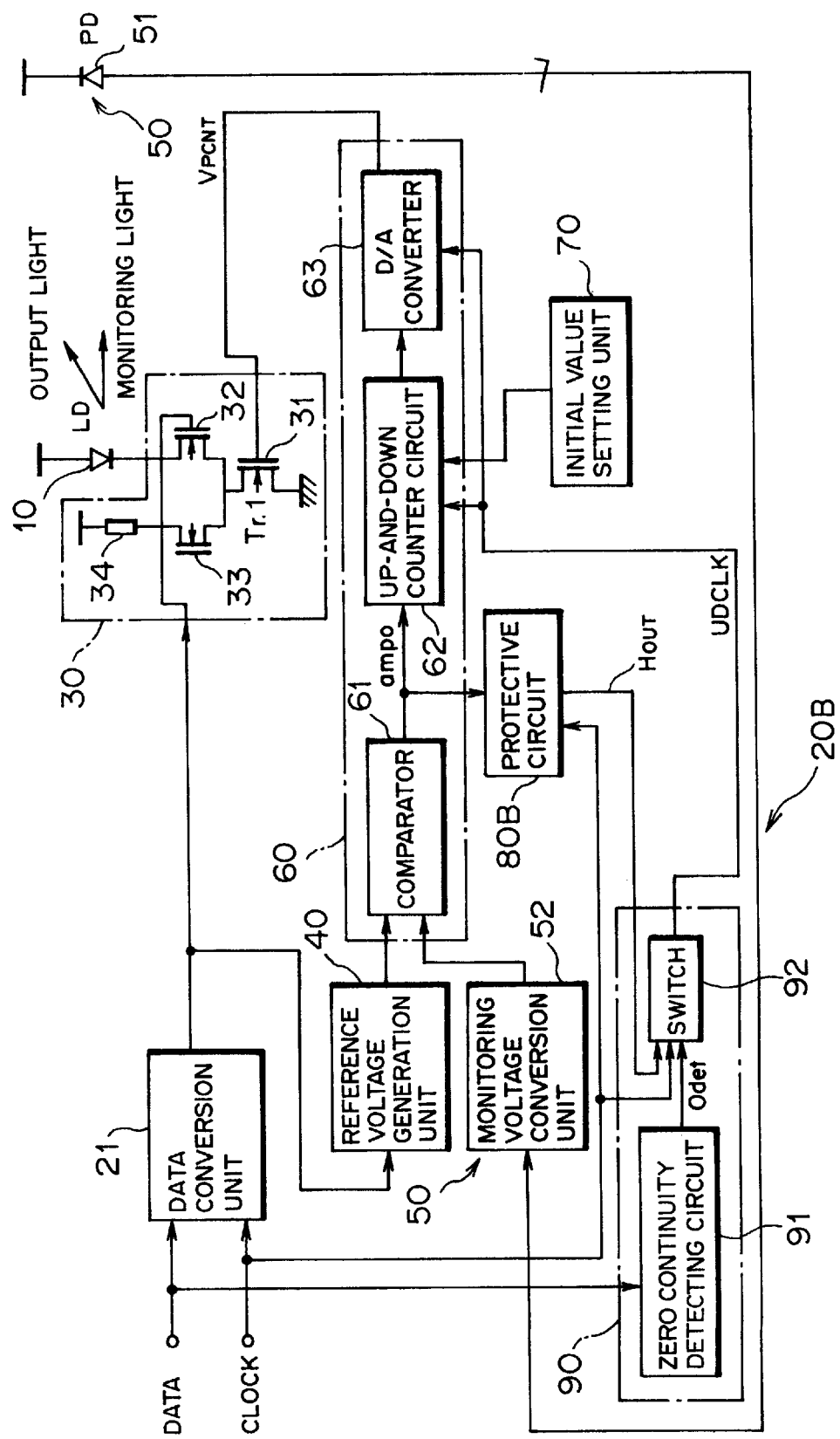
FIG. 17 is a block diagram showing a light emitting element driving apparatus of a third embodiment of the invention.

Referring next to FIG. 17 which is a block diagram, there is shown a light emitting element driving apparatus 20B of the third embodiment. The light emitting element driving apparatus 20B shown in FIG. 17 is different from th e light emitting element driving apparatus (reference numeral 20) of each of the foregoing embodiments (including modified examples) in that a function of the stability identification unit 80 is realized by a protective circuit 80B.

Portions other than the protective circuit 80B are basically the same as those in the first embodiment, and thus detailed description thereof will be omitted. In FIG. 17, the same reference numerals as those in FIG. 5 respectively denote the same portions.

Figure 18:
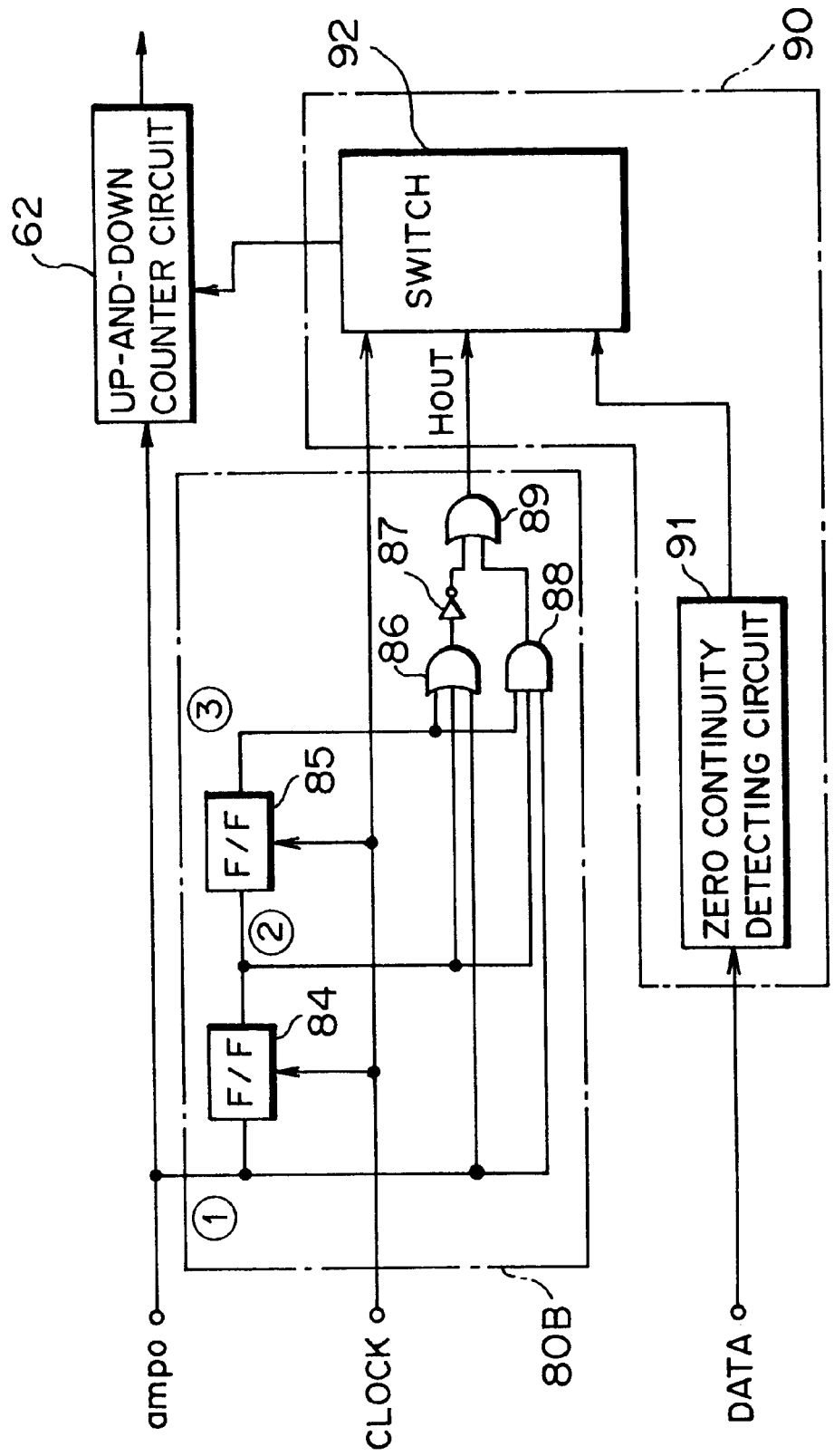
FIG. 18 is a block diagram showing main portions of the light emitting element driving apparatus of the third embodiment of the invention.

The protective circuit 80B includes, as shown in detail in FIG. 18, two flip-flops 84 and 85, an OR circuit 86, a NOT circuit 87, an AND circuit 88 and an OR circuit 89.

The flip-flop 84 holds a value of a result of comparison ampo inputted from the comparator 61 by an amount equal to specified one clock cycle (clock of a cycle longer than at least that of a clock synchronized with data) and then outputs the same. The flip-flop 85 holds the comparison result signal by another amount equal to one clock cycle, the comparison result signal having been held by the flip-flop 84 by the amount equal to one clock cycle, and the outputs the same.

Thus, signals outputted from the flip-flops 84 and 85 are comparison result signals continuously outputted from the comparator 61. The comparison result signals form continuous comparison result signals of 3 clocks together with the comparison result signal ampo inputted to the flip-flop 84.

The OR circuit 86 performs an ORing operation for the continuous comparison result signals of 3 clocks. The NOT circuit 87 inverse-outputs a result of the operation from the OR circuit 86. The AND circuit 88 performs an ANDing operation for the continuous comparison result signals of 3 clocks.

The OR circuit 89 performs an ORing operation for signals respectively outputted from the NOT circuit 87 and the AND circuit 88 and outputs a result of the operation to the switch 92 as an output $H_{OUT}$ of the protective circuit 80B. Based on a signal outputted from the OR circuit 89, determination can be made as to equality among the continuous comparison result signals of 3 clocks (whether comparison results of 3 clocks are "0" or "1" continuously).

Specifically, the OR circuit 89 outputs a high level signal "1" if the continuous comparison result signals of 3 clocks are all equal to one another. The OR circuit 89 outputs a low level signal "0" to the switch unit 92 of the clock control unit 90 if among the continuous comparison result signals of 3 clocks, at least one is different. Accordingly, the switch unit 92 stops supplying of clocks to the up-and-down counter circuit 62 and the D/A converter 63 if among the continuous comparison result signals of 3 clocks, at least one is different.

In other words, after the completion of automatic light power control, the protective circuit 80B compares output levels of 3 bits of the comparator 61 with one another. If all are not the same levels (among the levels of the output signals of 3 bits, the level of at least one output signal is different), the switch unit 92 stops supplying of clocks to the up-and-down counter circuit 62 and the D/A circuit 63. Then, by holding an LD driving control signal $V_{PCNT}$ outputted from the D/A converter 63, an unstable operation after the completion of an APC loop.

In other words, the flip-flops 84 and 85 function as level holding units for holding comparison result levels from the comparator 61 by an amount equal to a plurality of continuous bits. The OR circuit 86, the NOT circuit 87, the AND circuit 88 and the OR circuit 89 function as an equal level determination unit together for making determination as to whether comparison result levels of at least continuous 3 bits are all equal to one another or not based on the comparison result levels from the comparator 61 and the comparison result levels of continuous 2 bits from the flop-flops 84 and 85 and outputting a result of the determination as the stability identifying result.

The light emitting element driving apparatus 20B of the third embodiment of the present invention configured in the foregoing manner, as in the case of the first embodiment, by driving the laser diode 10 as a light emitting element after power input for the light emitting element driving apparatus 20B, data information regarding a burst signal or the like is converted into an optical signal and then transmitted.

After the power input, the initial value setting unit 70 produces a voltage value as an initial setting value, which is then preset in the count value of the up-and-down counter circuit 62 of the digital APC unit 60. In this way, the driving unit 30 can drive the laser diode 10 so as to raise light power in a first burst signal to a specified level at a high speed and efficiently.

After the first burst signal (first burst transmitting signal) has been inputted after the power input, as in the case of the first embodiment, the digital APC unit 60 starts its automatic light power control.

Then, the switch unit 92 of the clock control unit 90 continues supplying of clocks to the up-and-down counter circuit 62 and the D/A converter 63 until stabilization of an output of the comparator 61 is detected in the protective circuit 80B (until stabilization of the monitoring voltage signal $V_{mon}$ within the reference voltage $V_{ref}$ is detected).

Subsequently, the automatic light power control is completed, and even if variable outputs ampo of the comparator 61 cause an unstable operation, level comparison is performed among outputs of 3 bits of the comparator 61 in the protective circuit 80B. If the level comparison finds variance [see points of time (t21) to (t23) of FIGS. 19(a) to 19(c)], the protective circuit 80B outputs a high level signal to the switch unit 92 [see points of time (t21) to (t23) of FIG. 19(d)]. Upon having received the high level signal, the switch unit 92 stops supplying of clocks to the up-and-down counter circuit 62 and the D/A converter 63 [see points of time (t21) to (t23) of FIG. 19(f)].

The up-and-down counter circuit 62 stops its counting operation. But it holds a condition of a count value immediately before stopping of its counting operation. Thus, the up-and-down counter circuit 62 also holds a value of an LD driving control voltage signal $V_{PCNT}$ outputted from the D/A converter 63 to the driving unit 30. In this way, an unstable operation after the completion of an APC loop is prevented.

Figure 19:
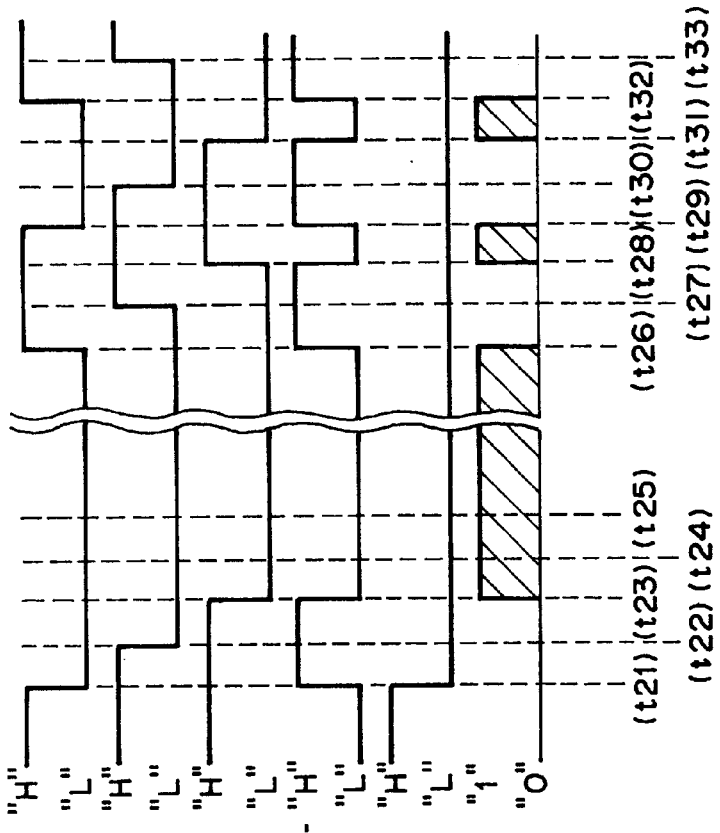
FIGS. 19(a) to 19(f) are time charts each illustrating an operation of the light emitting element driving apparatus of the third embodiment.

If the level comparison among the outputs of the comparator 61 by the protective circuit 80B finds end of variance [see points of time (t24) to (t26) of FIGS. 19(a) to 19(c)], the protective circuit 80B then outputs a low level signal to the switch unit 92 [see points of time (t24) to (t26) of FIG. 19(d)]. Upon having received the low level signal, the switch unit 92 supplies clocks to the up-and-down counter circuit 62 and the D/A converter 63 [see points of time (t24) to (t26) of FIG. 19(f)].

In other words, after the completion of the automatic light power control, if the up-and-down counter circuit 62 continues its counting operation, variance occurs in the outputs ampo of the comparator 61, which in turn causes the counting operation of the up-and-down counter circuit 62 to be unstable. Consequently, driving control performed by the driving unit 30 for the laser diode 10 will become unstable. However, if the comparison results of the comparator 61 are not equal continuously by an amount equal to 3 bits, by stopping supplying of clock signals to the up-and-down counter circuit 62 and the D/A converter 63, an LD driving control voltage $V_{PCNT}$ can be held and an unstable operation after the completion of an APC loop can be prevented.

As apparent from the foregoing, the light emitting element driving apparatus 20B of the third embodiment of the present invention is advantageous in the following respects. The inclusion of the protective circuit 80B and the clock control unit 90 enables, as in the case of the first embodiment, a degree of stability of driving control performed by the digital APC unit 60 for the driving unit 30 to be identified and a clock supplied to the digital APC unit 60 to be controlled by using at least one selected from information regarding this identified degree of stability and inputted data information. Accordingly, driving control performed by the digital APC unit 60 for the laser diode 10 can be stabilized. Also, an unstable operation of a light output can be prevented after the completion of automatic light power control.

Furthermore, the protective circuit 80B can suppress variance in light outputs and prevent an unstable operation after the completion of an APC loop. The clock control unit 90 can perform clock control for the digital APC unit 60 without receiving any external transmission switching signals or the like for identifying transmission/non-transmission of a transmitting signal such as a burst signal. Accordingly, the number of pins can be reduced if the light emitting element driving apparatus 20B is configured by using, for example an IC (Integrated Circuit). Since it is not necessary to produce any signals for identifying transmission/non-transmission of the transmitting signal in a signal processing system for performing signal processing concerning the transmitting signal, a system configuration can be simplified.

According to the present invention, the protective circuit 80B of the third embodiment may be used for the light emitting element driving apparatuses 20-1 to 20-10 of the first embodiment and its modified examples or the light emitting element driving apparatus 20A of the second embodiment.

In the third embodiment, the flip-flops 84 and 85 of the protective circuit 80B are provided in two stages and determination is made for the comparison result signals of 3 bits from the comparator 61. But there should be no limitation to these. Flip-flops may be provided in three stages or more, and determination may be made for comparison result signals of optional bits of 4 or more.

[e] Others

The N channel current absorbing type has been described as an output form of each of the D/A converters 63 and 63A of the light emitting element driving apparatuses 20-5 to 20-10 and 20A of the fifth to eighth modified examples of the first embodiment and the second embodiment. However, there should be no limitation to such a form. For the output form of D/A conversion, a P channel current discharging type can be provided by folding the output in the current mirror circuit of the N channel transistor or connecting the transistor 78f to the D/A conversion output. With this P channel current discharging type, the same advantages as those in the case of the fifth to tenth modified examples of the first embodiment and the second embodiment.

Furthermore, in each of the foregoing embodiments, the digital APC unit 60 includes the comparator 61 for making comparison between a reference voltage from the reference voltage generation unit 40 and a monitoring voltage signal from the monitoring voltage generation unit 50, the up-and-down counter circuit 62 for performing up-counting/down-counting for a comparison result ampo from the comparator 61 in synchronization with a counting clock and the D/A converter 63 for converting into an analog amount a count value obtained by up-counting/down-counting of the up-and-down counter circuit 62 and outputting the same as a control signal having a discrete control amount. However, there should be no limitation concerning these portions. A function of the comparator 61 can be realized by a difference voltage generation unit 61A and a comparator 61B, and there will be no difference in advantages compared with the foregoing embodiments.

Figure 20:
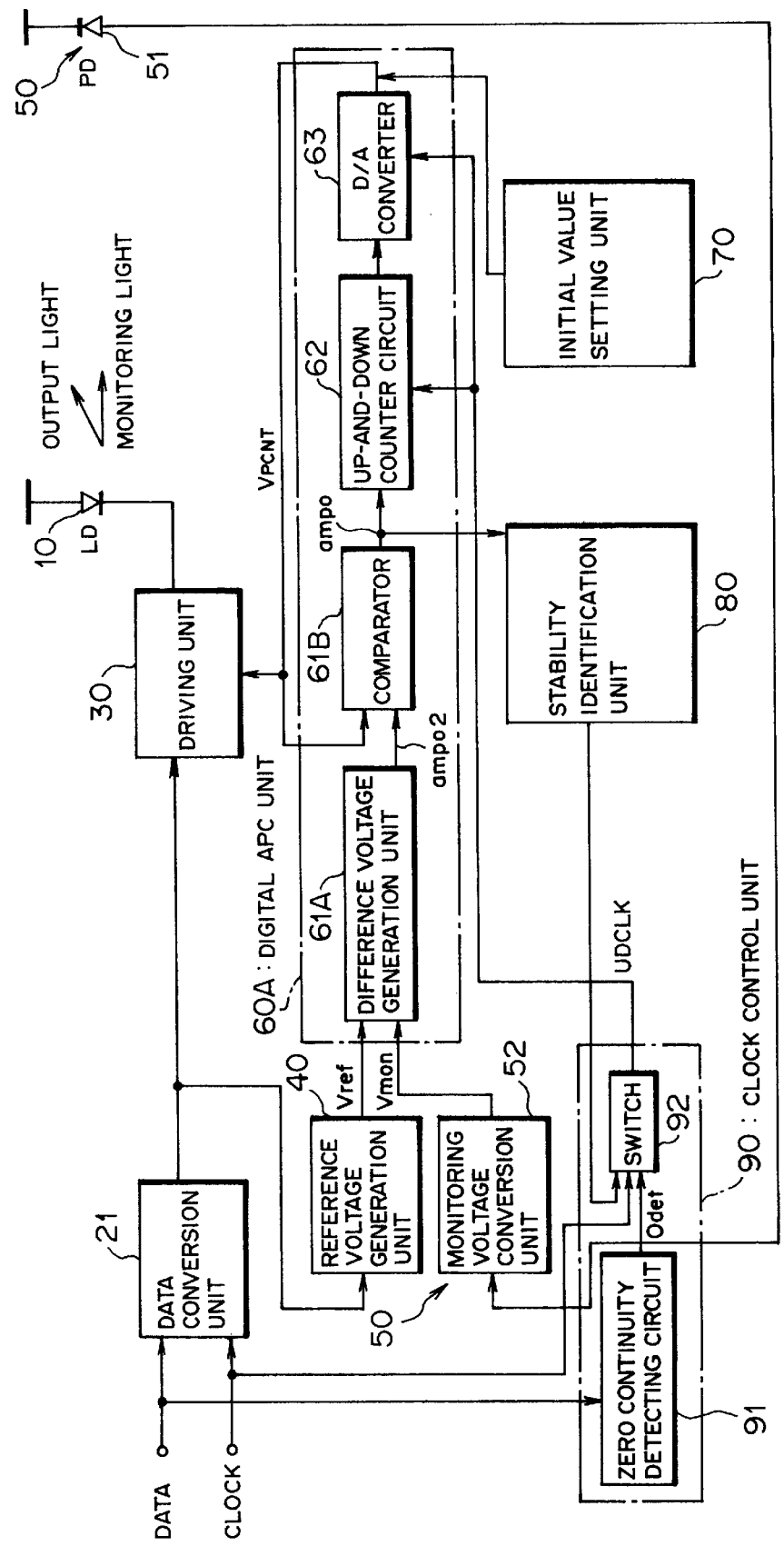
FIG. 20 is a block diagram showing a light emitting element driving apparatus of a modified example of each embodiment of the invention.

For example, as shown in FIG. 20, a function of the comparator 61 included in the light emitting element driving apparatus 20 of the first embodiment can be realized by the difference voltage generation unit 61A and the comparator 61B. In FIG. 20, the same reference numerals as those in FIG. 5 respectively denote the same portions.

Figure 21:
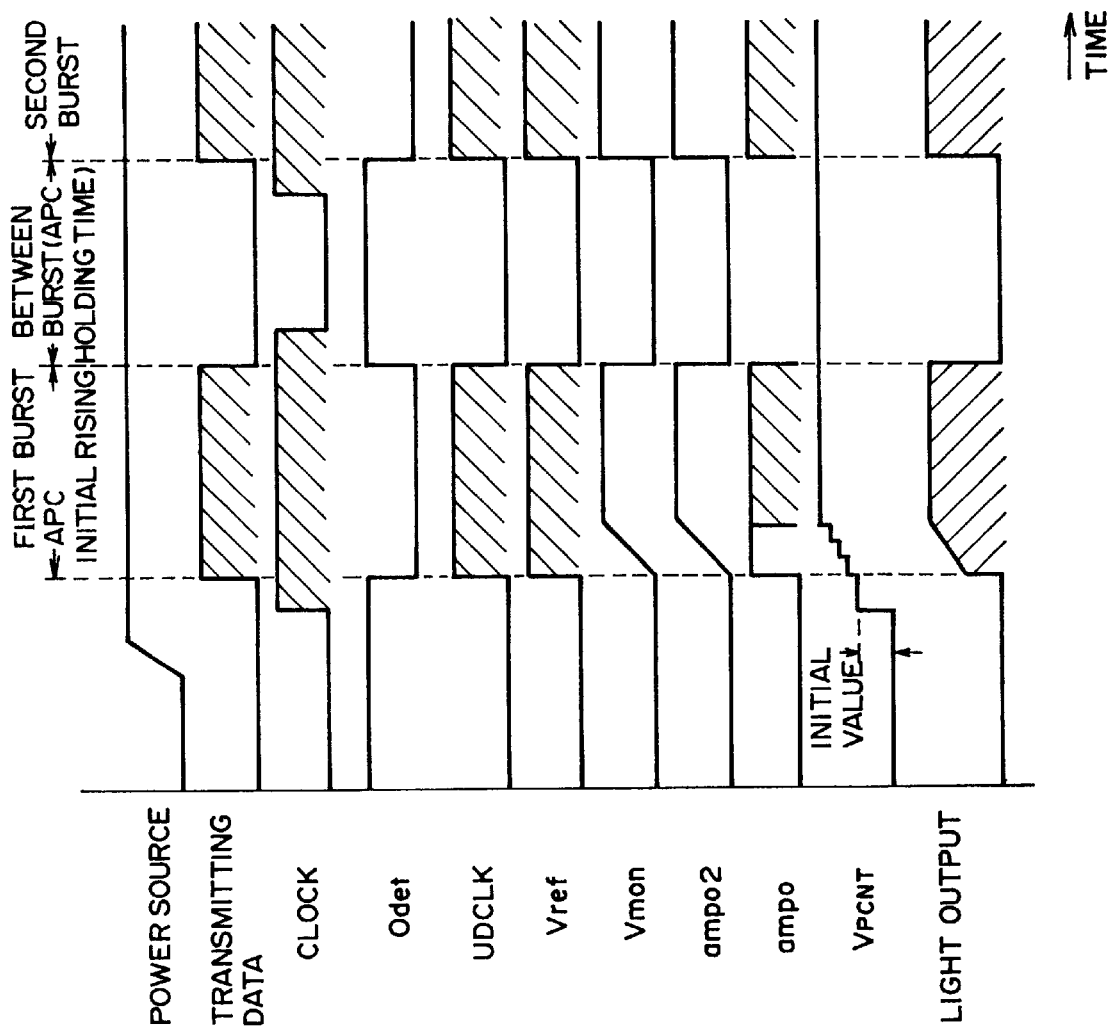
FIGS. 21(a) to 21(k) are time charts each illustrating an operation of the light emitting element driving apparatus shown in FIG. 20.
Figure 22:
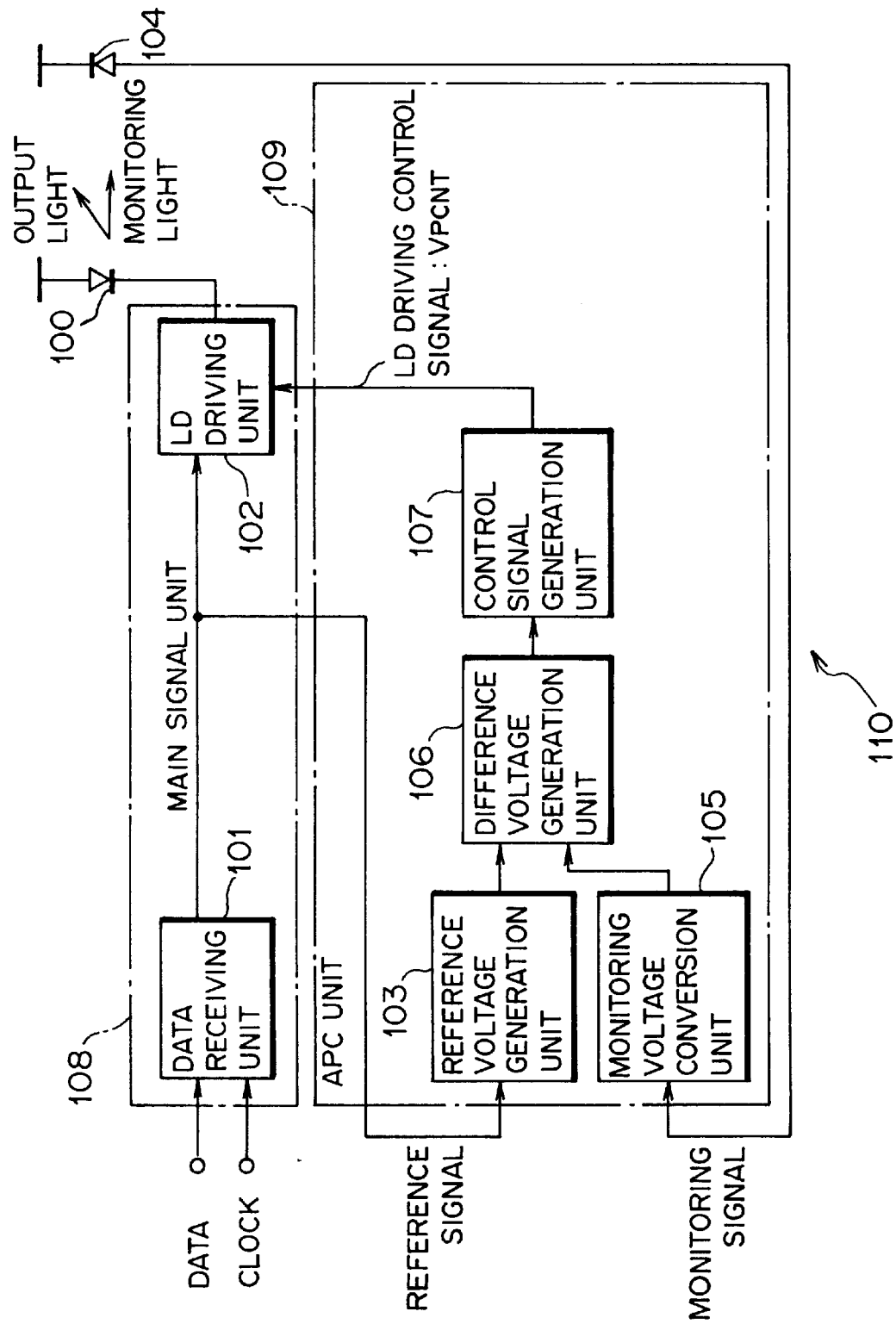
FIG. 22 is a block diagram showing a light emitting element driving apparatus using a conventional automatic light power control circuit.
Figure 23:
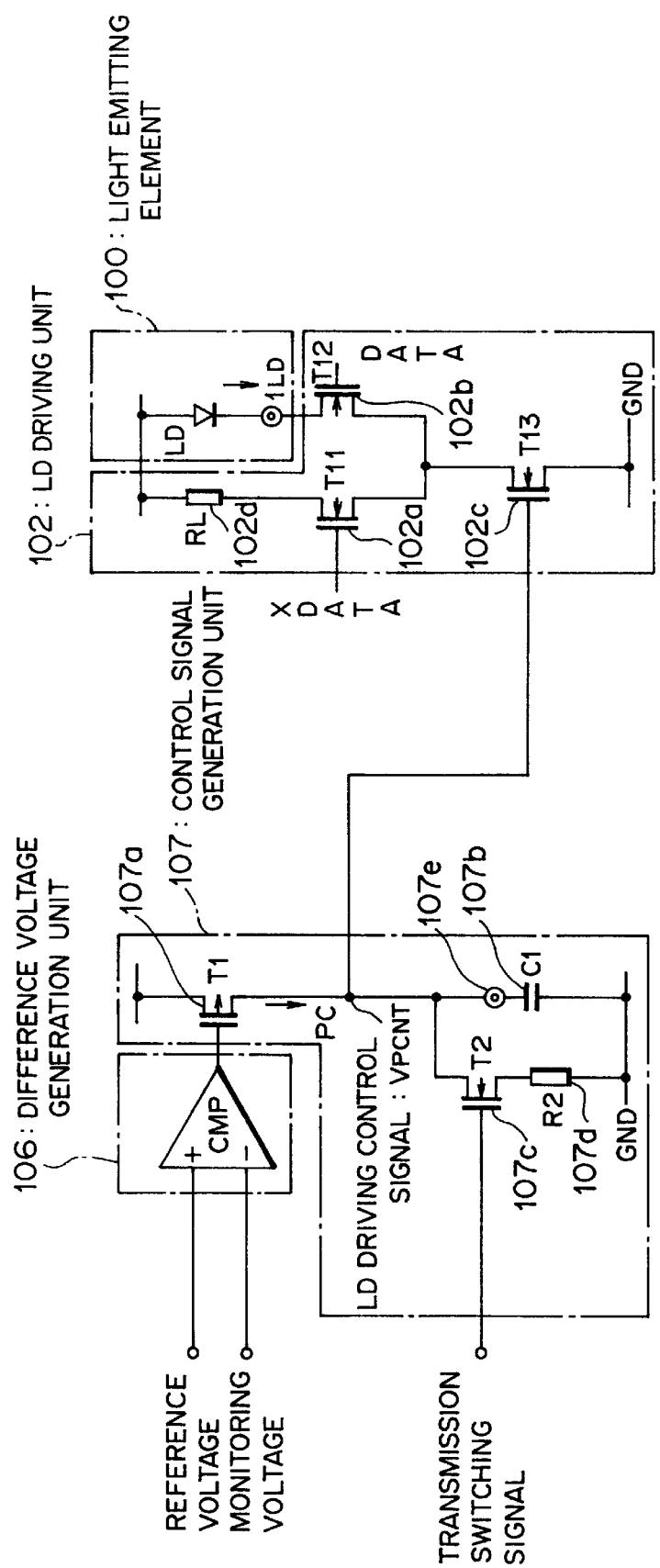
FIG. 23 is a block diagram showing main portions of the light emitting element driving apparatus shown in FIG. 22.
Figure 24:
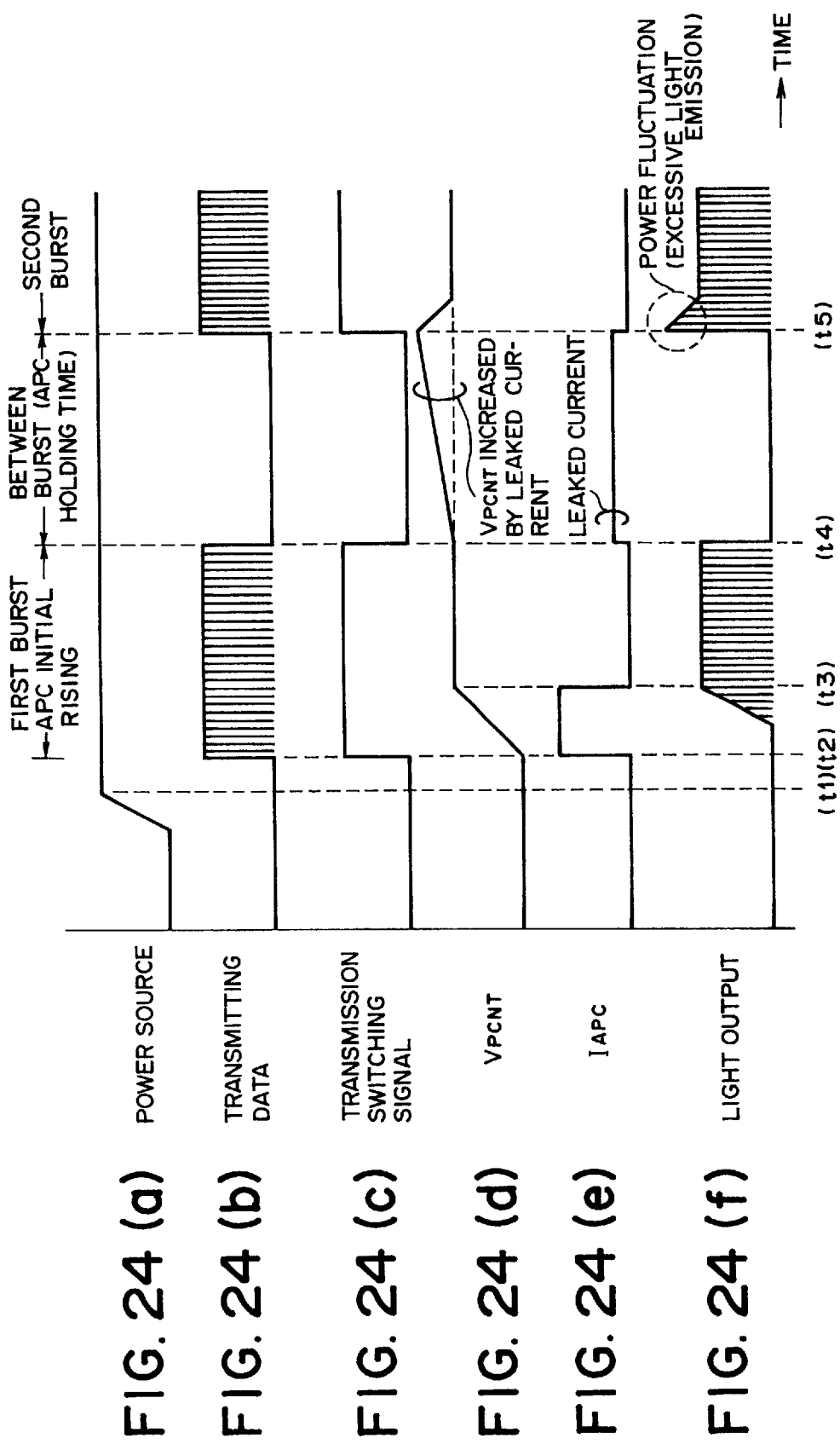
FIGS. 24(a) to 24(f) are time charts each illustrating an operation of the light emitting element driving apparatus shown in FIG. 22.
Figure 25:
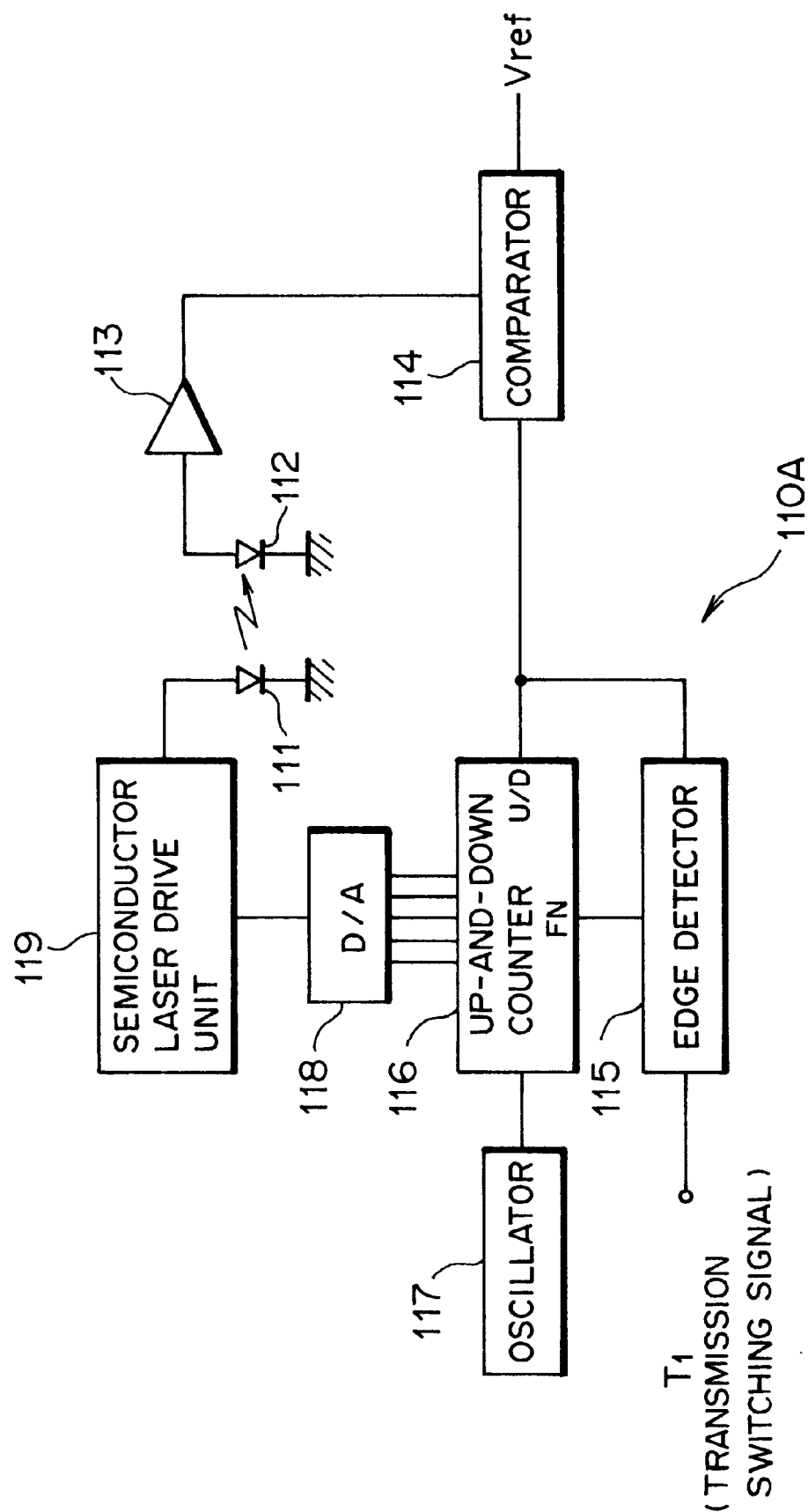
FIG. 25 is a block diagram showing a light emitting element driving apparatus having an APC loop composed of a digital circuit.
Figure 26:
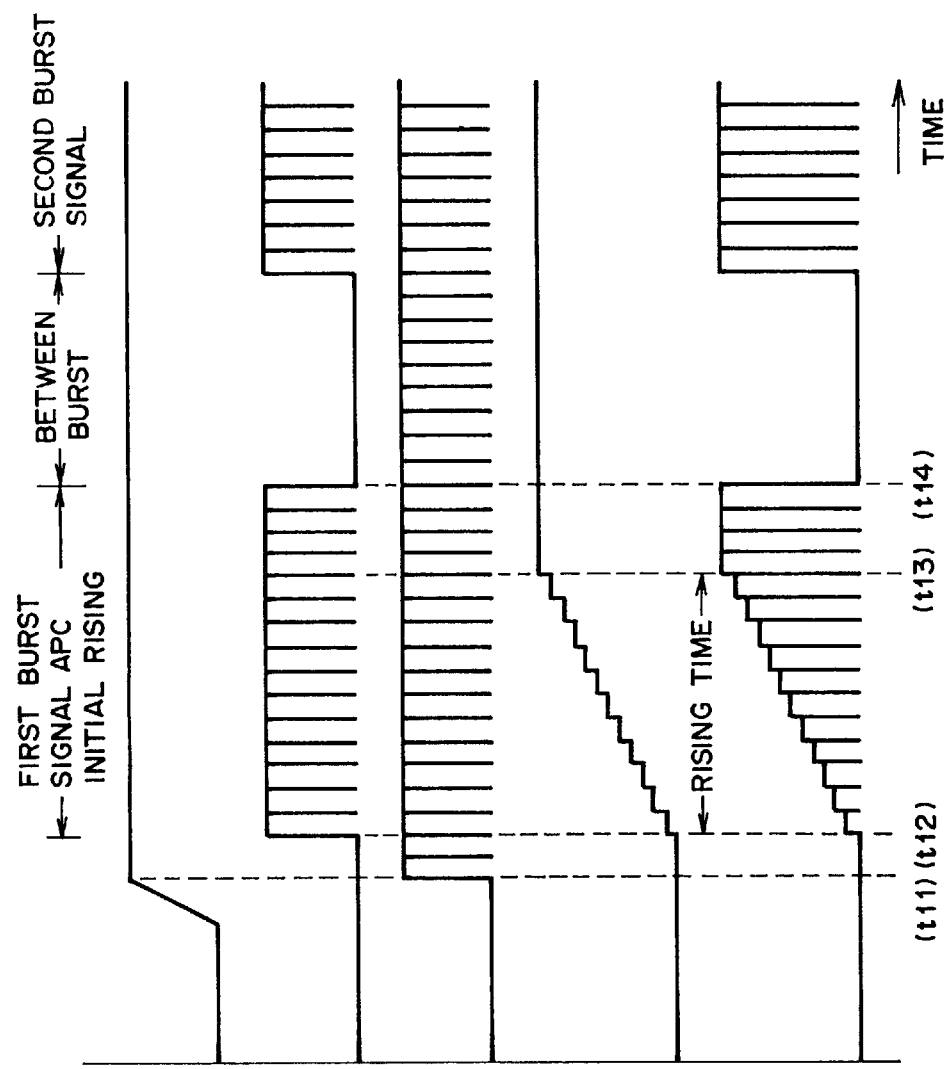
FIGS. 26(a) to 26(e) are time charts each illustrating an operation of the light emitting element driving apparatus shown in FIG. 25.
Figure 27:
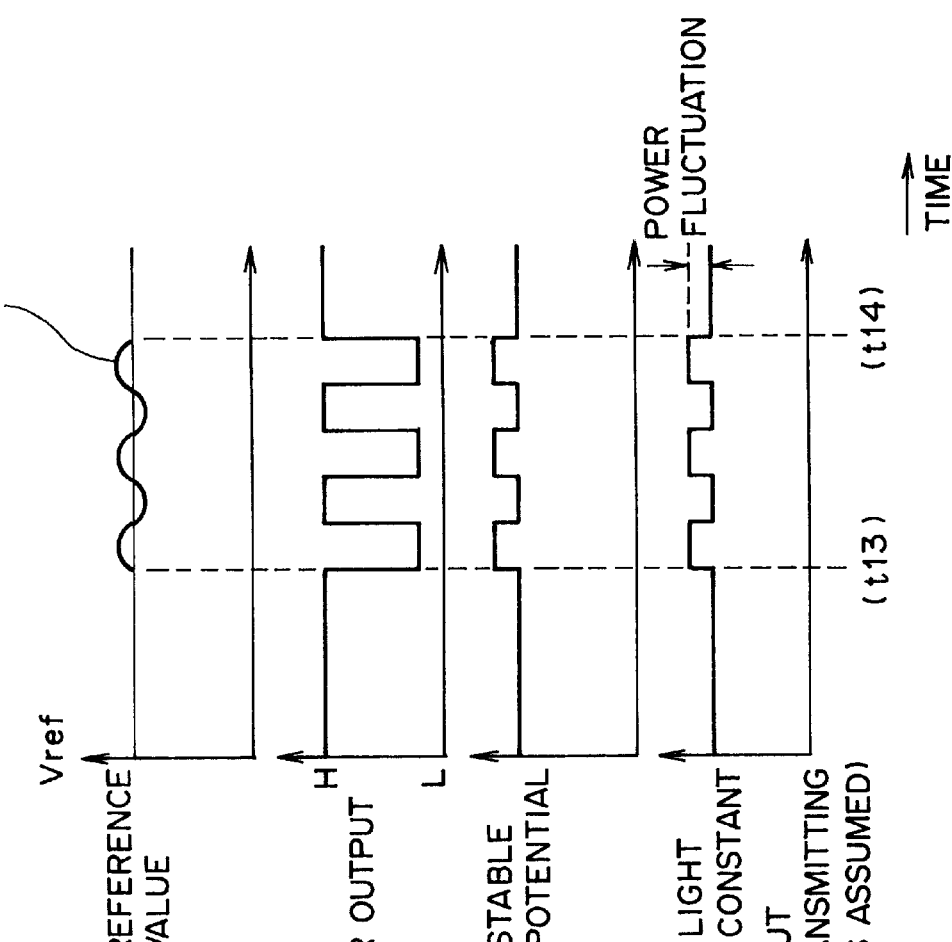
FIGS. 27(a) to 27(d) are time charts each illustrating an operation of the light emitting element driving apparatus shown in FIG. 25.

Specifically, the difference voltage generation unit 61A produces a difference voltage ampo 2 [see FIG. 21(h)] between the reference voltage from the reference voltage generation unit 40 and the monitoring voltage signal from the monitoring voltage generation unit 50. The comparator 61B compares difference voltage information from the difference voltage generation unit 61A with a control voltage signal outputted from the D/A converter 63 to the driving unit 30. A comparing result from the comparator 61B can be used in the same way as the comparison result ampo [see FIG. 21(i)] in each of the foregoing embodiments.

In other words, the digital APC unit 60A shown in FIG. 20 can control the driving unit 30 so as to bring the monitoring voltage $V_{mon}$ produced by the monitoring voltage generation unit 50 close to the reference voltage $V_{ref}$ generated by the reference voltage generation unit 40 (such that a difference voltage produced by the difference voltage generation unit 61A can be "0").

According to the present invention, various modifications and changes can be made without departing from the spirit and scope of the invention irrespective of the embodiments.

For example, in the first embodiment, the light emitting element driving apparatus can be configured by using at least one function selected from the initial value setting unit 70, the stability identification unit 80 and the clock control unit 90.

In the first embodiment, if only the initial value setting unit 70 is selected among itself, the stability identification unit 80 and the clock control unit 90 to configure the light emitting element driving apparatus, a raising component is set as an initial value at least in a control signal $V_{PCNT}$ having a discrete control amount supplied from the digital APC unit 60 to the driving unit 30 and used for automatic light power control, and the up-and-down counter circuit 62 starts its counting operation from the initial value. Accordingly, light output power in a first burst signal immediately after power input can be raised at a high speed and stabilized.

In the first embodiment, if only the stability identification unit 80 is selected from itself, the initial value setting unit 70 and the clock control unit 90 to configure the light emitting element driving apparatus, at least a degree of stability of driving control performed by the digital APC unit 60 for the driving unit 30 is identified, and a clock supplied to the digital APC unit 60 is controlled by using at least one selected from information regarding the stability identification and inputted data information. Accordingly, driving control performed by the digital APC unit 60 for the laser diode 10 can be stabilized. Also, after the completion of automatic light power control, an unstable operation of a light output can be prevented.

In the first embodiment, if only the clock control unit 90 is selected from itself, the initial value setting unit 70 and the stability identification unit 80 to configure the light emitting element driving apparatus, clock control can be performed for the digital APC unit 60 without receiving any external transmission switching signals or the like for identifying transmission/non-transmission of a transmitting signal of at least a burst signal or the like. Accordingly, the number of pins can be reduced if the light emitting element driving apparatus 20 is configured by using, for example an IC (Integrated Circuit). Also, since it is not necessary to generate any signals for identifying transmission/non-transmission of a transmitting signal in the signal processing system for performing signal processing concerning the transmitting signal, a system configuration can be simplified.

Furthermore, according to the present invention, the light emitting element driving apparatus of the invention can be used for various purposes, for example for an optical communication device for transferring optical signals through optical fibers, a driving apparatus for driving a magneto-optic disk (MO) or for a light emitting element driving apparatus for driving a laser diode in a laser printer.

What is claimed is:

1. A light emitting element driving apparatus, comprising:
    a driving unit driving a light emitting element by means of a driving signal while performing automatic light power control, said light emitting element being capable of converting an input electric signal containing data information into an optical signal;
    a reference voltage generation unit generating a reference voltage from said input electric signal, said reference voltage being used obtaining a light output comprising a specified power from said light emitting element in a normal condition;
    a monitoring voltage generation unit generating a monitoring voltage signal corresponding to power of an optical signal outputted from said light emitting element;
    a light power control unit comparing said reference voltage from said reference voltage generation unit with said monitoring voltage signal from said monitoring voltage generation unit and controlling, based on a result of said comparison, said driving unit by a discrete control amount such that a light output from said light emitting element can have said specified power; and
    an initial value setting unit setting a raising component as an initial value in a control signal comprising said discrete control amount supplied from said light power control unit to said driving unit, wherein
        said light power control unit comprises a comparison unit comparing said reference voltage from said reference voltage generation unit with said monitoring voltage signal from said monitoring voltage generation unit, an up-and-down counter circuit performing up-counting/down-counting for a result of comparison from said comparison unit in synchronization with a counting clock, and a digital/analog conversion unit converting into an analog amount a count value obtained by up-counting/down-counting performed in said up-and-down counter circuit and outputting said analog amount as a control signal comprising said discrete control amount, and
        said initial value setting unit corn a voltage generation unit generating a voltage signal to be used as said preset initial value and an analog/digital conversion unit converting said voltage signal generated in said voltage generation unit into a digital signal, and presets said digital signal from said analog/digital conversion unit in said up-and-down counter circuit of said light power control unit.

2. The light emitting element driving apparatus as claimed in claim 1, wherein said voltage generation unit comprises a plurality of voltage sources generating voltage signals different from one another and a switch outputting a voltage signal from one selected from said plurality of voltage sources, said selected voltage source being capable of producing a voltage signal corresponding to a characteristic of said light emitting element.

3. A light emitting element driving apparatus, comprising:
    a driving unit driving a light emitting element by means of a driving signal while performing automatic light power control, said light emitting element being capable of converting an input electric signal containing data information into an optical signal;
    a reference voltage generation unit generating a reference voltage from said input electric signal, said reference voltage being used obtaining a light output comprising a specified power from said light emitting element in a normal condition;
    a monitoring voltage generation unit generating a monitoring voltage signal corresponding to power of an optical signal outputted from said light emitting element;
    a light power control unit comparing said reference voltage from said reference voltage generation unit with said monitoring voltage signal from said monitoring voltage generation unit and controlling, based on a result of said comparison, said driving unit by a discrete control amount such that a light output from said light emitting element can have said specified power; and an initial value setting unit setting a raising component as an initial value in a control signal comprising said discrete control amount supplied from said light power control unit to said driving unit, wherein said light power control unit comprises a comparison unit comparing said reference voltage from said reference voltage generation unit with said monitoring voltage signal from said monitoring voltage generation unit, an up-and-down counter circuit performing up-counting/down-counting for a result of comparison from said comparison unit in synchronization with a counting clock, and a digital/analog conversion unit converting into an analog amount a count value obtained by up-counting/down-counting performed in said up-and-down counter circuit and outputting said analog amount as a control signal comprising said discrete control amount, and said initial value setting unit comprises a voltage signal corresponding to a characteristic of said light emitting element.

4. The light emitting element driving apparatus as claimed in claim 3, wherein said voltage generation unit comprises a plurality of voltage sources generating voltage signals different from one another and a switch outputting a voltage signal from one selected from said plurality of voltage sources, said selected voltage source being capable of generating a voltage signal corresponding to a characteristic of said light emitting element.

5. The light emitting element driving apparatus as claimed in claim 3, wherein said voltage generation unit comprises a memory storing as a digital signal information regarding a voltage signal to be used as said initial value and an analog/digital conversion unit converting a value of said digital signal stored in said memory into an analog signal and outputting said analog signal.

6. A light emitting element driving apparatus, comprising:

a driving unit driving a light emitting element by means of a driving signal while performing automatic light power control, said light emitting element being capable of converting an input electric signal containing data information into an optical signal;

a reference voltage generation unit generating a reference voltage from said input electric signal, said reference voltage being used obtaining a light output comprising a specified power from said light emitting element in a normal condition;

a monitoring voltage generation unit generating a monitoring voltage signal corresponding to power of an optical signal outputted from said light emitting element;

a light power control unit comparing said reference voltage from said reference voltage generation unit with said monitoring voltage signal from said monitoring voltage generation unit and controlling, based on a result of said comparison, said driving unit by a discrete control amount such that a light output from said light emitting element can have said specified power; and an initial value setting unit setting a raising component as an initial value in a control signal comprising said discrete control amount supplied from said light power control unit to said driving unit, wherein said light power control unit comprises a comparison unit comparing said reference voltage from said reference voltage generation unit with said monitoring voltage signal from said monitoring voltage generation unit, an up-and-down counter circuit performing up-counting/down-counting a result of comparison from said comparison unit in synchronization with a counting clock, and a digital/analog conversion unit converting into an analog amount a count value obtained by up-counting/down-counting performed in said up-and-down counter circuit and outputting said analog amount as a control signal comprising said discrete control amount, and said initial value setting unit is composed of a memory storing a digital signal as a voltage signal to be used as said initial value, and presets said digital signal stored in said memory in said up-and down counter circuit of said light power control unit.

7. A light emitting element driving apparatus driving a light emitting element, which is operable to convert an inputted electric signal into an-optical signal and to output the converted optical signal, while automatically controlling power of the optical signal outputted from the light emitting element, comprising:

a driving unit, operatively connected to the light emitting element, driving the light emitting element by means of a driving signal;

a reference-voltage generation unit generating a reference voltage based on the electric signal, said reference voltage causing the light emitting element output the optical signal with specified power in a stationary condition:

a monitor-voltage generation unit generating a monitor voltage corresponding to power of the optical signal outputted from the light emitting element;

a light-power control unit, connected to both said reference voltage generation unit and said monitor-voltage generation unit, comparing the reference voltage generated by said reference-voltage generation unit with the monitor voltage generated by said monitor-voltage generation unit and controlling said driving unit by a discrete control amount in synchronism with an externally supplied clock based on a result of the comparison so that the optical signal outputted from the light emitting element has the specified power; and a stability identification unit identifying stability of the driving control of the light emitting element by said light-power control unit and outputting stability identification information;

wherein said stability identification unit comprises a first hysteresis comparison unit for comparing the monitor voltage with a first hysteresis characteristic, which is determined based on the reference voltage, a second hysteresis comparison unit comparing the monitor voltage with a second hysteresis characteristic, which is different from the first hysteresis characteristic and is determined based on the reference voltage and a determination unit judging convergence of driving control based on results of comparison by said first and second hysteresis comparison units and outputting a result of determination as stability identification information, and said stability identification unit is operable to interrupt the supply of the clock to said light-power control unit during a period that the driving control is judged to be converged so that the control of said driving unit by said light-power control unit is interrupted.

8. A light emitting element driving apparatus driving a light emitting element, which is operable to convert an inputted electric signal into an optical signal and to output the converted optical signal, while automatically controlling power of the optical signal outputted from the light emitting element, comprising:

a driving unit, operatively connected to the light emitting element, driving the light emitting element by means of a driving signal;

a reference-voltage generation unit generating a reference voltage based on the electric signal, said reference voltage causing the light emitting element output the optical signal with specified power in a stationary condition;

a monitor-voltage generation unit generating a monitor voltage corresponding to power of the optical signal outputted from the light emitting element;

a light-power control unit, connected to both said reference-voltage generation unit and said monitor-voltage a generation unit, comparing the reference voltage generated by said reference-voltage generation unit with the monitor voltage generated by said monitor-voltage generation unit and controlling said driving unit by a discrete control amount in synchronism with an externally supplied clock based on a result of the comparison so that the optical signal outputted from the light emitting element has the specified power; and a stability identification unit identifying stability of output of the light emitting element and outputting stability identification information;

wherein said stability identification unit comprises
a level holding unit holding at least two levels representing at least two successive comparison results by said light-power control unit in forms of bits and
an equal level determination unit judging whether each of the levels held by said level holding unit and a level of a comparison result succeeding to the last level held by said level holding unit is the same, and said stability identification unit is operable to interrupt the supply of the clock to said light-power control unit during a period that at least three successive levels are judged to be the same so that the control of said driving unit by said light-power control unit is interrupted.

9. A light emitting element driving apparatus driving a light emitting element, which is operable to convert an inputted electric signal into an optical signal and to outfit the converted optical signal, while automatically controlling power of the optical signal outputted from the light emitting element, comprising:

a driving unit, operatively connected to the light emitting element, driving the light emitting element by means of a driving signal;

a reference-voltage generation unit generating a reference voltage based on the electric signal, said reference voltage causing the light emitting element to output the optical signal with specified power in a stationary condition:

a monitor-voltage generation unit generating a monitor voltage corresponding to power of the optical signal outputted from said light emitting element;

a light-power control unit, connected to both said reference-voltage generation unit and said monitor-voltage generation unit, comparing the reference voltage from said reference-voltage generation unit with the monitor voltage from said monitor-voltage generation unit and controlling said driving unit by a discrete control amount in synchronism with an externally supplied clock based on a result of the comparison so that the optical signal outputted from the light emitting element has the specified power; and a clock control unit controlling the supply of a clock to said light-power control unit in order to stabilize driving control by said light-power control unit.

10. A light emitting element driving apparatus as claimed in claim 9, wherein said light power control unit comprises a comparison unit comparing said reference voltage from said reference voltage generation unit with said monitoring voltage signal from said monitoring voltage generation unit, an up-and-down counter circuit performing up counting/down-counting for a result of comparison from said comparison unit in synchronization with a counting clock and a digital/analog conversion unit converting into an analog amount a count value obtained by up-counting/down-counting performed by said up-counting/down-counting counter circuit and outputting said analog amount as a control signal having said discrete control amount.

11. A light emitting element driving apparatus as claimed in claim 9, wherein said clock control unit comprises a data detection unit detecting existence of data information to be transmitted and a switch unit supplying said clock to said light power control unit if existence of data information to be transmitted is detected by said data detection unit and stopping supplying of said clock to said light power control unit if non-existence of data information to be transmitted is detected by said data detection unit.

12. A light emitting element driving apparatus driving a light emitting element, which is operable to convert an inputted electric signal containing data information into an optical signal and to output the converted optical signal, while automatically controlling power of the optical signal outputted from the light emitting element, comprising:

a driving unit, operatively connected to the light emitting element, driving the light emitting element by means of a driving signal;

a reference- voltage generation unit generating a reference voltage based on the electric signal, said reference voltage causing the light emitting element output the optical signal with specified power in a stationary condition;

a monitor-voltage generation unit generating a monitor voltage corresponding to power of the optical signal outputted from said light emitting element;

a light- power control unit, connected to both said reference-voltage generation unit, said monitor-voltage generation unit, comparing the reference voltage from said reference-voltage generation unit with the monitor voltage from said monitor-voltage generation unit and controlling said driving unit by a discrete control amount in synchronism with an externally supplied clock based on a result of the comparison so that the optical signal outputted from said light emitting element has the specified power; and a stability identification unit identifying stability of the driving control of the light emitting element by said light-power control unit and outputting stability identification information; and a clock control unit controlling the supply of a clock to said light-power control unit by using at least one of stability identification information from said stability identification unit and the data information in order to stabilize driving control by said light-power control unit.

13. A light emitting element driving apparatus as claimed in claim 12, wherein said clock control unit comprises a data detection unit detecting existence of data information to be transmitted and a switch unit stopping supplying of said clock to said light power control unit if existence of data information to be transmitted is detected by said data detection unit and completion of driving control performed by said light power control unit for said driving unit is determined based on said stability identifying result from said stability identification unit, and alternatively if non-existence of data information to be transmitted is detected by said data detection unit.

14. A light emitting element driving apparatus driving a light emitting element, which is operable to, convert an inputted electric signal into an optical signal and to output the converted optical signal, while automatically controlling power of the optical signal outputted from the light emitting element, comprising:

a driving unit, operatively connected to the light emitting element, driving the light emitting element by means of a driving signal:

a reference-voltage generation unit generating a reference voltage based on the electric signal, said reference voltage causing the light emitting element to output the optical signal with a specified power in a stationary condition;

a monitor-voltage generation unit generating a monitor voltage corresponding to power of the optical signal outputted from the light emitting element;

an initial-value setting unit setting a raising component as an initial value; and a light-power control unit, connected to said reference-voltage generation unit, said monitor-voltage generation unit and said initial-value setting unit, comparing the reference voltage generated by said reference-voltage generation unit with the monitor voltage generated by said monitor-voltage generation unit and controlling said driving unit by a discrete control amount using the initial value set by said initial-value setting unit in synchronism with an externally supplied clock based on a result of the comparison so that the optical signal outputted from the light emitting element has the specified power; and said light-power control unit comprising
a comparison unit comparing the reference voltage with the monitor voltage,
an up-and-down counter circuit performing up-counting/down-counting based on a result of the comparison by said comparison unit in synchronism with an external clock, and
a digital/analog conversion unit converting the count value counted by said up-and-down counter circuit into an analog amount and outputting the analog amount as a control signal comprising the discrete control amount, said initial-value setting unit comprising
a voltage generation unit generating a voltage signal to be used as the initial value, and
an analog/digital conversion unit converting the voltage signal generated by said voltage generation unit into a digital signal, and presenting the digital signal in said up-and-down counter circuit.

15. A light emitting element driving apparatus as claimed in claim 14, wherein said voltage generation unit comprises a plurality of different voltage sources generating a plurality of voltage signals different from each other and a switch selecting one voltage source to generate a voltage signal corresponding to a characteristic of the light emitting element from said plurality of voltage sources, and outputs the voltage signal using the voltage source selected by said switch.

16. A light emitting element driving apparatus driving a light emitting element, which is operable to convert an inputted electric signal into an optical signal and to output the converted optical signal, while automatically controlling power of the optical signal outputted from the light emitting element, comprising:

a driving unit, operatively connected to the light emitting element, driving the light emitting element by means of a driving signal;

a reference-voltage generation unit generating a reference voltage based on the electric signal, said reference voltage causing the light emitting element to output a specified power in a stationary condition;

a monitor-voltage generation unit generating a monitor voltage corresponding to power of the optical signal outputted from the light emitting element;

an initial-value setting unit setting a raising component as an initial value; and a light-power control unit, connected to said reference-voltage generation unit, said monitor-voltage generation unit and said initial-value setting unit, comparing the reference voltage generated by said reference-voltage generation unit with the monitor voltage generated by said monitor-voltage generation unit and controlling a driving unit by a discrete control amount using the initial value set by said initial-value setting unit in synchronism with an externally supplied clock based on a result of the comparison so that the optical signal outputted by the light emitting element has the specified power;

said light-power control unit comprising
a comparison unit comparing the reference voltage with the monitor voltage,
an up-and-down counter circuit performing up-counting/down-counting based on a result of the comparison by said comparison unit in synchronism with an external clock, and
a digital/analog conversion unit converting the count value counted by said up-and-down counter circuit into an analog amount and outputting the analog amount as a control signal comprising the discrete control amount, said initial-value setting unit comprising
a voltage generation unit generating a voltage signal to be used as the initial value, and
a voltage adding circuit adding the voltage signal to the control signal and outputting to said driving unit.

17. A light emitting element driving apparatus as claimed in claim 16, wherein said voltage generation unit comprises a plurality of different voltage sources generating a plurality of voltage signals different from each other and a switch selecting one voltage source to generate a voltage signal corresponding to a characteristic of the, light emitting element from said plurality of voltage sources, and outputs the voltage signal using the voltage source selected by said switch.

18. A light emitting element driving apparatus as claimed in claim 16, wherein said voltage generation unit comprises a memory storing the initial value as a digital signal, and an analog/digital conversion unit converting the digital signal stored in said memory into an analog signal and outputting the converted analog signal.

19. A light emitting element driving apparatus driving a light emitting element, which is operable to convert an inputted electric signal into an optical signal and to output the converted optical signal, while automatically controlling power of the optical signal outputted from the light emitting element, comprising:

a driving unit, operatively connected to the light emitting element, driving the light emitting element by means of a driving signal;

a reference-voltage generation unit generating a reference voltage based on the electric signal, said reference voltage causing the light emitting element to output a specified power in a stationary condition:

a monitor-voltage generation unit generating a monitor voltage corresponding to power of the optical signal outputted from the light emitting element;

an initial-value setting unit setting a raising component as an initial value; and a light-power control unit, connected to said reference-voltage generation unit, said monitor-voltage generation unit and said initial-value setting unit, comparing the reference voltage generated by said reference-voltage generation unit with the monitor voltage generated by sand monitor-voltage generation unit and controlling said driving unit by a discrete control amount using the initial value in synchronism with an externally supplied clock based on a result of the comparison so that the optical signal outputted by the light emitting element has the specified power;

said light-power control unit comprising a comparison unit comparing the reference voltage with the monitor voltage, an up-and-down counter circuit performing up-counting/down-counting based on a result of the comparison by said comparison unit in synchronism with an external clock, and a digital/analog conversion unit converting the count value counted by said up-and-down counter circuit into an analog amount and outputting the analog amount as a control signal comprising the discrete control amount, said initial-value setting unit comprising a memory storing the initial value as a digital signal, and presetting the digital signal stored in said memory in said up-and-down counter circuit.

* * * * *

UNITED STATES PATENT AND TRADEMARK OFFICE
CERTIFICATE OF CORRECTION

PATENT NO.    : 6,292,284 B1
DATED         : September 18, 2001
INVENTOR(S)   : Toshiyuki Takauji et al.

It is certified that error appears in the above-identified patent and that said Letters Patent is hereby corrected as shown below:

Title page,
Item [56], References Cited, U.S. PATENT DOCUMENTS,
8th entry change "5,978,124" to -- 5,978,124A --;
9th entry change "6,169,618" to -- 6,169,618B1 --;

Column 40,
Line 35, change "corn" to -- comprises --.

Column 46,
Line 64, delete ","

Signed and Sealed this

Eighteenth Day of March, 2003

JAMES E. ROGAN
*Director of the United States Patent and Trademark Office*